United States Patent [19]

Kyojima et al.

[11] Patent Number: 5,920,879
[45] Date of Patent: Jul. 6, 1999

[54] DOCUMENT STRUCTURE CONVERSION APPARATUS

[75] Inventors: Masaki Kyojima; Kazuya Chiba, both of Nakai-machi, Japan

[73] Assignee: Fuji Xerox Co., Ltd., Tokyo, Japan

[21] Appl. No.: 08/856,399

[22] Filed: May 14, 1997

[30] Foreign Application Priority Data

May 20, 1996 [JP] Japan ................................. 8-124379

[51] Int. Cl.$^6$ ....................................................... G06F 7/06
[52] U.S. Cl. ............................................................ 707/517
[58] Field of Search ................................. 707/517, 524, 707/530, 523, 520, 513, 515, 516

[56] References Cited

U.S. PATENT DOCUMENTS

| | | | |
|---|---|---|---|
| 5,181,162 | 1/1993 | Smith et al. | 707/530 |
| 5,438,512 | 8/1995 | Mantha et al. | 707/517 |
| 5,552,982 | 9/1996 | Jackson et al. | 707/531 |
| 5,669,007 | 9/1997 | Tateishi | 707/517 |

FOREIGN PATENT DOCUMENTS

| | | |
|---|---|---|
| A-63-286963 | 11/1988 | Japan . |
| B2-6-12542 | 2/1994 | Japan . |
| A-6-214983 | 8/1994 | Japan . |

OTHER PUBLICATIONS

Fred Cole and Heaather Brown, EP–odds and ends, Electronic Publishing, vol. 5(4), 209–216, Dec. 1992.

*Primary Examiner*—Joseph H. Feild
*Attorney, Agent, or Firm*—Oliff & Berridge, PLC

[57] ABSTRACT

The present invention relates to a document structure composing apparatus to judge a short part based upon the structure of the whole document, perform processing for complementation and compose document structure according to a desired document class. Complementation specification storage means stores the specification of complementation for document structure. Complementation means applies processing for complementation to pre-complemented document structure. Correlating rule storage means stores a rule for correlating components between different document classes. Document structure converting means converts an original document which meets the structural constraint of a specific document class to structure according to another document class according to the correlating rule. The original document is first converted from structure according to the specific document class to structure nearly according to a desired document class by the document structure converting means. The correlating rule required for conversion is stored in the correlating rule storage means. Afterward, processing for complementation based upon the specification of complementation stored in the complementation specification storage means is executed by the complementation means and document structure according to a desired document class is composed.

6 Claims, 42 Drawing Sheets

101

| TYPE NAME: | CONTENTS TYPE: |
|---|---|
| TECHNICAL MEMORANDUM | NO CONTENTS |
| TYPE NAME: | CONTENTS TYPE: |
| HEAD OF SENTENCE | NO CONTENTS |
| TYPE NAME: | CONTENTS TYPE: |
| TITLE OF MEMORANDUM | CHARACTER STRING |
| TYPE NAME: AUTHOR | CONTENTS TYPE: CHARACTER STRING |
| TYPE NAME: MAIL ADDRESS | CONTENTS TYPE: CHARACTER STRING |
| TYPE NAME: SECTION | CONTENTS TYPE: NO CONTENTS |
| TYPE NAME: TITLE | CONTENTS TYPE: CHARACTER STRING |
| TYPE NAME: PARAGRAPH | CONTENTS TYPE: CHARACTER STRING |
| TYPE NAME: ARTWORK | CONTENTS TYPE: NO CONTENTS |
| TYPE NAME: CAPTION | CONTENTS TYPE: CHARACTER STRING |
| TYPE NAME: FIGURE | CONTENTS TYPE: GEOMETRIC FIGURE |

FIG.4

| | | |
|---|---|---|
| TYPE NAME: | REPORT | CONTENTS TYPE: NO CONTENTS |
| TYPE NAME: | HEADER | CONTENTS TYPE: NO CONTENTS |
| TYPE NAME: | REPORT-TITLE | CONTENTS TYPE: CHARACTER STRING |
| TYPE NAME: | AUTHOR | CONTENTS TYPE: NO CONTENTS |
| TYPE NAME: | NAME | CONTENTS TYPE: NO CONTENTS |
| TYPE NAME: | ADDRESS | CONTENTS TYPE: CHARACTER STRING |
| TYPE NAME: | REVISION-DATES | CONTENTS TYPE: NO CONTENTS |
| TYPE NAME: | DATE | CONTENTS TYPE: CHARACTER STRING |
| TYPE NAME: | SECTION | CONTENTS TYPE: NO CONTENTS |
| TYPE NAME: | TITLE | CONTENTS TYPE: CHARACTER STRING |
| TYPE NAME: | PARAGRAPH | CONTENTS TYPE: CHARACTER STRING |
| TYPE NAME: | ARTWORK | CONTENTS TYPE: NO CONTENTS |
| TYPE NAME: | CAPTION | CONTENTS TYPE: CHARACTER STRING |
| TYPE NAME: | FIGURE | CONTENTS TYPE: GEOMETRIC FIGURE |

DOCUMENT STRUCTURE CONVERSION APPARATUS

BACKGROUND OF THE INVENTION

1. Field of the Invention

The present invention relates to a document structure composing apparatus for composing document structure, particularly relates to a document structure composing apparatus for composing document structure which meets the structural constraint of a specific document class.

2. Description of Related Art

A document having logical structure composed of some components such as a chapter, a paragraph, a section and others is called a structured document and it is known that the sharing and conversion of a document can be facilitated by introducing the structure into a document. An international standard such as Standard Generalized Markup Language (SGML) and Office Document Architecture (ODA) is popularized and a structured document is being the mainstream of an electronic document.

This structured document is normally structured according to a classification called a document class in which the structural constraint of the structure and components of a document are defined. In ODA, generic logical structure corresponds to the document class and in SGML, data type definition (DTD) plays the role of the document class.

It includes important meaning that the document structure of a structured document complies with the constraint of a document class. For example, a rule for laying out structured documents often premises that document structure and its components meet the constraint of a specific document class. Therefore, if document structure deviates from the constraint of a document class, correct layout cannot be output.

Many programs for processing many structured documents such as listing abstracts out of a group of reports utilize a target document being composed according to a specific document class. When such a program is used, the existence of a document which does not comply with a specific document class may prevent the execution of the program. Further, in a database which deals with structured documents, a document class is often utilized as a schema and the existence of data which deviates from a schema greatly deteriorates the responsibility of a database.

From such a viewpoint, a request for adapting the structure of a document to a document class and effectively utilizing the advantage of a structured document is made. A request for converting a structured document adapted to a document class A to a structured document adapted to another document class B or converting a document composed by a flat text without a specific document structure to a structured document adapted to a specific document class is also made to reuse a document.

Paper is still used in many cases as a medium for conveying a document. Therefore, there are also many needs for receiving the benefit of structurization by converting a document including an image on paper to a structured document according to a specific document class.

However, work for adapting the structure of a document to a specific document class sometimes imposes a load upon a user.

It is not difficult so much to create a new document according to a specific document class. However, the conversion of an existing document to a structured document according to a specific document class includes a large problem.

Document data and document image conversion consume time. The quantity of data is often enormous and it is difficult to perform conversion only by manual methods. In addition, a lot of costs should not be expended because new information is not produced by this conversion.

There are some techniques required to solve such a problem and to automatically convert an arbitrary document to a structured document. Assuming that the structure of any document can be expressed by tree structure, it will be described below.

First, a method of converting a structured document according to the document class A to a structured document according to another document class B can be facilitated by applying the concept of "a fall back class" described on pages 209 to 216 of No. 4 in Vol. 5 of Editing Structured Documents—Problem and solutions (Electronic Publishing) written by Messrs. Fred Cole and Heather Brown. That is, it is defined as a rule to which type of a node defined in the document class B the type of a node defined in the document class A is converted. When conversion is executed, each node included in a document structure according to the document class A is converted to each node included in another document structure according to the document class B one by one based upon a predefined rule.

A method of converting a document composed by flat text to a structured document is disclosed in Japanese Published Unexamined Patent Application No. Sho 63-286963. That is, the title of a chapter or a section, and a paragraph in text are determined based upon the characteristics of a character string in flat text and a structured document can be composed based upon them.

If a document including an image is converted to a structured document, a method disclosed in Japanese Published Unexamined Patent Application No. Hei 6-214983 can be used. That is, the title of a chapter or a section, and a paragraph, a header and a footer in text are determined based upon the characteristics of layout and a structured document can be composed based upon them.

However, there is a problem in the above any technique that it is difficult to supplement a node and a subtree both required for the structural constraint of a desired document class if conversion to various document classes has to be executed.

In conversion applying a fall back class, the structure of a converted document does not always comply with the constraint of the document class B. Only nodes which exist in document structure before conversion also exist in document structure after conversion. That is, a node which does not exist in document structure before conversion cannot be generated and a node the corresponding node of which does not exist in document structure before conversion is dropped out in document structure after conversion. The shortage of nodes often causes the constraint of a document class not to be met. Then, this method cannot be practically used.

In document conversion disclosed in Japanese Published Unexamined Patent Application No. Sho 63-286963, a node which can be created is only a node which exists in text and has a characteristic character string which can be used to determine structure and a predetermined node (that is, a coded node in a processing program the type and the complemented position of which are predetermined) required for connecting the above nodes into a structure.

In document conversion disclosed in Japanese Published Unexamined Patent Application No. Hei 6-214983, a node which can be created is only a node which exists in a document including an image and has characteristic layout which can be used to determine structure and a predetermined node (that is, a coded node in a processing program the type and the complemented position of which are predetermined) required for connecting the above nodes.

That is, in the above document conversion, flat text and a document including an image can only be converted to a structured document which completely meets the structural constraint of the document class which is premised by the program used in conversion.

A method of complementing a node and a subtree in accordance with a desired document class is disclosed in Japanese Published Examined Patent Application No. Hei 6-12542. A function for automatically complementing a required node when it finds lack of a node by matching a part of structured document with the definition of the document class if the part of structured document is copied in another part is disclosed in the Japanese Published Examined Patent Application No. Hei 6-12542.

However, the method of automatically complementing a node and a subtree in document structure by matching with the definition of a document class includes the following great problems:

A first problem is that it is not considered that complementation in an area in document structure has an effect upon whether another area of the document structure is suitable for the document class or not, or what complementation is to be performed in another area and vice versa. That is, complementation is to be performed in document structure not based upon only a specific local area in the document structure but based upon the structure of the whole document.

A second problem is that a user has no way to select one method from plural (sometimes infinite) methods of complementing which are suitable for a document class. That is, as a method of complementing cannot be selected by a user, the user has no means for preventing the result of bad complementation from being output.

For a method of solving the above problems, a method of a user himself/herself editing document structure and adapting it to the constraint of a desired document class can be also naturally considered. However, it is work requiring a heavy load to determine a part in which a node is to be supplemented after the structure of the whole document is grasped. Even if a location to be complemented is successfully found, it is very difficult to suitably complement so that the complementation meets the constraint of a document class. It is actually impossible to apply this method to a long document and many documents.

SUMMARY OF THE INVENTION

The present invention is made to solve such problems and the object is to provide a document structure composing apparatus which can compose document structure desired by a user by always performing complementation suitable for a desired document class if a node and a subtree are supplemented in document structure.

To solve the above problems, according to the present invention, there is provided a document structure composing apparatus for composing document structure which meets the structural constraint of a predetermined document class and characterized in that complementation specification storage means for storing the element type of a component which is required to complement a pre-complemented document structure composed according to a procedure, which does not meet the structural constraint of a first document class, to adapt it to the first document class, and for storing a specification of complementation correlating to the element type and complementation means for analyzing said pre-complemented document structure based upon the structural constraint of said first document class and said specification of complementation and composing document structure by supplementing a component which is short in said pre-complemented document structure.

According to this document structure composing apparatus, the complementation specification storage means stores the specification of complementation for correlating the type of a component the complementation of which is estimated to be required when pre-complemented document structure composed according to a predetermined procedure is adapted to the document class. The complementation means analyzes the pre-complemented document structure based upon the structural constraint of the document class and the specification of complementation and composes a document structure by adding a component insufficient to make the document structure meet the structural constraint of the document class to the pre-complemented document structure.

According to this constitution, complementation which is always suitable for a desired document class can be performed and a structured document desired by a user can be composed.

BRIEF DESCRIPTION OF THE DRAWINGS

FIG. 4 shows the type definition of nodes out of the definition information of a document class titled Technical memorandum;

FIG. 6 shows the type definition of nodes out of the definition information of a document class titled Technical report;

DETAILED DESCRIPTION OF PREFERRED EMBODIMENTS

Figure 1:
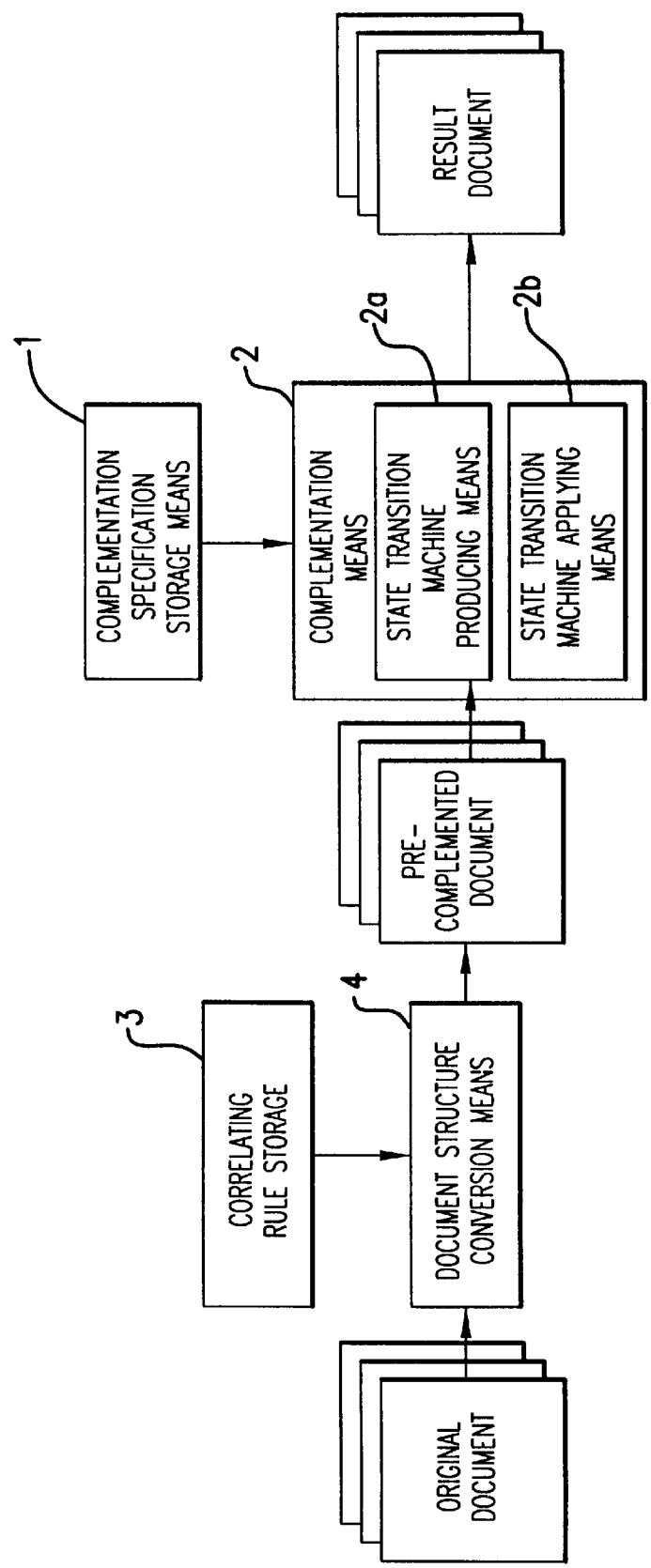
FIG. 1 is a block diagram showing the principle of a document structure composing apparatus according to the present invention.

Referring to drawings, embodiments according to the present invention will be described below. FIG. 1 is a block diagram showing the principle of a document structure composing apparatus according to the present invention.

A document structure composing apparatus according to the present invention is constituted by complementation specification storage means 1 for storing the specification of complementation for a document, complementation means 2 for complementing a document structure and composing a new structured document, correlating rule storage means 3 for storing a rule for correlating the type of a component between different document classes and document structure conversion means 4 for converting an original document which meets the structural constraint of a specific document class so that it is provided with structure nearly according to another document class according to the correlating rule.

As shown in FIG. 1, an original document means a document which meets the structural constraint of a document class before conversion and also includes a document composed by flat text and a document including an image. A pre-complemented document means a document converted from the original document nearly to comply with the structural constraint of a desired document class. However, the type of a component in the original document and that in a desired document class does not necessarily correspond and complementing processing is required so that a pre-complemented document complies with a desired document class. A result document is composed by complementing the document structure of a pre-complemented document and adapting it to a desired document class.

Complementation specified by a user is stored in the complementation specification storage means 1.

The complementation means 2 is constituted by state transition machine producing means 2a for producing a state transition machine for complementation based upon the specification of complementation and the definition of a desired document class and state transition machine applying means 2b for applying the produced state transition machine to a pre-complemented document and composing a structured document.

The correlating rule storage means 3 stores the definition of various document classes and rules for correlating the component type of each document class and if requested, required definition and correlating rule are output.

The document structure conversion means 4 first analyzes an original document and recognizes the components and document structure of the original document. Afterward, document structure is converted based upon a correlating rule so that document structure is adapted to a desired document class.

Figure 2:
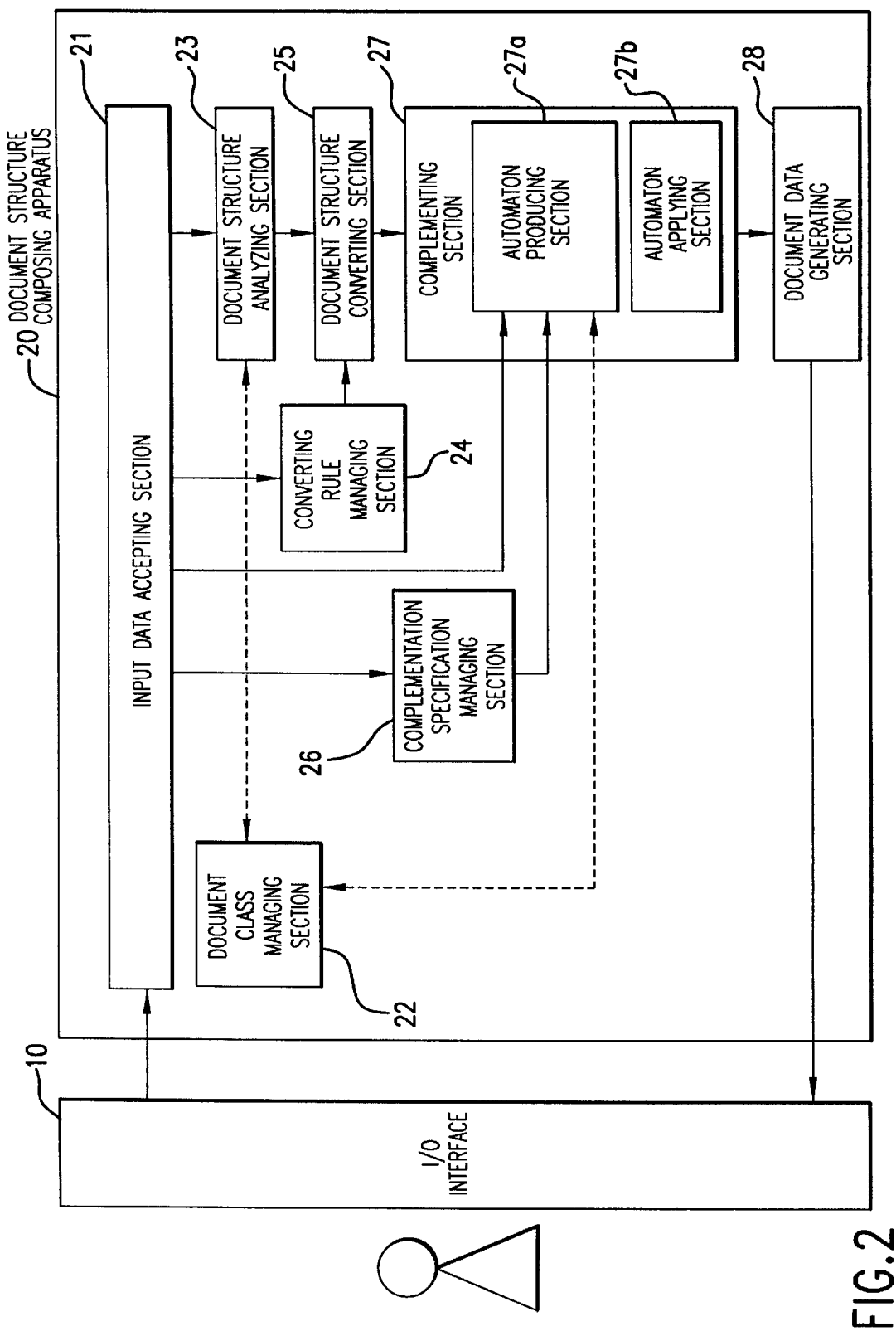
FIG. 2 is a block diagram showing the configuration of a first embodiment of the document structure composing apparatus.

Next, the detailed configuration of a first embodiment according to the present invention will be described. FIG. 2 is a block diagram showing the configuration of the first embodiment of a document structure composing apparatus. The correspondence between the configuration shown in FIG. 1 and the configuration shown in FIG. 2 will be described after the description of FIG. 2.

Data required for composing a result document is input to a document structure composing apparatus 20 according to the present invention via an I/O interface 10 by a user, a result document is composed based upon the input data and the composed result document is output to the user via the I/O interface 10.

In this case, the required data includes original document data to be converted, the document class name of the original document data (an input document class name) and another document class name showing to which document class the original document data is to be converted (an output document class name). Though the details are described later, complementation can be also simultaneously specified.

The document structure composing apparatus 20 is constituted by an input data accepting section 21 for accepting input data, a document class managing section 22 for managing the definition information of a document class, a document structure analyzing section 23 for analyzing input original document data, a converting rule managing section 24 for managing a rule of conversion between different document classes, a document structure converting section 25 for converting document structure, a complementation specification managing section 26 for managing the specification of complementation, a complementing section 27 for processing complementation and a document data generating section 28 for outputting a result document as document data.

When the input data accepting section 21 accepts the input of data via the I/O interface 10, it outputs original document data to the document structure analyzing section 23, outputs an input document class name to the document structure analyzing section 23, the converting rule managing section 24 and the complementation specification managing section 26, and outputs an output document class name to the converting rule managing section 24, the complementation specification managing section 26 and an automaton producing section 27*a* in the complementing section 27.

The document class managing section 22 stores and manages all the definition information of document classes which can be processed by this document structure composing apparatus 20 and supplies definition information in response to the request of each section. The flow of the request of document class definition information to the document class managing section 22 and the flow of the supply of document class definition information from the document class managing section 22 in FIG. 2 are shown by a broken line.

The document structure analyzing section 23 recognizes an input document class name and requests the definition information of the corresponding document class to the document class managing section 22. When the document structure analyzing section receives the supplied definition information, it checks original document data with the definition information, analyzes the logical structure and sends correspondence between the component of the original document data and the component type of the input document class to the document structure converting section 25.

The converting rule managing section 24 stores and manages all converting rules defining how the component type of a document class is to be converted to that of a document class which is an output document class. When an input document class name and an output document class name are input, a converting rule corresponding to the two document class names is supplied to the document structure converting section 25.

The correspondence between the component of original document data and the component type of an input document class is supplied from the document structure analyzing section 23 to the document structure converting section 25 and a rule for converting the input document class to an output document class is supplied from the converting rule managing section 24 to the document structure converting section 25. Afterward, the original document data is converted based upon the supplied converting rule and pre-complemented document data is composed. The pre-complemented document data is sent to the complementing section 27.

The complementation specification managing section 26 stores and manages the specification of complementation specifying what complementation is to be performed for the component type of document classes which can be processed by this document structure composing apparatus 20 with an input document class name and an output document class name. When the input document class name and the output document class name are input, the specification of complementation corresponding to the two document class names is supplied to the complementing section 27. A user can specify complementation and update the specification of complementation if necessary. In this case, the user is required to input the specification of complementation in addition to original document data, an input document class name and an output document class name.

The complementing section 27 is constituted by the automaton producing section 27*a* and the automaton applying section 27*b* and performs complementation on a pre-complemented document utilizing a state transition machine called an automaton. The automaton producing section 27*a* requests the definition information of an output document class from the document class managing section 22 based upon the output document class name input from the input data accepting section 21 and produces a complementing automaton based upon the above information and the specification of complementation supplied from the complementation specification managing section 26. The automaton applying section 27*b* complements a pre-complemented document utilizing the complementing automaton produced by the automaton producing section 27*a* and composes document structure according to the output document class.

The document data generating section 28 converts the document structure composed by the complementing section 27 to result document data and outputs the converted result document data to a user via the I/O interface 10.

Referring to correspondence between the configuration shown in FIG. 1 and the configuration shown in FIG. 2, the complementation specification storage means 1 shown in FIG. 1 corresponds to the complementation specification managing section 26 shown in FIG. 2, the complementation means 2 corresponds to the complementing section 27, the correlating rule storage means 3 corresponds to the converting rule managing section 24 and the document structure conversion means 4 corresponds to the document structure converting section 25. The state transition machine producing means 2a corresponds to the automaton producing section 27a and the state transition machine applying means 2b corresponds to the automaton applying section 27b.

Figure 3:
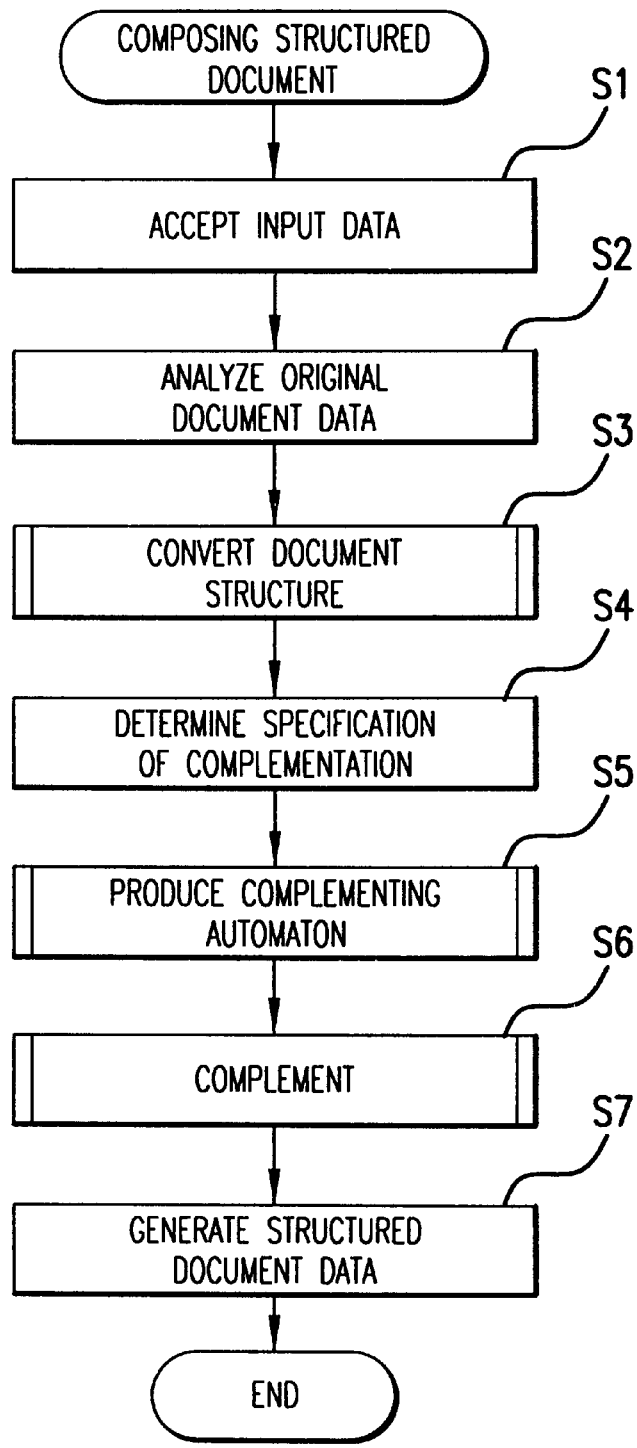
FIG. 3 is a flowchart showing a procedure for composing a structured document.

Next, a procedure for composing a structured document using this document structure composing apparatus 20 will be described. FIG. 3 is a flowchart showing a procedure for composing a structured document. The flowchart will be described in the order of step numbers in the drawing.

[S1] The input data accepting section 21 accepts input data via the I/O interface 10. Input data includes original document data to be structured, the current document class name of the original document data (an input document class name) and another document class name (an output document class name) to which structurization is desired. If a user desires, the input data accepting section 21 also accepts the specification of complementation.

[S2] The document structure analyzing section 23 analyzes the original document data based upon the definition information of an input document class and extracts document structure. Definition information required for analyzing a document can be obtained by requesting it from the document class managing section 22 based upon an input document class name input from the input data accepting section 21.

[S3] The converting rule managing section 24 determines a converting rule based upon the input document class name and an output document class name and supplies it to the document structure converting section 25. The document structure converting section 25 converts the document structure of an original document based upon the supplied converting rule and composes a pre-complemented document. A procedure for this conversion will be described in detail later.

[S4] The complementation specification managing section 26 determines the specification of complementation and supplies it to the complementing section 27. For the specification of complementation, if the specification by a user is included in input data, the specification of complementation is used and if the specification by a user is not included, the specification of complementation selected based upon the input document class name and the output document class name is used.

[S5] The automaton producing section 27a in the complementing section 27 produces a complementing automaton based upon the definition information of the output document class and the supplied specification of complementation. A procedure for producing this complementing automaton will be described in detail later.

[S6] The automaton applying section 27b in the complementing section 27 actually operates the complementing automaton, performs complementation in a pre-complemented document and composes document structure according to a desired document class. The composed document structure is sent to the document data generating section 28. A procedure for composing document structure will be described in detail later.

[S7] The document data generating section 28 generates structured document data based upon the sent document structure, outputs it to a user via the I/O interface and terminates this processing. If a structured document cannot be composed correctly, the effect is informed a user.

Next, a document class and the definition information will be described in detail. The document class managing section 22 stores a pair of the name of a document class and the definition information of the document class for one document class. Plural document classes are stored in the document class managing section 22, however, the name of an individual document class is unique in this document structure composing apparatus 20.

The definition information of a document class is constituted by the definition of the type of a node constituting document structure and a structural constraint defining the relationship of the connection of the defined node. Document structure which meets the definition information of a specific document class is called the document structure of the document class. Document data provided with the document structure of the document class is called the document data of the document class.

The definition of the type of a component (node) constituting document structure consists of the following two elements. That is, the two elements are a type name which is a character string for identifying the type of a node and contents—type specification showing the type of the contents of a node. This contents-type specification means selecting one of three types of having no contents, having the contents of a character string type and having the contents of a geometric type. A type the type name of which is 'A' is called a type A and the node of the type A is called a node A.

A structural constraint defining the relationship of the connection of a defined node is defined by tree structure composed by the following constrainer of structure and the above definition of the type of a node. For the structure constrainer, there are three types of SEQ, REP and CHO and they have the respective following meaning.

The constrainer of structure SEQ is provided with plural subordinate structures and shows that structure defined by the subordinate structures appears in the defined order.

The constrainer of structure REP is provided with single subordinate structure and shows that structure defined by the subordinate structure appears repeatedly over once.

The constrainer of structure CHO is provided with plural subordinate structures and shows that any of the structures defined by the subordinate structure appears.

It is supposed that the document structure composing apparatus 20 according to the present invention stores plural document classes named a technical memorandum and named a technical report in the document class managing section 22.

FIG. 4 shows the definition of the type of a node of the definition information of a document class named a technical memorandum. According to the definition 101 of the type of the nodes in the document class named a technical memorandum, this document class has a node titled Technical memorandum having no contents, a node showing the head of a sentence having no contents, a node showing the title of memorandum having the contents of a character string type, a node showing an author having the contents of a character string type, a node showing a mail address having the contents of a character string type, a node showing a section having no contents, a node showing a title having the contents of a character string type, a node showing a paragraph having the contents of character string type, a node showing an artwork having no contents, a node showing a caption having the contents of a character string type and a node showing a figure having the contents of a geometric type.

Figure 5:
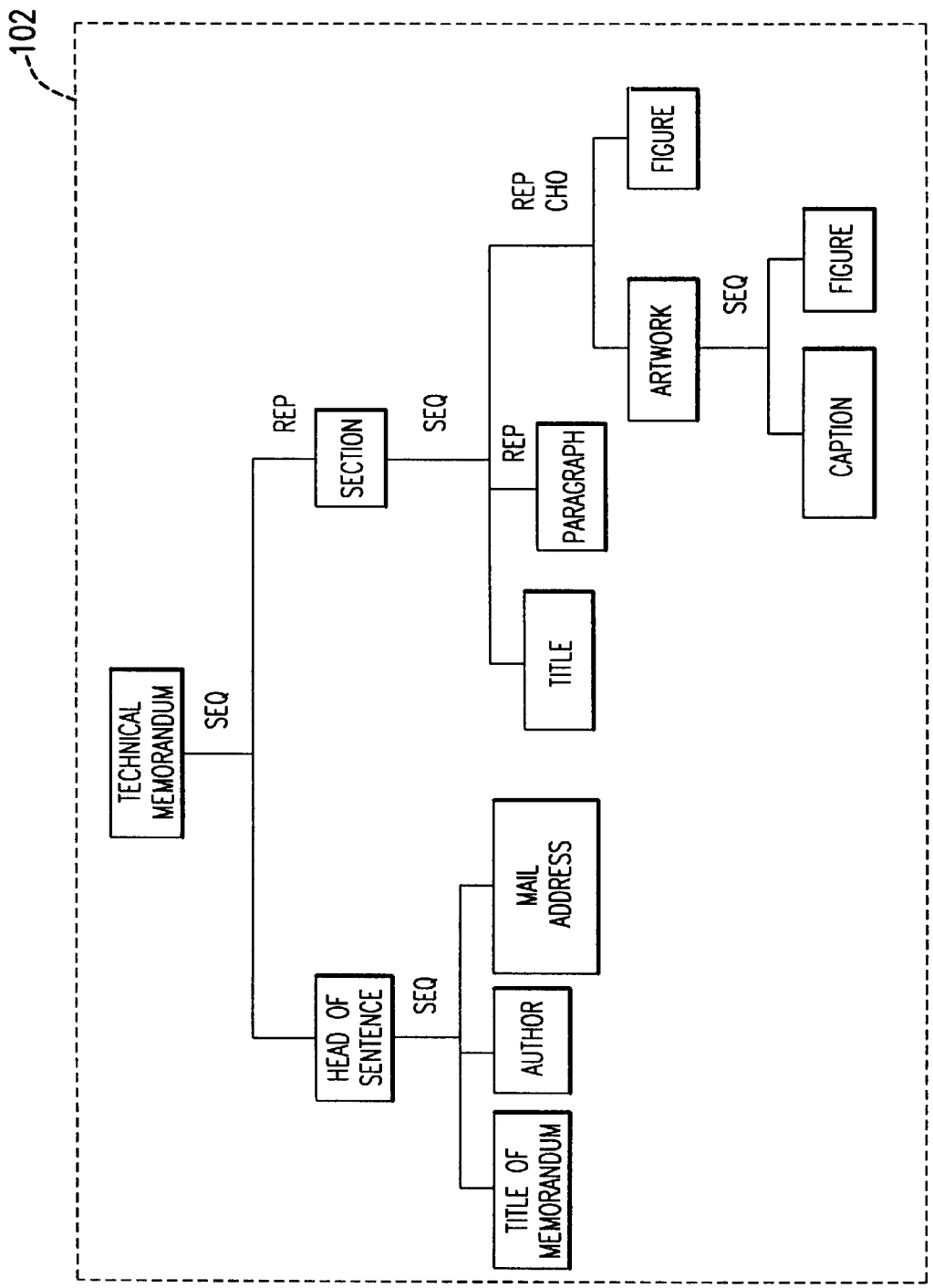
FIG. 5 shows structural constraint defining the connectional relationship among the defined nodes out of the definition information of the document class titled Technical memorandum.

FIG. 5 shows a structural constraint defining the relationship of the connection of the defined nodes of the definition information of the document class named a technical memorandum. According to the structural constraint 102 of the document class named a technical memorandum, this document class has one node showing the head of a sentence and one or more nodes showing a section which appear repeatedly under the node titled Technical memorandum. The node showing the head of a sentence has a node showing the title, a node showing the author and a node showing the mail address as the subordinate structure. The node showing a section has a node showing a title, one or more nodes showing a paragraph which appear repeatedly and one or more nodes showing an artwork which appear repeatedly or a node showing a figure. The node showing an artwork has a node showing a caption and a node showing a figure.

FIG. 6 shows the definition of the type of a node of the definition information of the document class named a technical report. According to the definition 501 of the type of the node titled Technical report, this document class has a node titled Report having no contents, a node showing a header having no contents, a node showing the title of a report having the contents of a character string type, a node showing an author having no contents, a node showing the name having the contents of a character string type, a node showing the address having the contents of a character string type, a node showing the date of revision having no contents, a node showing the date having the contents of a character string type, a node showing a section having no contents, a node showing the title having the contents of a character string type, a node showing a paragraph having the contents of a character string type, a node showing an artwork having no contents, a node showing the caption having the contents of a character string type and a node showing a figure having the contents of a geometric type.

Figure 7:
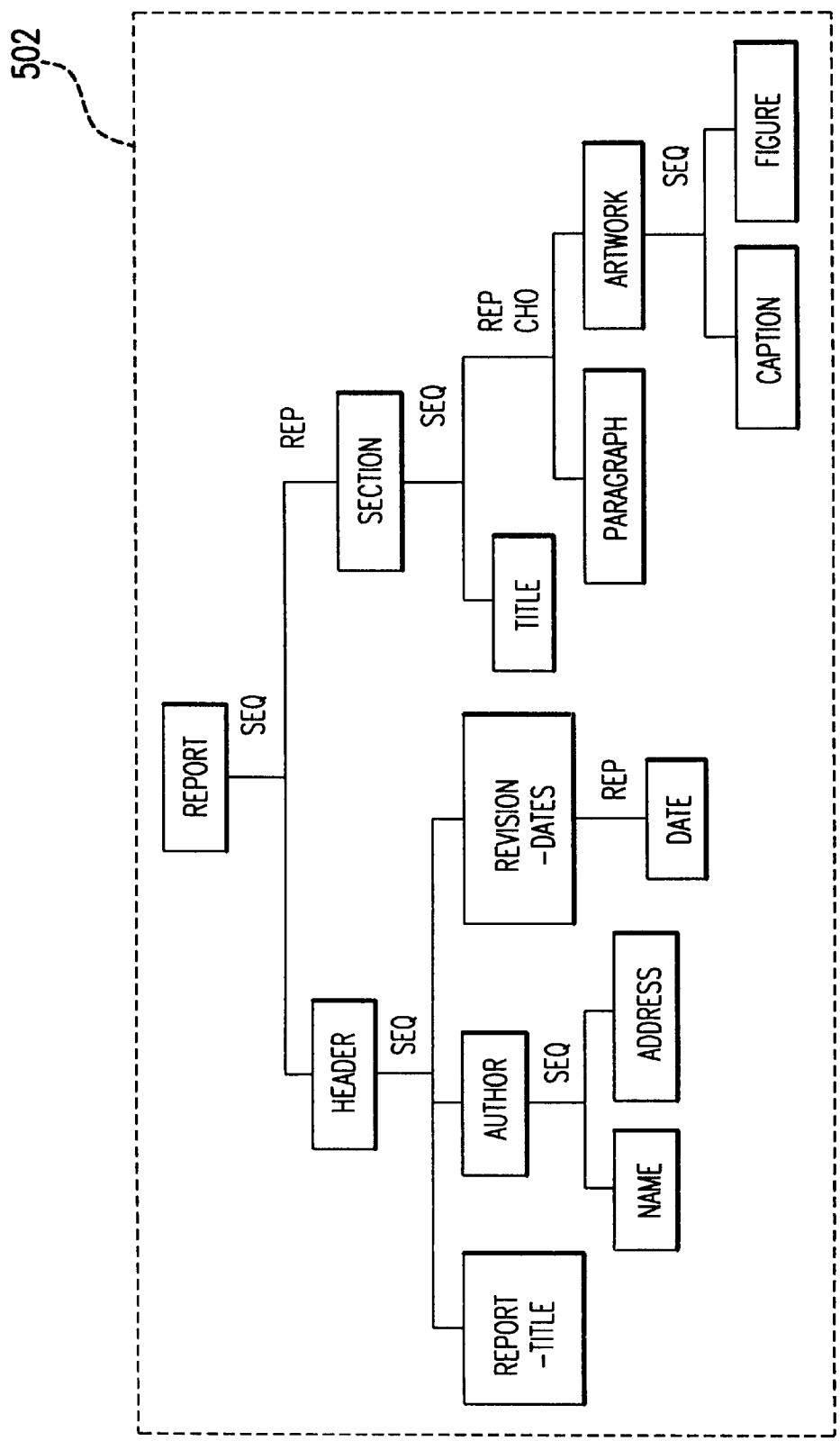
FIG. 7 shows structural constraint defining the connectional relationship among the defined nodes out of the definition information of the document class titled Technical report.

FIG. 7 shows a structural constraint defining the relationship of the connection of the defined nodes of the definition information of the document class named a technical report. According to the structural constraint 502 of the document class named a technical report, this document class has one node showing a header and one or more nodes showing a section which appear repeatedly under the node titled Report. The node showing a header has a node showing the title of the report, a node showing an author and a node showing the date of revision as the subordinate structure. Further, the node showing an author has a node showing the name and a node showing the address and the node showing the date of revision has one or more nodes showing the date which appear repeatedly. The node showing a section has a node showing the title and one or more nodes showing a paragraph which appear repeatedly or a node showing an artwork. The node showing an artwork has a node showing the caption and a node showing a figure.

If document data which meets the definition of the document class named a technical memorandum is actually input as an original document to the document structure composing apparatus defining and storing the document class named a technical memorandum as described above, it will be described below how the document data is analyzed. It is supposed that the document structure analyzing section 23 in the document structure composing apparatus 20 shown in FIG. 2 executes analysis and a document class named a technical memorandum is input. This analysis corresponds to the step S2 in the flowchart showing the procedure for composing a structured document shown in FIG. 3.

Figure 8:
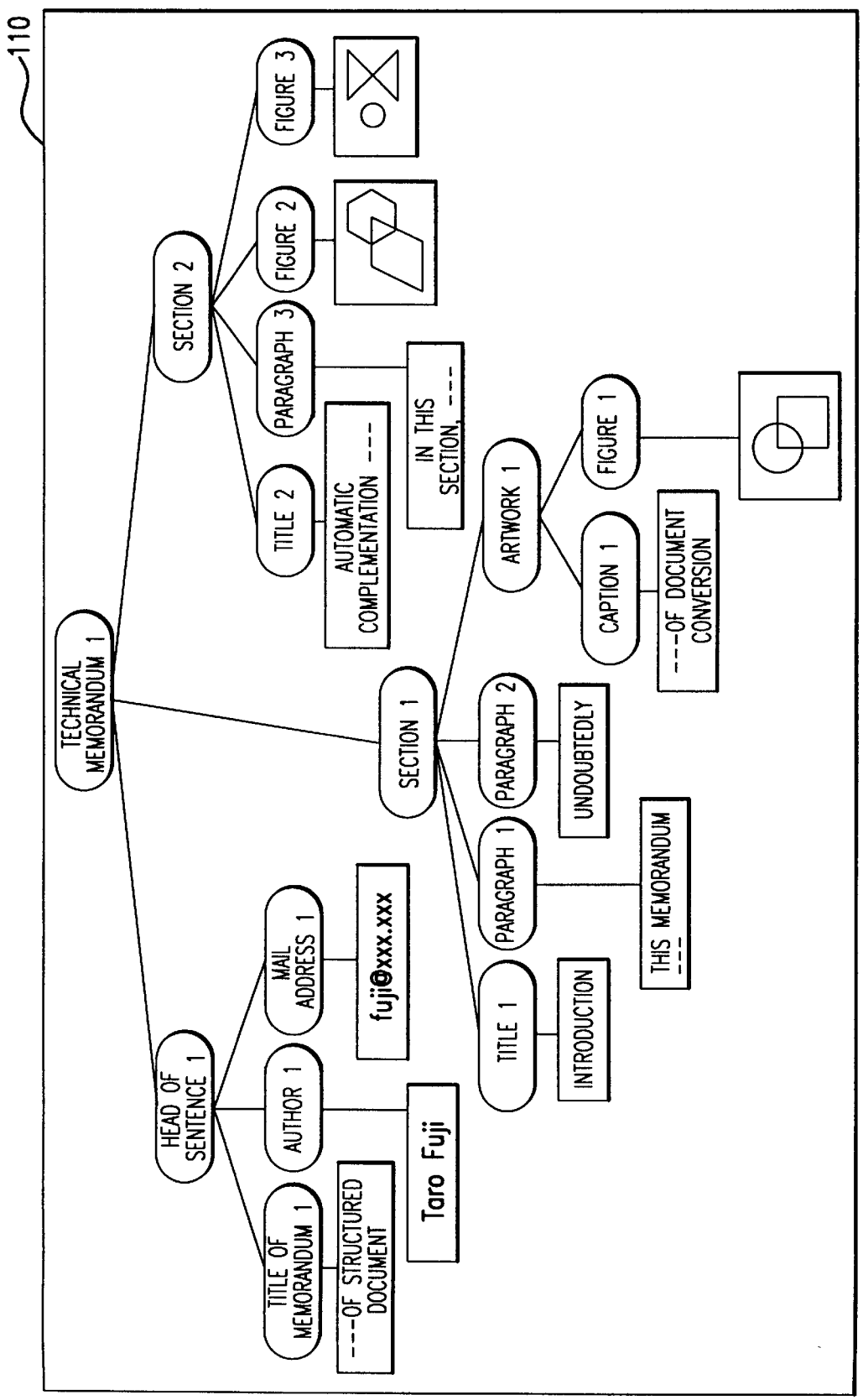
FIG. 8 shows an example of a structure generated by analyzing document data titled Technical memorandum based upon definition information and document structure is extracted.

FIG. 8 shows an example of the result of analyzing document data named a technical memorandum based upon definition information and extracting document structure. As the result 110 of analyzing the document structure of the document data named a technical memorandum, a node is represented in an ellipse and a character string in an ellipse shows the type name of a node. The contents of a node is represented in a rectangle immediately under the node, for a node having the contents of a character string type, a character string type is shown as the contents of the node and for a node having the contents of a geometric type, a geometric figure is shown as the contents of the node.

In this example, the document structure of an original document is shown in tree structure with the node titled Technical memorandum as a root. A node showing a title of memorandum 1 started by " - - - of a structured document", a node showing an author 1, "Taro Fuji" and a node showing a mail address 1, "fuji@xxx. xxx" are included in a node showing the head of a sentence 1. A node showing a title 1, "Introduction", a node showing a paragraph 1 started by "This memorandum - - - ", a node showing a paragraph 2 started by "Undoubtedly, - - - " and a node showing an artwork 1 including a node showing a caption 1 started by " - - - of document conversion" and a node showing a FIG. 1 are included in a node showing a section 1. A node showing a caption 2, "Automatic complementation", a node showing a paragraph 3 started by "In this section, - - - ", a node showing a FIG. 2 and a node showing a FIG. 3 are included in a node showing a section 2.

Next, the conversion of document structure described in the step S3 shown in FIG. 3 will be described in detail, however, before it, a converting rule utilized for the converting document structure will be described. The rules for converting all document classes which can be recognized by the document structure composing apparatus 20 are stored together with an input document class name and an output document class name in the converting rule managing section 24. Therefore, the converting rule managing section 24 which receives the input of an input document class name and an output document class name from a user via the I/O interface 10 and the input data accepting section 21 calls a converting rule stored together with the corresponding two document class names and supplies it to the document structure converting section 25.

The converting rule itself is the set of a pair of a type name (an input type name) defining a type included in the definition of an input document class and a type name (an output type name) defining a type included in the definition of an output document class. In an individual pair, a node (an input node) of a type specified by an input type name is converted to a node (an output node) of a type specified by an output type name. The contents accompanied by the input node at this time become those of the output node as they are.

There are the following three constraints in this converting rule.

First, plural pairs with the same input type name should not exist in the same converting rule. That is, a converting rule such as converts one input node to plural output nodes cannot be recognized.

Second, the contents-type specification of types constituting a pair should be coincident. This is because an input node having the contents of a character string type can be converted to only an output node defined as having the contents of a character string type. Similarly, an input node of a geometric type can be converted to only an output node of a geometric type and an input node having no contents can be converted to only an output node having no contents.

Therefore, a converting rule including a pair the contents-type specification of which is not coincident cannot be recognized.

Third, converting rules are required to cover all types included in the definition of an input document class. That is, this means that all input nodes are required to be converted to output nodes in any form.

A converting rule in consideration of the above constraints and set so that the above document class named a technical memorandum is an input document class and the above document class named a technical report is an output document class will be described concretely below.

Figure 9:
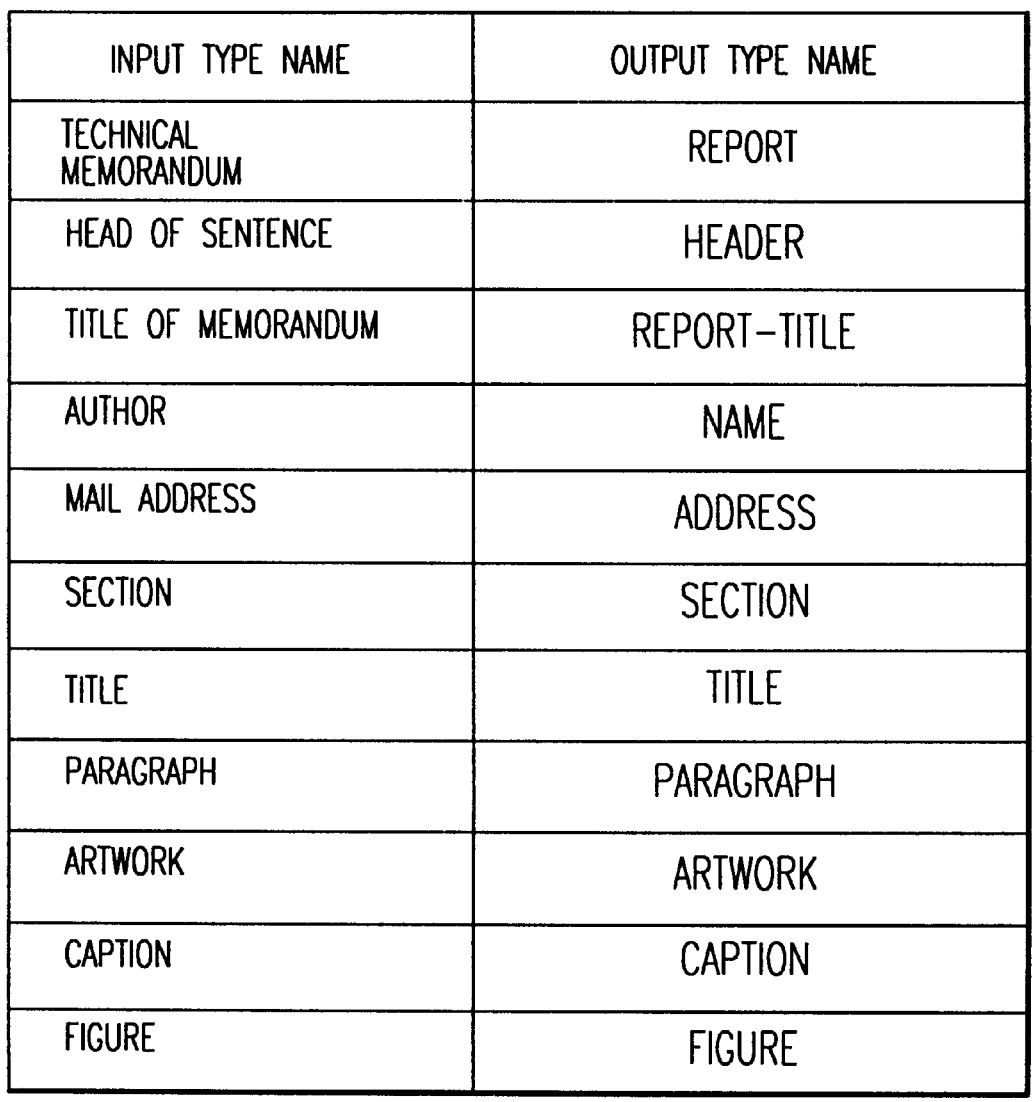
FIG. 9 shows a converting rule of an input document class name of Technical memorandum and an output document class name of Technical report.

FIG. 9 shows a converting rule in which an input document class name is a technical memorandum and an output document class name is a technical report. This converting rule 200 is stored together with the input document class name of Technical memorandum and the output document class name of Technical report in the converting rule managing section 24 and when both document class names are input, they are supplied to the document structure converting section 25.

According to this converting rule, if the document data of the document class named a technical memorandum is converted to the document data of the document class named a technical report, an input node titled Technical memorandum is converted to an output node titled Report. Similarly, an input node named Sentence head is converted to an output node named Header, an input node named Title of memorandum is converted to an output node named Report title, an input node named Author is converted to an output node named Name, an input node named Mail address is converted to an output node named Address, an input node named Section is converted to an output node named Section, an input node named Title is converted to an output node named Title, an input node named Paragraph is converted to an output node named Paragraph, an input node named Artwork is converted to an output node named Artwork, an input node named Caption is converted to an output node named Caption and an input node named Figure is converted to an output node named Figure.

If document structure is converted actually utilizing the above converting rules, the procedure of processing will be described below.

Figure 10:
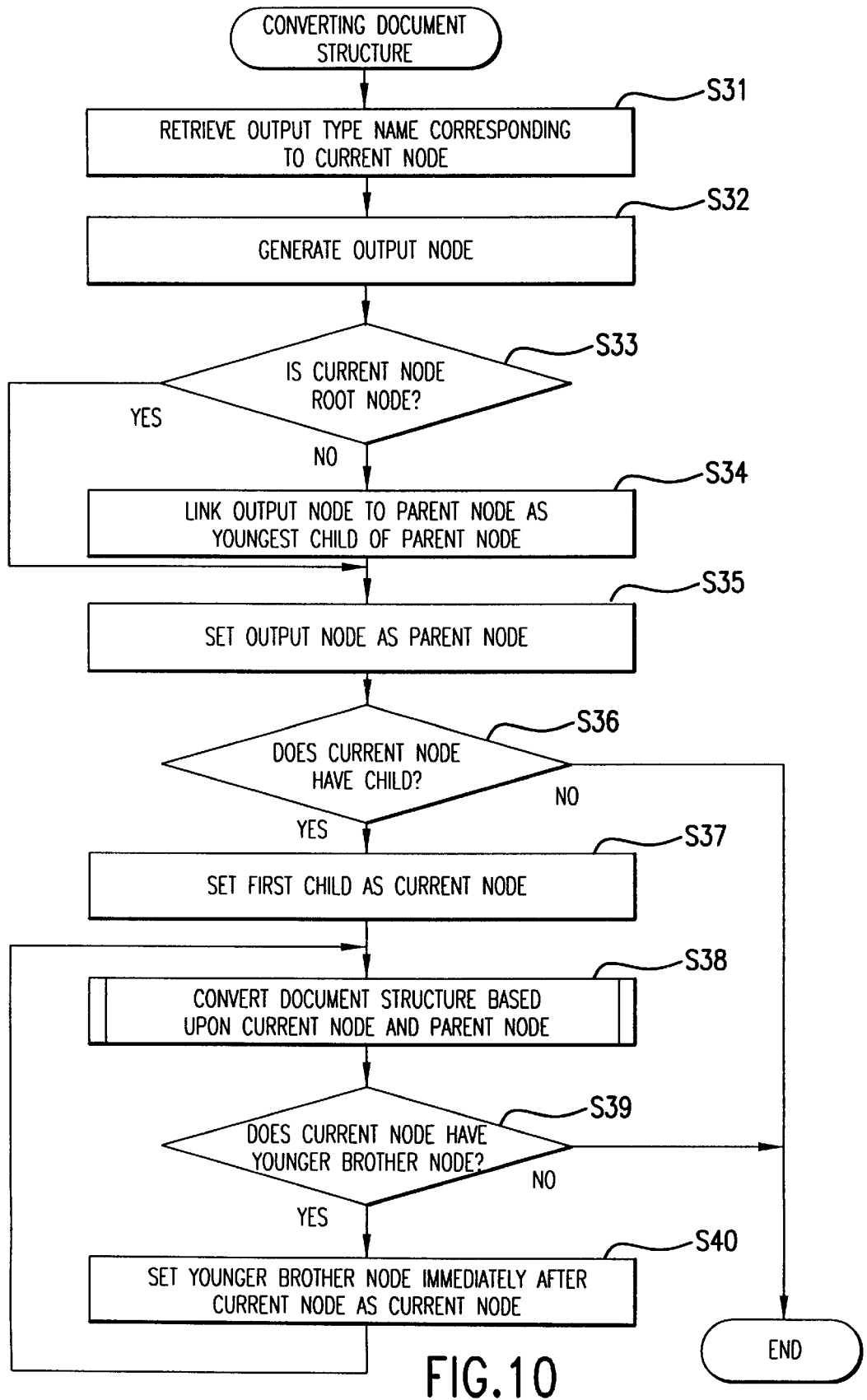
FIG. 10 is a flowchart showing the detailed procedure for converting document structure.

FIG. 10 is a flowchart showing the detailed procedure for converting document structure. This processing corresponds to the step S3 shown in FIG. 3 and the document structure converting section 25 which receives a converting rule executes conversion. Conversion will be described below in the order of step numbers shown in FIG. 10.

In this document structure converting processing, it is supposed that one of nodes in input document structure is a current node and one of output nodes composed by conversion is a parent node. When processing is started, the root node in input document structure is the current node. In that case, a parent node is undefined.

[S31] A converting rule pair with the type name of the current node as its input type name is retrieved from the converting rule 200 and the corresponding output type name is obtained.

[S32] An output node is generated based upon the output type name obtained in the step S31. If the current node has the contents, the contents are copied and are used as those of the generated output node.

[S33] It is judged whether the current node is a root node or not. If the current node is the root node, processing proceeds to a step S35 and if it is not the root node, processing proceeds to a step S34.

[S34] It means at least one or more output nodes are already generated and they have their parent node in this processing that the current node is not the root node. Therefore, the output node generated in the step S32 is linked to a parent node as youngest child.

[S35] The output node generated in the step S32 is set to a new parent node.

[S36] It is judged whether the current node has a child or not. If the current node has a child node, processing proceeds to a step S37 and if it has no child node, this processing is terminated.

[S37] The first child node of the current node is a new current node.

[S38] As a new parent node and a new current node are determined in the above processing, document structure converting processing is again executed recursively using these two. That is, processing from the step S31 to the end of this flowchart is executed based upon the parent node and the current node determined at this time. When this processing is finished, processing proceeds to a next step S39.

[S39] It is judged whether the current node has a younger brother node or not. If the current node has a younger brother node, processing proceeds to a step S40 and if it has no younger brother node, this processing is terminated.

[S40] A younger brother node immediately after the current node is set to a new current node.

An example in which the document data named a technical memorandum shown in FIG. 8 is converted to the document data of a document class named a technical report according to the converting rule 200 shown in FIG. 9 will be described below.

Figure 11:
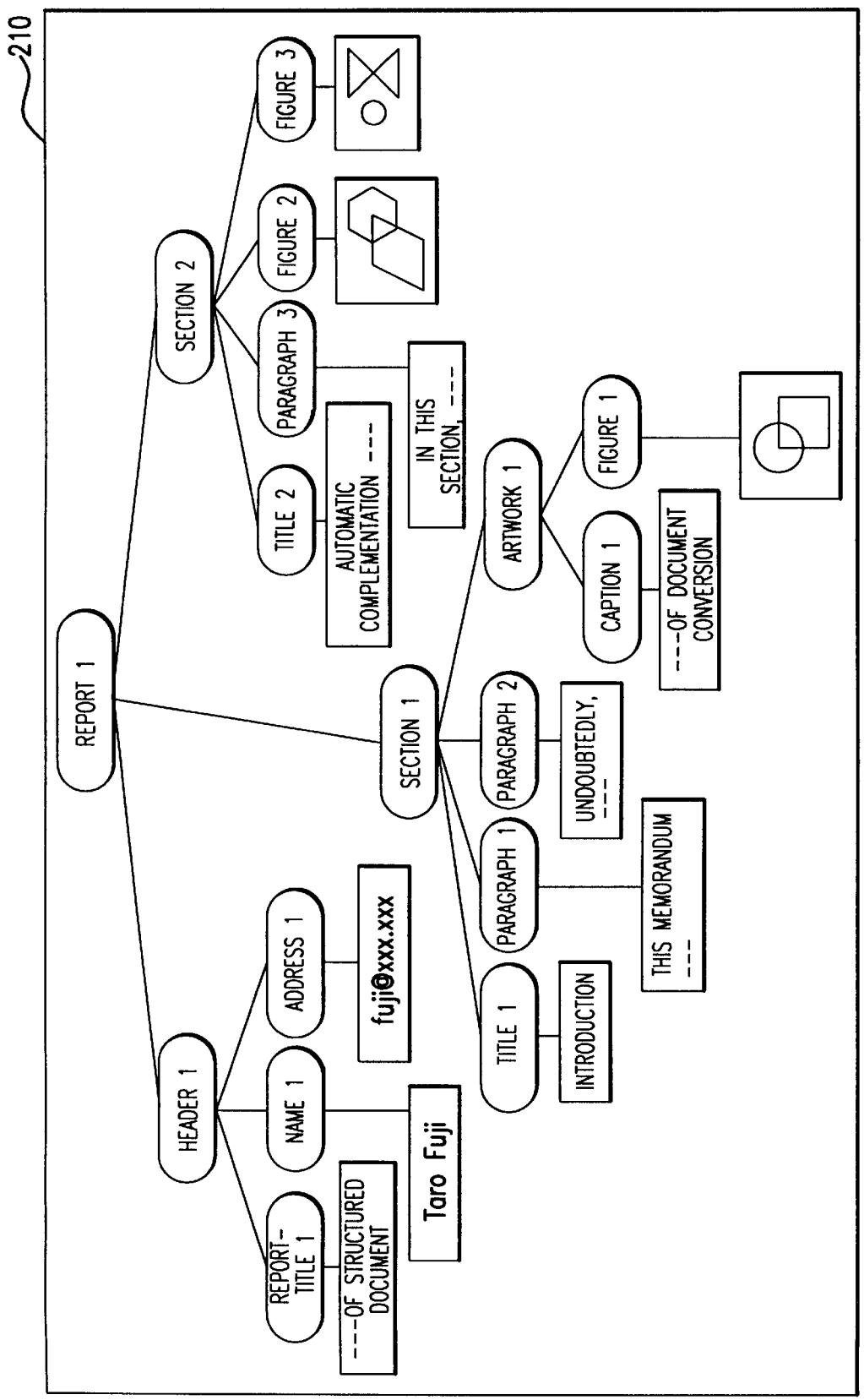
FIG. 11 shows the structure of a document before complementation which is generated by conversion from the document data titled Technical memorandum is converted to the document data of the document class titled Technical report.

FIG. 11 shows the structure of a pre-complemented document in case document data named a technical memorandum is converted to document data named a technical report. The pre-complemented document structure 210 has the whole contents of the node as the result 110 of analyzing the document structure of document data named a technical memorandum shown in FIG. 8 and is constituted nearly according to the document class named a technical report.

However, the pre-complemented document structure 210 does not completely meet the structural constraint 502 shown in FIG. 7. Even if only the node showing a header is adopted as an example, a node showing an author, a node showing the date of revision and a node showing the date are short and this document structure 210 cannot be called the document data of a document class named a technical report.

To compose document structure according to a desired document class based upon such pre-complemented document structure, complementation is performed according to the present invention. This complementation means processing for supplementing a node and a subtree which are short in pre-complemented document structure. A procedure for producing a complementing automaton as a state transition machine used for this complementation will be described below, however, before it, the specification of complementation required for producing the complementing automaton and the complementing automaton will be described.

The specifications of complementation of all document classes which the document structure composing apparatus 20 can recognize are stored together with an input document class name and an output document class name in the complementation specification managing section 26. Therefore, when the complementation specification managing section 26 receives the input of an input document class name and an output document class name via the I/O interface 10 and the input data accepting section 21, it calls the specification of complementation set together with the corresponding two document classes and supplies it to the complementing automaton producing section 27a. In this document structure composing apparatus 20, complementation can be newly specified and updated if a user desires. When the complementation specification managing section 26 receives the input of the specification of new complementation from a user, it stores the specification and supplies it to the automaton producing section 27a.

The specification of complementation itself is the set of a pair of a type name (complemented type name) defining a type included in the definition of an output document class and the type of complementation (complementing action). An individual pair shows that a node (complemented node) of a type specified by a complemented type name is complemented by a method shown as a complementing action.

For a complementing action, there are four types of "addition", "addible", "insertion" and "insertion is allowed" and they respectively have the following means:

A complementing action, "addition" shows that a subtree with a node with a paired complemented type name as a root node is short in pre-complemented document structure and the subtree is required to be added according to the structural constraint of an output document class.

A complementing action, "addible" shows that if a subtree with a node with a paired complemented type name as a root node may be short in complemented document structure, the subtree may have to be added according to the structural constraint of an output document class.

A complementing action, "insertion" shows that a node with a paired complemented type name is omitted halfway in pre-complemented document structure and the node is required to be inserted according to the structural constraint of an output document class.

A complementing action, "insertion is allowed" shows that if a node with a paired complemented type name may be omitted halfway in pre-complemented document structure, the node may have to be inserted according to the structural constraint of an output document class.

There is a constraint in the specification of complementation that plural pairs with the same complemented type name should not exist in the same specification of complementation. That is, the specification of complementation in which plural complementing actions are taken for one complemented node cannot be recognized.

The specification of complementation in consideration of the above constraint and set so that the above document class "a technical memorandum" is an input document class and a document class "a technical report" is an output document class will be described concretely below.

Figure 12:
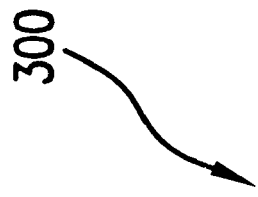
FIG. 12 shows the specification of complementation for the input document class name of Technical memorandum and the output document class name of Technical report.

FIG. 12 shows the specification of complementation in case an input document class name is a technical memorandum and an output document class name is a technical report. This specification of complementation 300 is stored together with the input document class name of Technical memorandum and the output document class name of Technical report in the complementation specification managing section 26 and when both document class names are input, the specification of complementation is supplied to the automaton producing section 27a in the complementing section 27.

According to this specification of complementation 300, when composing a structured document after document data of a document class titled Technical memorandum is converted to a document data of the document class titled Technical report, the following complementation is required. That is, a complementing action "insertion" is required for a complemented node "author", a complementing action "addition" is required for a complemented node "revision dates", a complementing action "insertion is allowed" is required for a complemented node "artwork" and a complementing action "addible" is required for a complemented node "caption".

A complementing automaton is a type of a finite automaton with finite pieces of internal states which is transferred in the next state depending upon input and a state when input. An automaton is the general term of a mathematical model of a machine with some internal states in which the next internal state is determined depending upon the current internal state and an input string added to it. In the present invention, a structured document is composed by producing and applying a complementing automaton to all component types having subordinate structure of component types of an output document class in complementation by the complementing section 27.

The produced complementing automaton is characterized as follows: That is, this complementing automaton reads the nodes of a pre-complemented document and determines a state next transferred based upon the type name of the nodes. ε transition in which transition is determined without reading a node and ω transition for performing transition if there are no nodes to be read can be utilized.

For the state of this complementing automaton, there are five states of "an initial state", "a normal state", "an added state", "a start state" and "a terminated state". These five states will be described below.

"An initial state" is the starting point of processing by an automaton. Any processing by the complementing automaton is always started from this state.

"A normal state" is a state corresponding to a node not required for complementation in an output document class. Hereinafter, this state of a node with the type name of A is called a state A.

"An added state" is a state corresponding to the complementation of a node that a subtree having the node as root is required to be added for complying with an output document class. Hereinafter, this state of a node with the type name of A is called an added state A.

"A start state" is a state corresponding to the start of the complementation of a node which is required to insert as an intermediate node for complying with an output document class. Hereinafter, this state of a node with the type name of A is called a start state A.

"A terminated state" is a state corresponding to the end of the complementation of a node which is required to insert as an intermediate node. Hereinafter, this state of a node with the type name of A is called a terminated state A.

A complementing action paired with the type name of a node in the specification of complementation is provided to the five states constituting the complementing automaton described above. A node and a subtree are complemented by performing a complementing action according to the transition of a state.

A complementing automaton for composing the above document class titled Technical report as an output document class will be described concretely below.

Figure 13:
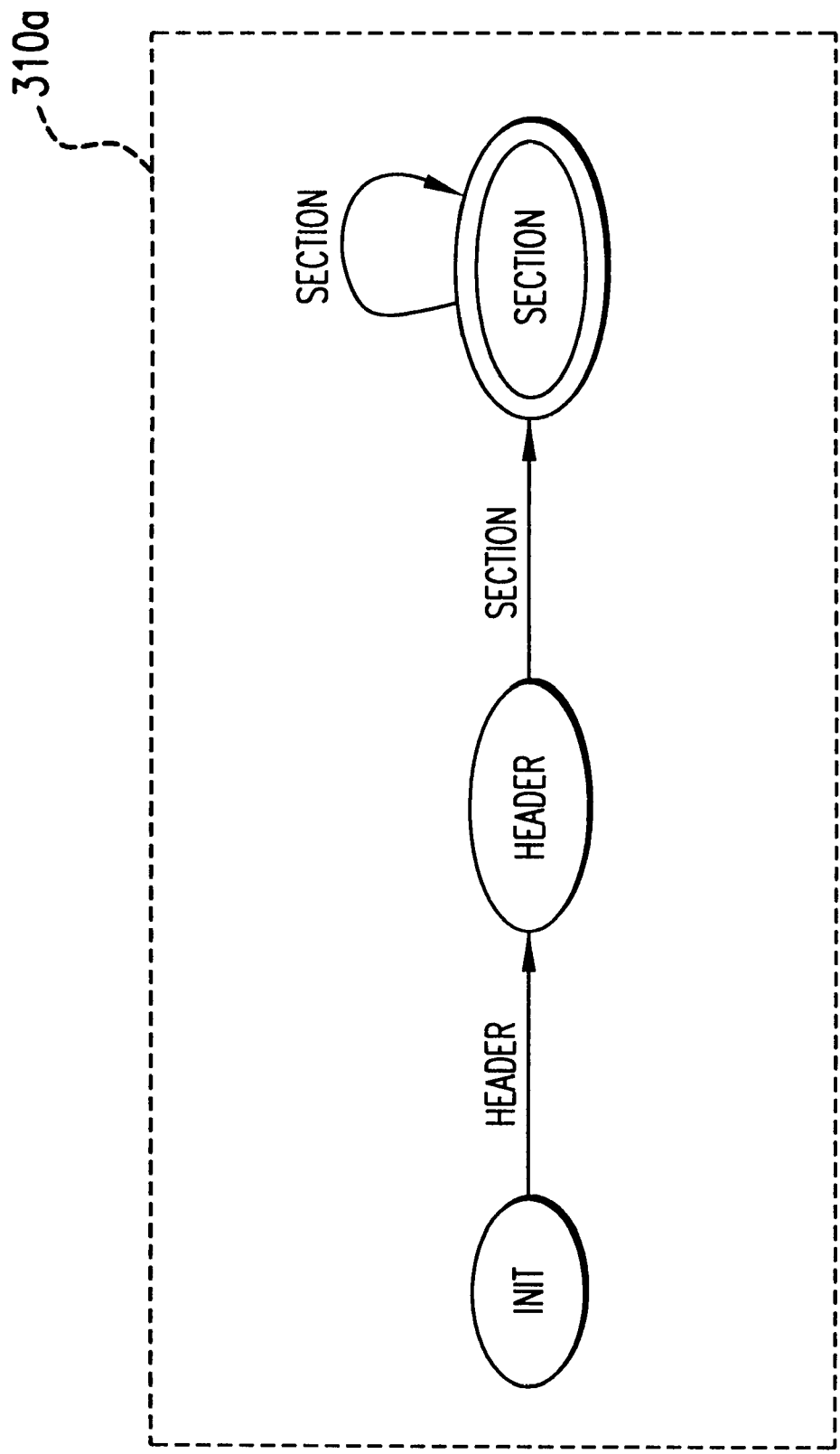
FIG. 13 shows a complementing automaton for the subordinate structure of a node named Report which is the root node of the output document class name of Technical report.

FIG. 13 shows a complementing automaton for the subordinate structure of a node titled Report which is the root node of the output document class name of Technical report. This complementing automaton 310a is produced by the automaton producing section 27a in the complementing section 27. The complementing automaton 310a is formed according to data structure 310b described later.

The complementing automaton 310a is constituted by an initial state Init, a header state and a section state. Transition from the initial state Init to the header state is executed by reading a node named Header and transition from the header state to the section state is executed by reading a node named Section. Transition from the section state to the section state is executed by reading a node named Section. This is because the node named Section is accompanied by the constrainer of structure REP and may be read repeatedly over once.

The section state is also an end state. This is because the subordinate structure of the node titled Report includes only a node named Header and the node named Section read repeatedly over once as shown in FIG. 7.

When the complementing automaton is shown in a drawing, the initial state is shown in an ellipse as Init, the terminated state is shown in double ellipses and the other state is shown in a normal ellipse. The type name of an input node read when transition is performed from a state is called a label. If the complementing automaton 310a shown in FIG. 13 is given as an example, the node named Header is a label for transiting the state of the complementing automaton 310a from the initial state Init to the header state.

Figure 14:
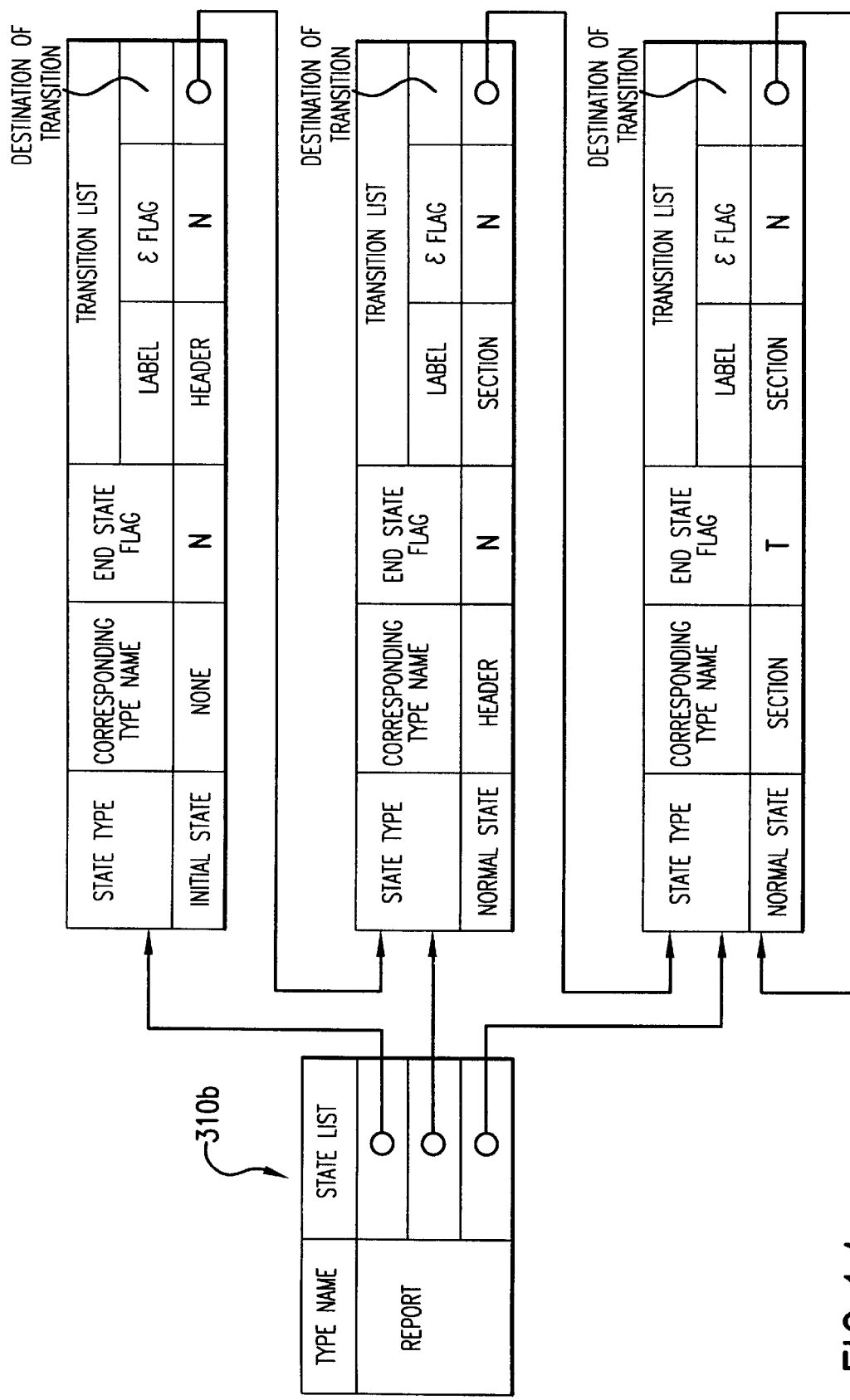
FIG. 14 shows data structure which the complementing automaton for the subordinate structure of the node named Report shown in FIG. 13 has.

Next, the data structure of this complementing automaton will be described. FIG. 14 shows the data structure of the complementing automaton 310a for the subordinate structure of the node titled Report shown in FIG. 13.

As shown in FIG. 14, the data structure 310b of the complementing automaton 310a consists of a pair of the type name of a node included in an output document class and the list of each state constituting the complementing automaton.

A state list is constituted by the type of each state, the corresponding type name, an end state flag and a transition list. Any of an initial state, a normal state, an added state, a start state and a terminated state is entered in the field of the type of each state. One type name of a node included in an output document class corresponding to each state is entered in the field of the corresponding type name. 'T' or 'N' is entered in the field of an end state flag and if this flag is T, the state is an end state.

The transition list is a list of transition conditions from the state. Each transition condition is constituted by a set of a label showing a type name of a node read when transferred, ε flag and a pointer to the state of a transferred destination.

The type name of a node included in an output document class is entered, 'ε' showing that the transition is according to ε transition is entered or 'ω' showing that the transition is according to ω transition is entered in a label of this transition condition. 'T' or 'N' is entered in the field of ε flag, however, this ε flag will be described later.

According to data structure 310b which is a concrete example of the data structure of the complementing automaton, the complementing automaton for the subordinate structure of the node titled Report which is the root node of the document class titled Technical report is constituted by three states. That is, the three states are an initial state in which no corresponding type name exists, a normal state corresponding to the node named Header and a normal state corresponding to the node named Section. Of these, the normal state corresponding to the node named Section is simultaneously also an end state.

In the initial state, only one transition condition exists and if the node named Header is read, the initial state transfers to the header state. Only one transition condition exists in the header state and if the node named Section is read, the header state transfers to the section state. Only one transition condition exists in the section state and if another node named Section is read, the section state transfers to the section state again. If no read node named Section exists, this complementing automaton is terminated.

The procedure of producing the complementing automaton will be described below. The production of the complementing automaton means completing a complementing automaton and its data structure by replacing according to ε transition after a basic automaton and its data structure are produced.

In this paragraph, ε transition will be described below. ε transition is a transition condition showing transferring a state without reading a node. When complementation is executed, a complementing action is required to be executed after transferring a state without reading a node and ε transition is an essential transition condition to it. In the meantime, the existence of ε transition causes a transferred destination not to be unique when ε transition and the other transition condition simultaneously exist or when plural ε transitions exist.

Therefore, first, a basic automaton including ε transition and its data structure are produced and afterward, a complementing automaton and its data structure are produced by replacing ε transition of the produced basic automaton and its data structure with another transition condition. The complementing automaton including no ε transition has the same form as that of the basic automaton and the complementing automaton 310a is a concrete example of this. In the transition list of the data structure of the basic automaton, ε transition is expressed as 'ε' in the field of a label and as 'T' in the field of ε flag.

Figure 15:
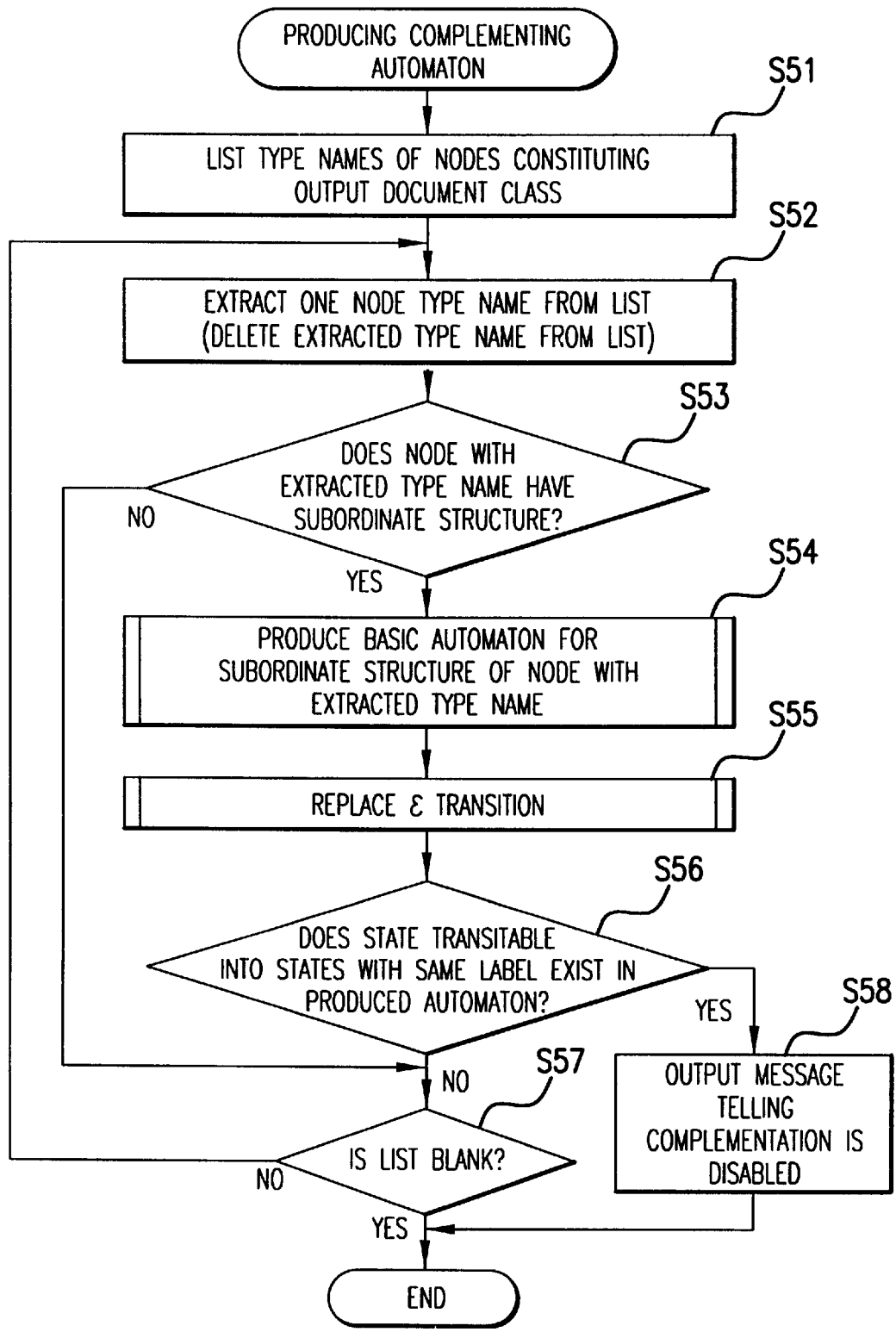
FIG. 15 is a flowchart showing a rough procedure for producing a complementing automaton.

FIG. 15 is a flowchart showing a rough procedure for producing a complementing automaton. This processing is equivalent to the step S5 in the flowchart shown in FIG. 3 and executed by the automaton producing section 27a in the complementing section 27 which receives the specification of complementation supplied from the complementation specification managing section 26. The following description is based upon step numbers shown in FIG. 15.

[S51] The type name of nodes constituting an output document class is listed based upon the definition information of the output document class. The above definition information can be obtained by requesting it from the document class managing section 22 based upon an output document class name input from the input data accepting section 21.

[S52] One type name is extracted from the obtained list. The extracted type name is deleted from the list.

[S53] It is judged whether a node with the extracted type name has subordinate structure in the structural constraint of the output document class or not. Even if the node includes contents, they are not regarded as subordinate structure. If the node has subordinate structure, processing proceeds to a step S54 and if not, processing proceeds to a step S57.

[S54] A basic automaton for the subordinate structure of the node with the extracted type name is produced based upon the specification of complementation. The detailed procedure of this processing will be described later.

[S55] A complementing automaton is produced by replacing ε transition included in the produced basic automaton. The detailed procedure of this processing will be described later.

[S56] It is judged whether a state having plural transition conditions with the same label exists or not in the produced complementing automaton. If such a state does not exist, processing proceeds to a step S57 and if it exists, processing proceeds to a step S58.

[S57] It is judged whether a list in which type names are entered is blank or not. If the list is not blank, processing is returned to the step S52. If the list is blank, it means that the production of a complementing automaton is finished and this processing is terminated.

[S58] If plural transition conditions with the same label exist in one state, the destination of transition is not unique. As complementation is disabled if such a state exists, a message that complementation is disabled is output to the complementing section 27 and the processing is terminated.

Next, a procedure for producing a basic automaton for the subordinate structure of a node with a type name extracted from a list based upon the specification of complementation will be described.

Figure 16:
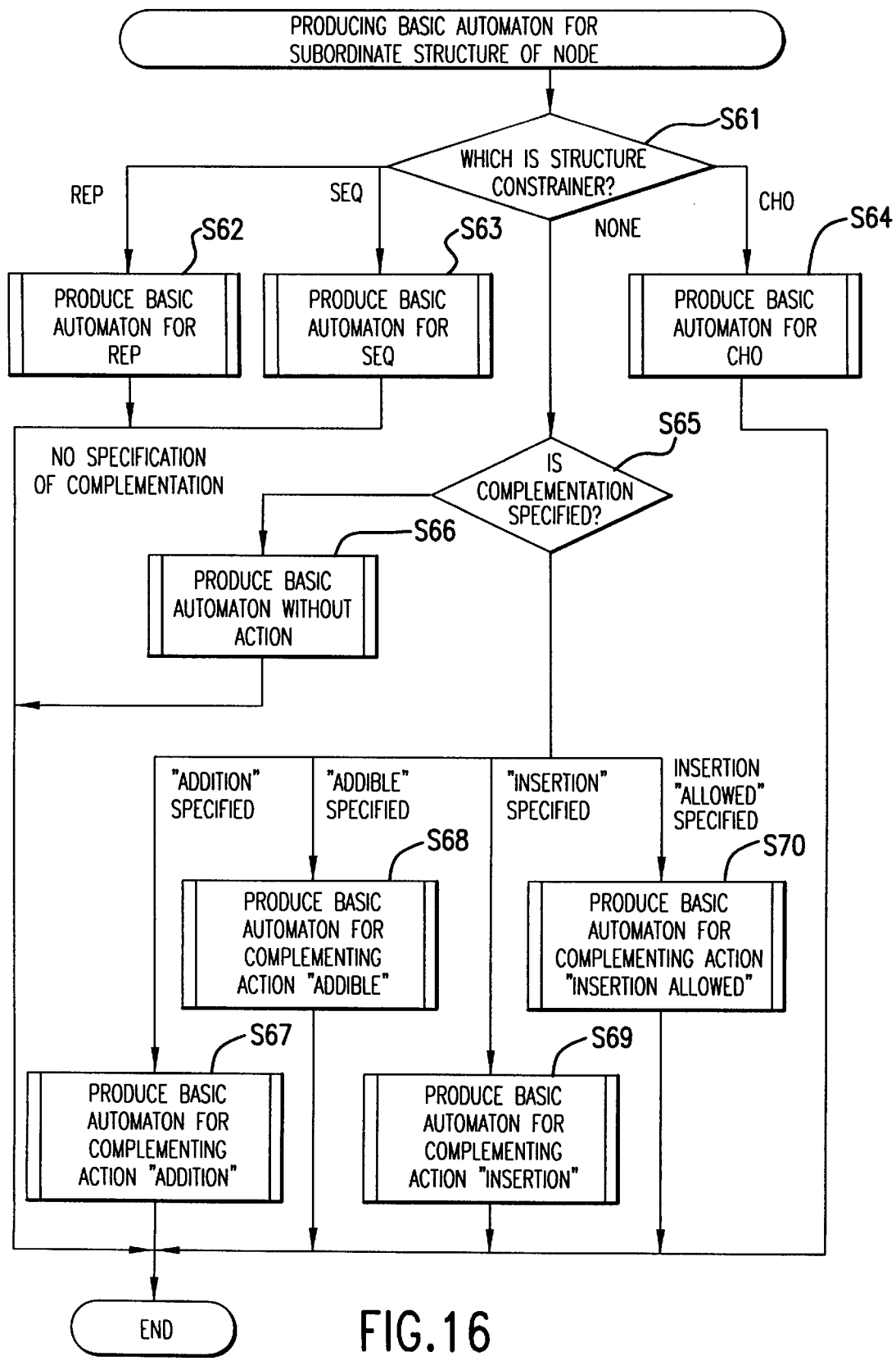
FIG. 16 is a flowchart showing a procedure for producing a basic automaton for the subordinate structure of a node.

FIG. 16 is a flowchart showing a procedure for producing a basic automaton for the subordinate structure of a node. This processing is equivalent to the step S54 in the flowchart shown in FIG. 15 and executed by the automaton producing section 27a in the complementing section 27 which receives the specification of complementation supplied from the complementation specification managing section 26. The following description is based upon step numbers shown in FIG. 16.

[S61] It is judged whether the constrainer of structure is accompanied or not in the subordinate structure of a target node, if the constrainer of structure REP is accompanied, processing proceeds to a step S62, if the constrainer of structure SEQ is accompanied, processing proceeds to a step S63 and if the constrainer of structure CHO is accompanied, processing proceeds to a step S64. If no constrainer of structure is accompanied, processing proceeds to a step S65.

[S62] A basic automaton for the constrainer of structure REP is produced. The procedure for producing it will be described later, however, when the production is finished, processing is returned to the step S55 shown in FIG. 15 outside this flowchart.

[S63] A basic automaton for the constrainer of structure SEQ is produced. The procedure for producing it will be described later, however, when the production is finished, processing is returned to the step S55 shown in FIG. 15 outside this flowchart.

[S64] A basic automaton for the constrainer of structure CHO is produced. The procedure for producing it will be described later, however, when the production is finished, processing is returned to the step S55 shown in FIG. 15 outside this flowchart.

[S65] I t is judged in the structural constraint of an output document class whether a type name for which complementation is specified exists or not in the subordinate structure of a target node. If a type name for which complementation is specified does not exist, processing proceeds to a step S66. If a type name for which complementation is specified exists, a paired complementing action is checked. If "addition" is specified, processing proceeds to a step S67, if "addible" is specified, processing proceeds to a step S68, if "insertion" is specified, processing proceeds to a step S69 and if "insertion is allowed" is specified, processing proceeds to a step S70.

[S66] A basic automaton without a complementing action is produced. The procedure for producing it will be described later, however, when the production is finished, processing is returned to the step S55 shown in FIG. 15 outside this flowchart.

[S67] A basic automaton for executing a complementing action "addition" is produced. The procedure for producing it will be described later, however, when the production is finished, processing is returned to the step S55 shown in FIG. 15 outside this flowchart.

[S68] A basic automaton for executing a complementing action "addible" is produced. The procedure for producing it will be described later, however, when the production is finished, processing is returned to the step S55 shown in FIG. 15 outside this flowchart.

[S69] A basic automaton for executing a complementing action "insertion" is produced. The procedure for producing it will be described later, however, when the production is finished, processing is returned to the step S55 shown in FIG. 15 outside this flowchart.

[S70] A basic automaton for executing a complementing action "insertion is allowed" is produced. The procedure for producing it will be described later, however, when the production is finished, processing is returned to the step S55 shown in FIG. 15 outside this flowchart.

Figure 17:
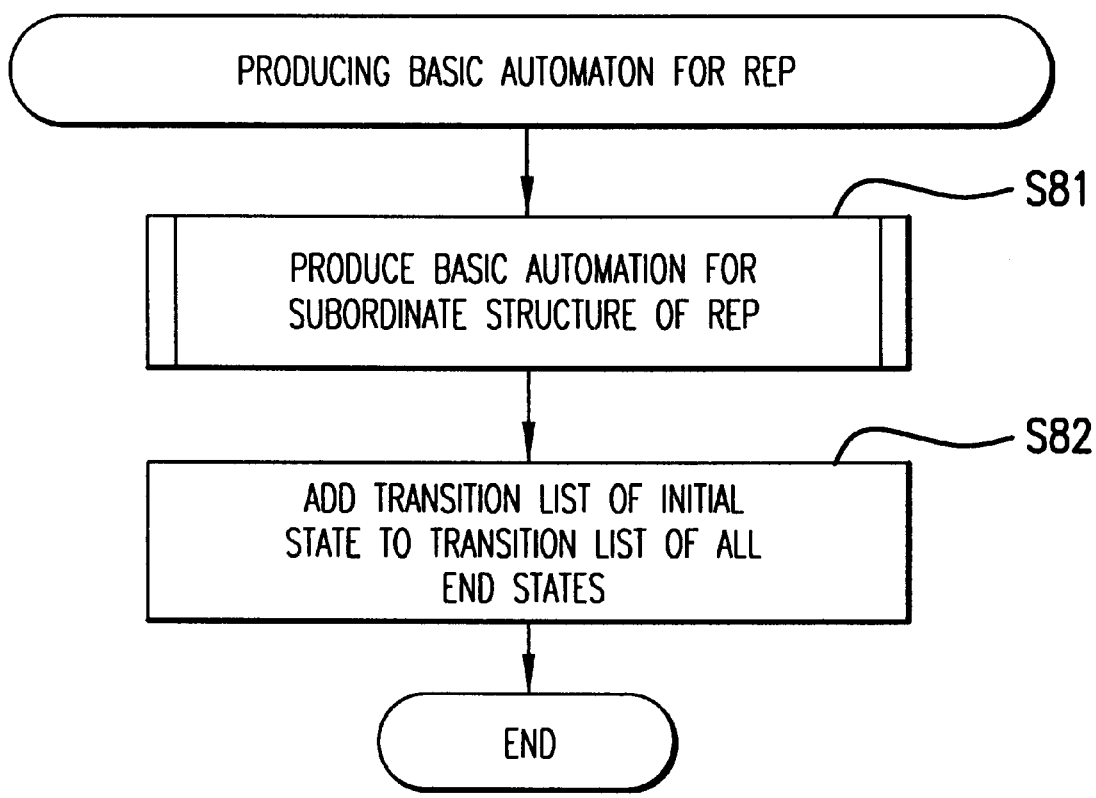
FIG. 17 is a flowchart showing a procedure for producing a basic automaton for the constrainer of structure REP.

Next, a procedure for producing a basic automaton for the constrainer of structure REP will be described. FIG. 17 is a flowchart showing the procedure for producing the basic automaton for the constrainer of structure REP. This processing is equivalent to the step S62 shown in FIG. 16 and executed by the automaton producing section 27a in the complementing section 27. The following description is based upon step numbers shown in FIG. 17.

[S81] A basic automaton for the subordinate structure of the constrainer of structure REP is produced. That is, the processing from the step S61 to the end in the flowchart shown in FIG. 16 for the subordinate structure of the constrainer of structure PEP accompanying a target node is executed.

[S82] A transition list which the initial state of the basic automaton produced in the step S81 has is added to the transition list of all end states of the basic automaton produced in the step S81 and processing is terminated.

Figure 18:
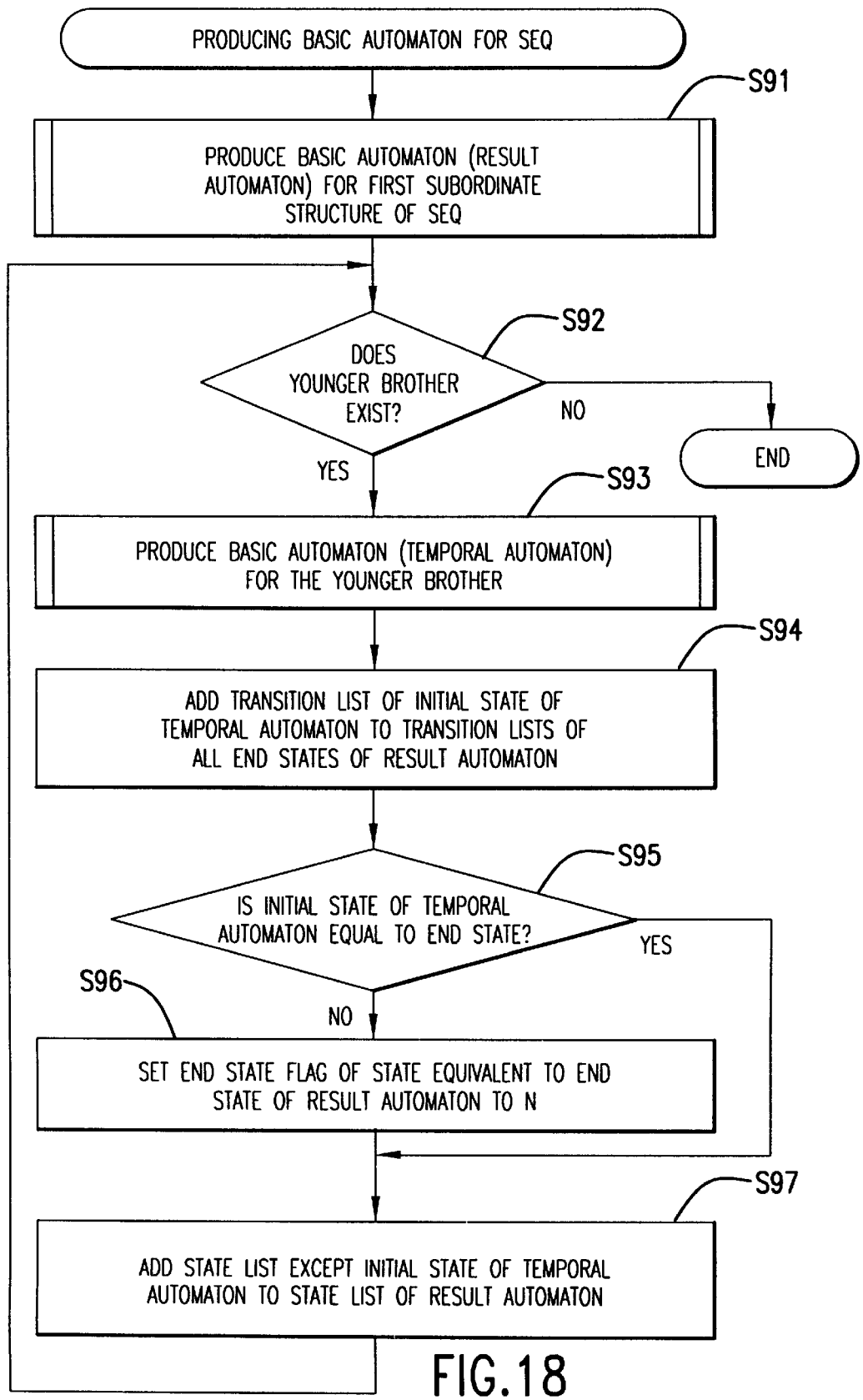
FIG. 18 is a flowchart showing a procedure for producing a basic automaton for the constrainer of structure SEQ.

Next, a procedure for producing a basic automaton for the constrainer of structure SEQ will be described. FIG. 18 is a flowchart showing the procedure for producing the basic automaton for the constrainer of structure SEQ. This processing is equivalent to the step S63 shown in FIG. 16 and executed by the automaton producing section 27a in the complementing section 27. The following description is based upon step numbers shown in FIG. 18.

[S91] A basic automaton (result automaton) for the eldest child of subordinate structure in which the constrainer of structure SEQ is accompanied is produced. That is, processing from the step S61 to the end in the flowchart shown in FIG. 16 for the eldest child out of structure in which the constrainer of structure SEQ existing under a target node is accompanied is executed.

[S92] It is judged whether a younger brother of structure for which the basic automaton is produced by the above processing exists or not in structure in which the constrainer of structure SEQ is accompanied. If the younger brother exists, processing proceeds to a step S93 and if not, this processing is terminated.

[S93] A basic automaton (temporal automaton) for the younger brother is produced. That is, processing from the step S61 to the end in the flowchart shown in FIG. 16 for the younger brother the existence of which is verified in the step S92 out of structure in which the constrainer of structure SEQ existing under a target node is accompanied is executed.

[S94] A transition list which the initial state of the temporal automaton has is added to the transition list of all end states of the result automaton.

[S95] It is judged whether the initial state of the temporal automaton is an end state or not. If the initial state is an end state, processing proceeds to a step S97 and if not, processing proceeds to a step S96.

[S96] The end state flag for a state which is an end state of the result automaton heretofore is set to N.

[S97] A state list except the initial state of the temporal automaton is added to the state list of the result automaton.

Figure 19:
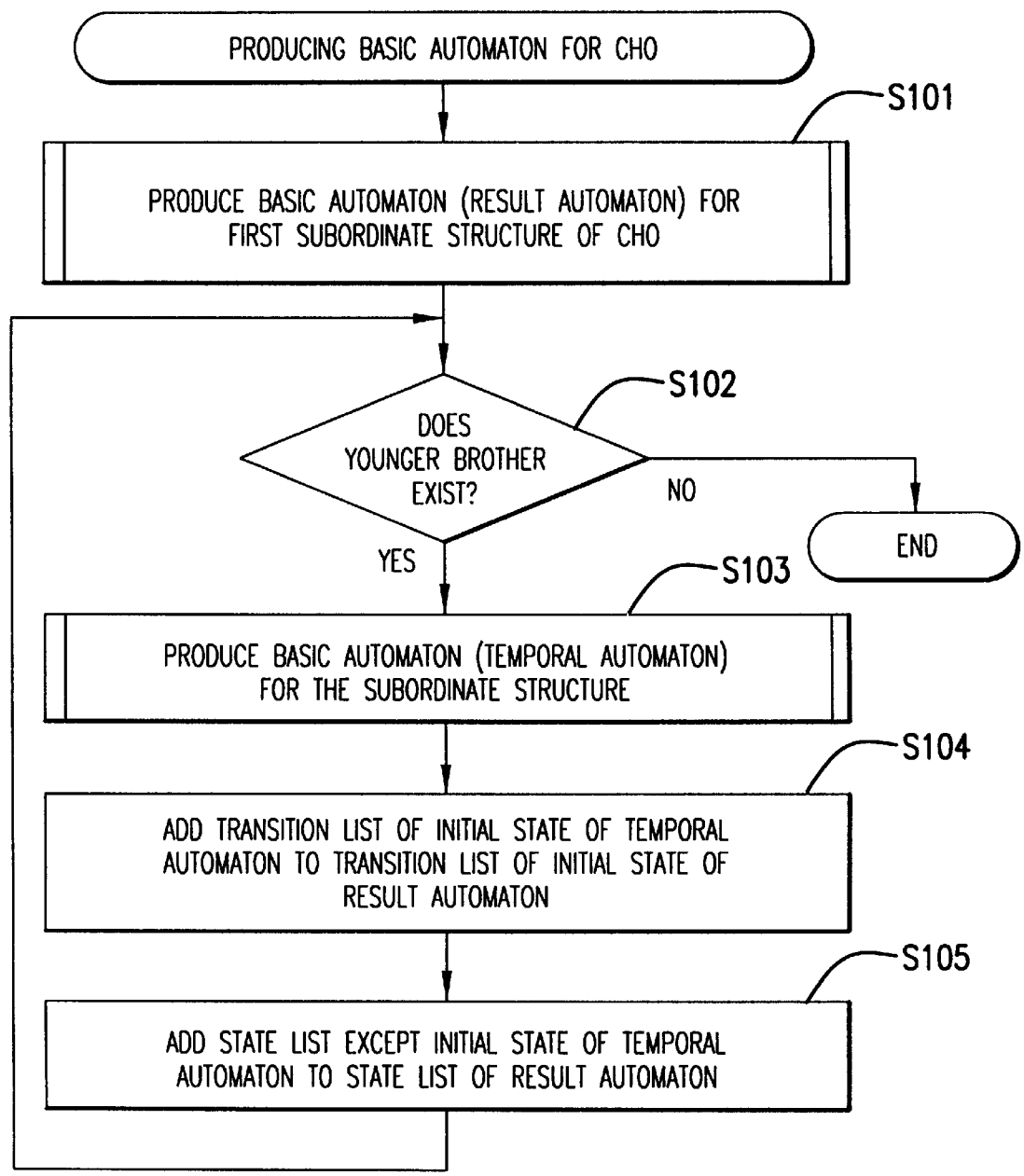
FIG. 19 is a flowchart showing a procedure for producing a basic automaton for the constrainer of structure CHO.

Next, a procedure for producing a basic automaton for the constrainer of structure CHO will be described. FIG. 19 is a flowchart showing the procedure for producing the basic automaton for the constrainer of structure CHO. This processing is equivalent to the step S64 shown in FIG. 16 and executed by the automaton producing section 27a in the complementing section 27. The following description is based upon step numbers shown in FIG. 18.

[S101] A basic automaton (result automaton) for the eldest child of subordinate structure in which the constrainer of structure CHO is accompanied is produced. That is, processing from the step S61 to the end in the flowchart shown in FIG. 16 for the eldest child out of structure in which the constrainer of structure CHO existing under a target node is accompanied is executed.

[S102] It is judged whether a younger brother of structure for which the basic automaton is already produced by the above processing exists or not in subordinate structure in which the constrainer of structure CHO is accompanied. If the younger brother exists, processing proceeds to a step S103 and if not, this processing is terminated.

[S103] A basic automaton (temporal automaton) for the structure the existence of which is verified in the step S102 is produced. That is, processing from the step S61 to the end in the flowchart shown in FIG. 16 for the structure the existence of which is verified in the step S102 out of structure in which the constrainer of structure CHO existing under a target node is accompanied is executed.

[S104] A transition list which the initial state of the temporal automaton has is added to the transition list of the initial state of the result automaton.

[S105] A state list except the initial state of the temporal automaton is added to the state list of the result automaton. Afterward, processing is returned to the step S102.

Figure 20:
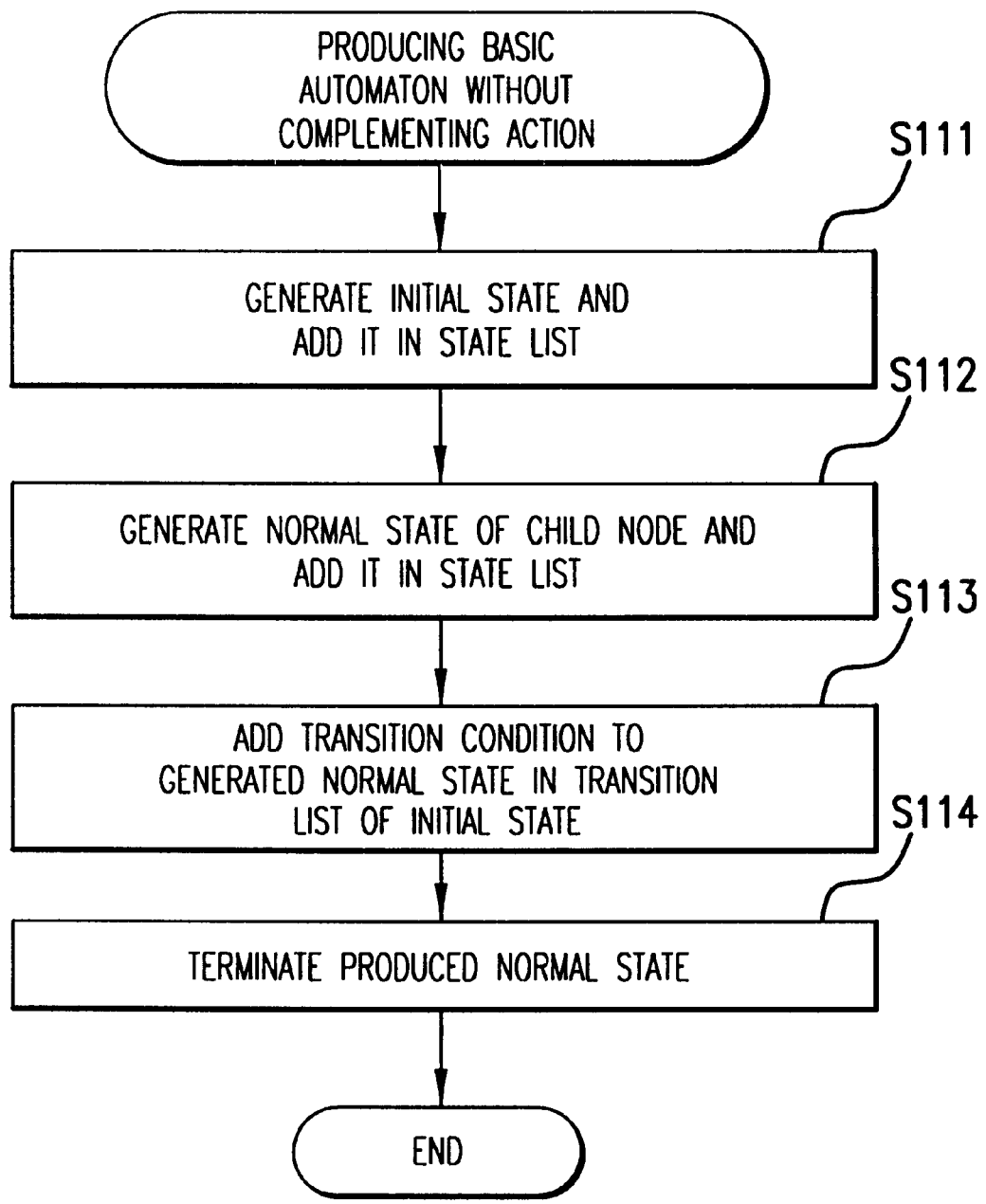
FIG. 20 is a flowchart showing a procedure for producing a basic automaton without a complementing action.

Next, a procedure for producing a basic automaton for a node for which no complementing action is executed will be described. FIG. 20 is a flowchart showing the procedure for producing the basic automaton without a complementing action. This processing is equivalent to the step S66 shown in FIG. 16 and executed by the automaton producing section 27a in the complementing section 27. The following description is based upon step numbers shown in FIG. 20.

[S111] An initial state is produced and the produced initial state is added to a state list.

[S112] A normal state is produced and the produced normal state is added to the state list. The type name of a node equivalent to a child node in the subordinate structure of the target node for which a basic automaton is being produced or the constrainer of structure is entered in the field of the corresponding type name of this normal state.

[S113] A transition condition to the normal state produced in the step S112 is added to the initial state produced in the step S111. The type name entered in the field of the corresponding type name of the normal state produced in the step S112 is entered in the field of the label of this transition condition. 'N' is entered in the field of $\epsilon$ flag for this transition condition and a pointer showing the destination of transition is connected to the produced normal state.

[S114] The end state flag for the normal state produced in the step S112 is set to T.

Figure 21:
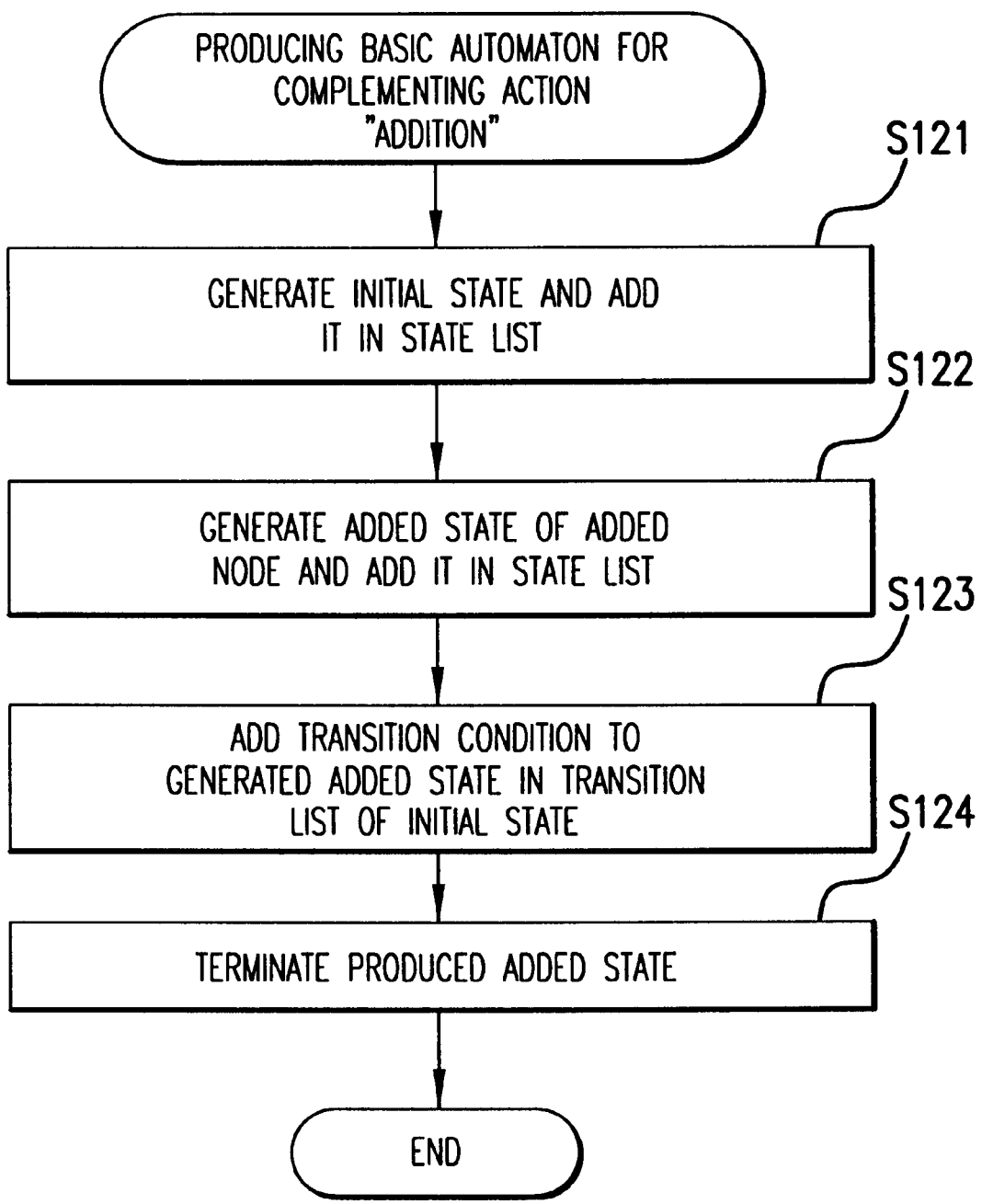
FIG. 21 is a flowchart showing a procedure for producing a basic automaton for performing a complementing action "addition"

Next, a procedure for producing a basic automaton for executing a complementing action "addition" will be described. FIG. 21 is a flowchart showing the procedure for producing the basic automaton for executing a complementing action "addition". This processing is equivalent to the step S67 shown in FIG. 16 and executed by the automaton producing section 27a in the complementing section 27. The following description is based upon step numbers shown in FIG. 21.

[S121] An initial state is produced and the produced initial state is added to a state list.

[S122] An added state is produced and the produced added state is added to the state list.

The type name of a node specified so that the node is added in the subordinate structure of the target node for which a basic automaton is being produced or the constrainer of structure is entered in the field of the corresponding type name of this added state.

[S123] A transition condition to the added state produced in the step S122 is added to the initial state produced in the step S121. '$\epsilon$' is entered in the field of the label of this transition condition and 'T' is entered in the field of $\epsilon$ flag. A pointer showing the destination of transition under this transition condition is connected to the produced added state.

[S124] The end state flag for the added state produced in the step S122 is set to T.

Figure 22:
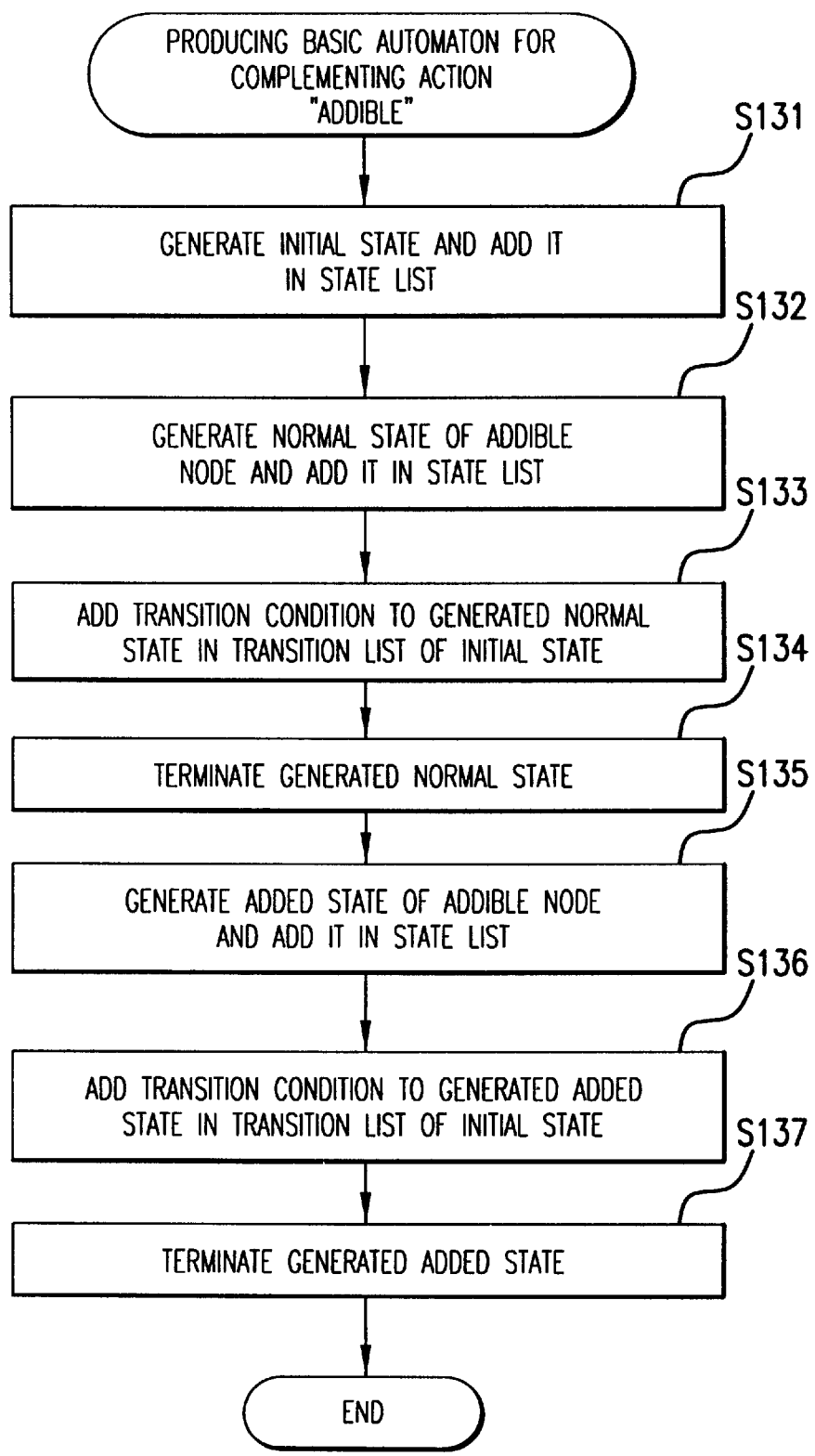
FIG. 22 is a flowchart showing a procedure for producing a basic automaton for performing a complementing action "addible"

Next, a procedure for producing a basic automaton for executing a complementing action "addible" will be described. FIG. 22 is a flowchart showing the procedure for producing the basic automaton for executing a complementing action "addible". This processing is equivalent to the step S68 shown in FIG. 16 and executed by the automaton producing section 27a in the complementing section 27. The following description is based upon step numbers shown in FIG. 22.

[S131] An initial state is produced and the produced initial state is added to a state list.

[S132] A normal state is produced and the produced normal state is added to the state list. The type name of a node for which it is specified that the node can be added in the subordinate structure of the target node for which a basic automaton is being produced or the constrainer of structure is entered in the field of the corresponding type name of this normal state.

[S133] A transition condition to the normal state produced in the step S132 is added to the initial state produced in the step S131. The type name entered in the field of the corresponding type name of the normal state produced in the step S132 is entered in the field of the label of this transition condition. 'N' is entered in the field of $\epsilon$ flag for this transition condition and a pointer showing the destination of transition is connected to the normal state produced in the step S132.

[S134] The end state flag for the normal state produced in the step S132 is set to T.

[S135] An added state is produced and the produced added state is added to the state list. The type name of a node for which it is specified that the node can be added under the target node for which the basic automaton is being produced is entered in the field of the corresponding type name of this added state.

[S136] A transition condition to the added state produced in the step S135 is added to the initial state produced in the step S131. '$\epsilon$' is entered in the field of the label of this transition condition. 'T' is entered in the field of e flag for this transition condition and a pointer showing the destination of transition is connected to the added state produced in the step S135.

[S137] The end state flag for the added state produced in the step S135 is set to T.

Figure 23:
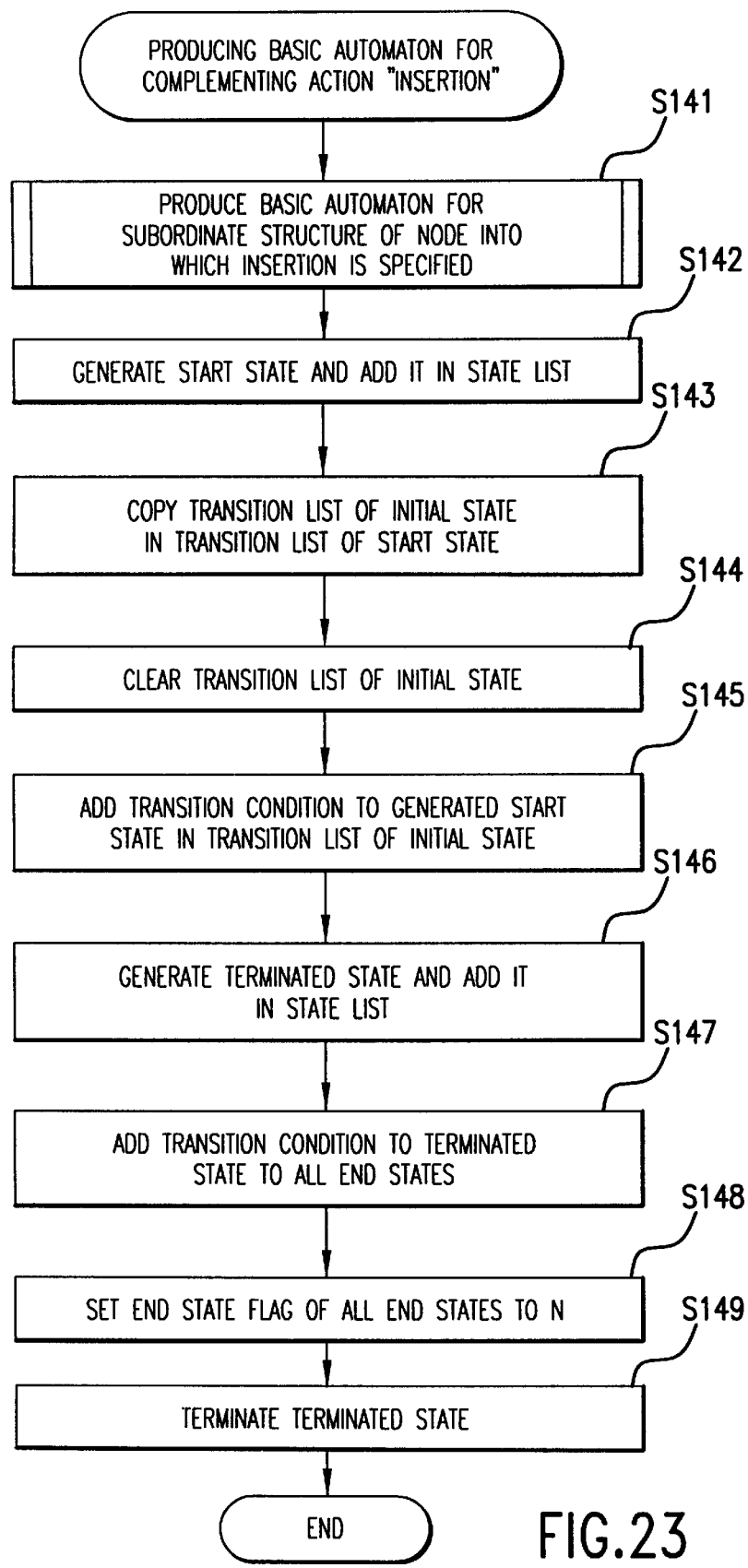
FIG. 23 is a flowchart showing a procedure for producing a basic automaton for performing a complementing action "insertion"

Next, a procedure for producing a basic automaton for executing a complementing action "insertion" will be described. FIG. 23 is a flowchart showing the procedure for producing the basic automaton for executing a complementing action "insertion". This processing is equivalent to the step S69 shown in FIG. 16 and executed by the automaton producing section 27a in the complementing section 27. The following description is based upon step numbers shown in FIG. 23.

[S141] A basic automaton for the subordinate structure of a node with a type name for which insertion is specified is produced. That is, processing from the step S61 to the end in the flowchart shown in FIG. 16 for a type name specified so that it is inserted into the subordinate structure of a target node is executed.

[S142] A start state is produced and the produced start state is added to a state list. The type name of a node into which insertion is specified is entered in the field of the corresponding type name of this start state.

[S143] A transition list which an initial state has is copied in the transition list of the start state produced in the step S142.

[S144] The transition list which the initial state has is cleared.

[S145] A transition condition to the start state produced in the step S142 is added to the transition list which the initial state has. '$\epsilon$' is entered in the field of the label of this transition condition. 'T' is entered in the field of $\epsilon$ flag for this transition condition and a pointer showing the destination of transition is connected to the start state produced in the step S142.

[S146] A terminated state is produced and added to the state list. The type name of a node into which insertion is specified is entered in the field of the corresponding type name of this terminated state.

[S147] A transition condition to the terminated state produced in the step S146 is added to all end states. '$\epsilon$' is entered in the field of the label of this transition condition. 'T' is entered in the field of $\epsilon$ flag for this transition condition and a pointer showing the destination of transition is connected to the terminated state produced in the step S146.

[S148] The end state flag for all end states is set to N.

[S149] The end state flag for the terminated state produced in the step S146 is set to T.

Figure 24:
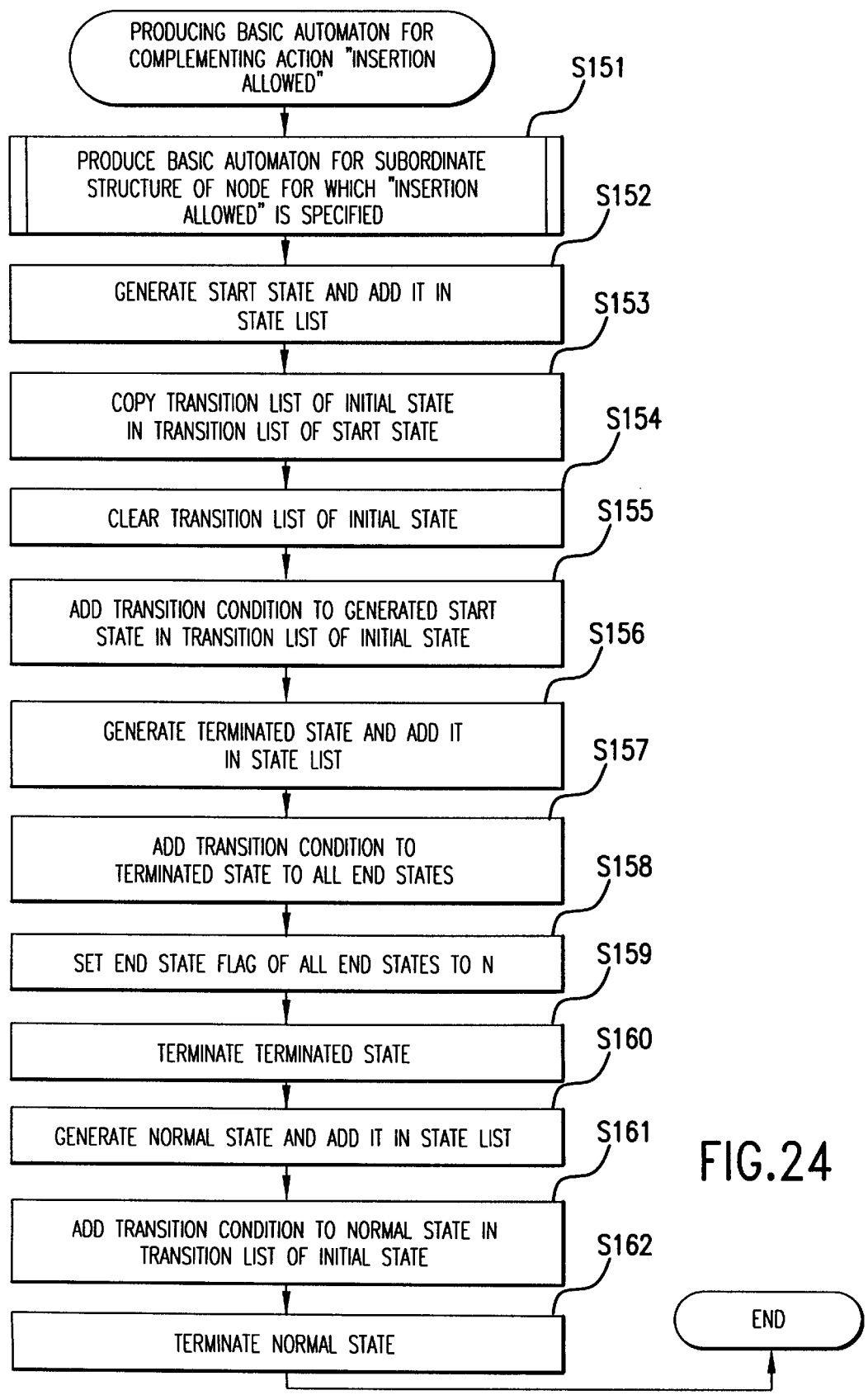
FIG. 24 is a flowchart showing a procedure for producing a basic automaton for performing a complementing action "insertion is allowed"

Next, a procedure for producing a basic automaton for executing a complementing action "insertion is allowed" will be described. FIG. 24 is a flowchart showing the procedure for producing the basic automaton for executing a complementing action "insertion is allowed". This processing is equivalent to the step S70 shown in FIG. 16 and executed by the automaton producing section 27a in the complementing section 27. The following description is based upon step numbers shown in FIG. 24.

[S151] A basic automaton for the subordinate structure of a node with a type name for which "insertion is allowed" is specified is produced. That is, processing from the step S61 to the end in the flowchart shown in FIG. 16 for a type name specified so that it can be inserted into the subordinate structure of a target node is executed.

[S152] A start state is produced and the produced start state is added to a state list. The type name of a node for which "insertion is allowed" is specified is entered in the field of the corresponding type name of this start state.

[S153] A transition list which an initial state has is copied in the transition list of the start state produced in the step S152.

[S154] The transition list which the initial state has is cleared.

[S155] A transition condition to the start state produced in the step S152 is added to the transition list which the initial state has. '$\epsilon$' is entered in the field of the label of this transition condition. 'T' is entered in the field of $\epsilon$ flag for this transition condition and a pointer showing the destination of transition is connected to the start state produced in the step S152.

[S156] A terminated state is produced and added to the state list. The type name of a node for which "insertion is allowed" is specified is entered in the field of the corresponding type name of this terminated state.

[S157] A transition condition to the terminated state produced in the step S156 is added to all end states. '$\epsilon$' is entered in the field of the label of this transition condition. 'T' is entered in the field of $\epsilon$ flag for this transition condition and a pointer showing the destination of transition is connected to the terminated state produced in the step S156.

[S158] The end state flag for all end states is set to N.

[S159] The end state flag for the terminated state produced in the step S157 is set to T.

[S160] A normal state is produced and added to the state list. The type name of a node for which "insertion is allowed" is specified is entered in the field of the corresponding type name of this normal state.

[S161] A transition condition to the normal state produced in the step S160 is added to the transition list which the initial state has. The type name entered in the field of the corresponding type name of the normal state produced in the step S160 is entered in the field of the label of this transition condition. 'N' is entered in the field of $\epsilon$ flag for this transition condition and a pointer showing the destination of transition is connected to the normal state produced in the step S160.

[S162] The end state flag for the normal state produced in the step S160 is set to T.

In the present invention, a basic automaton is produced according to the above procedure.

A basic automaton which is the prototype of a complementing automaton for complementing the pre-complemented document structure 210 shown in FIG. 11 is produced. This pre-complemented document structure 210 is originally the document structure 110 according to a document class titled Technical memorandum shown in FIG. 8, however, as a result of converting according to the document class titled Technical report based upon the converting rule 200 shown in FIG. 9, document structure nearly according to the structural constraint 502 shown in FIG. 7 of the document class titled Technical report is composed. The complementing rule 300 shown in FIG. 12 is utilized for a complementing rule required for producing a basic automaton.

Figure 25:
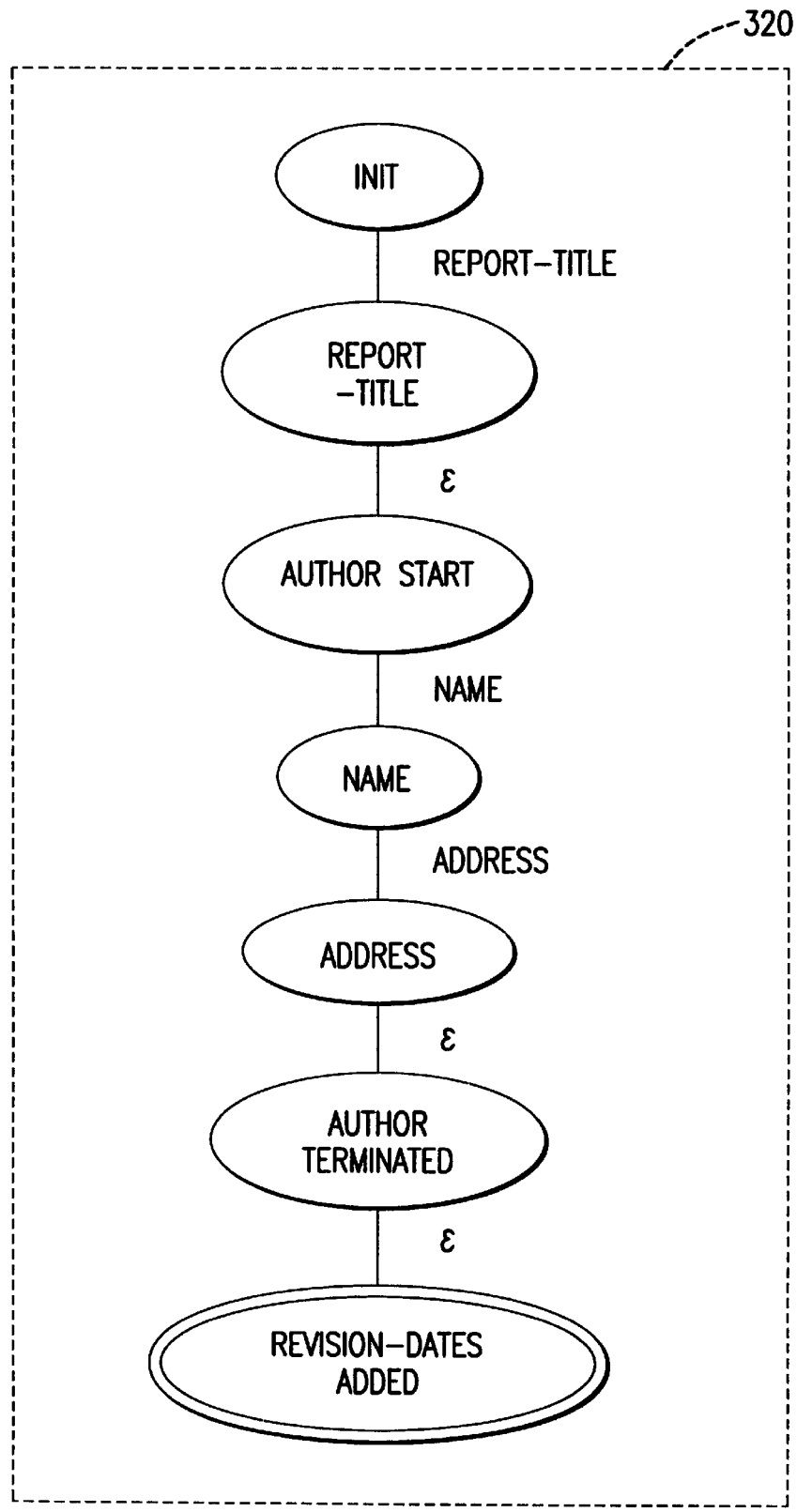
FIG. 25 shows a basic automaton for the subordinate structure of the node named Report of the output document class name of Technical report.

FIG. 25 shows a basic automaton for the subordinate structure of a node titled Header in the output document class name of Technical report. This basic automaton 320 inserts into a node named Author and adds a node named Revision dates. This basic automaton 320 is produced by the automaton producing section 27a in the complementing section 27 shown in FIG. 2.

The basic automaton 320 is constituted by an initial state Init, a Report-title state, an Author start state, a Name state, an Address state, an Author terminated state and a Revision-dates added state.

Transition from the initial state Init to the Report—title state is executed by reading a node named Report title and transition from the Report-title state to the Author start state is performed according to $\epsilon$ transition, that is, without reading any.

Transition from the Author start state to the Name state is executed by reading a node named Name and transition from the Name state to the Address state is executed by reading a node named Address.

Further, transition from the Address state to the Author terminated state and transition from the Author terminated state to the Revision-dates added state are performed according to $\epsilon$ transition, that is, without reading any.

The Revision-dates added state is also an end state. This is because subordinate structure which the node titled Report has is constituted by a node named Report title, the node named Author, the node named Name, the node named Address, the node named Author and the node Revision dates as shown in FIG. 7.

Figure 26:
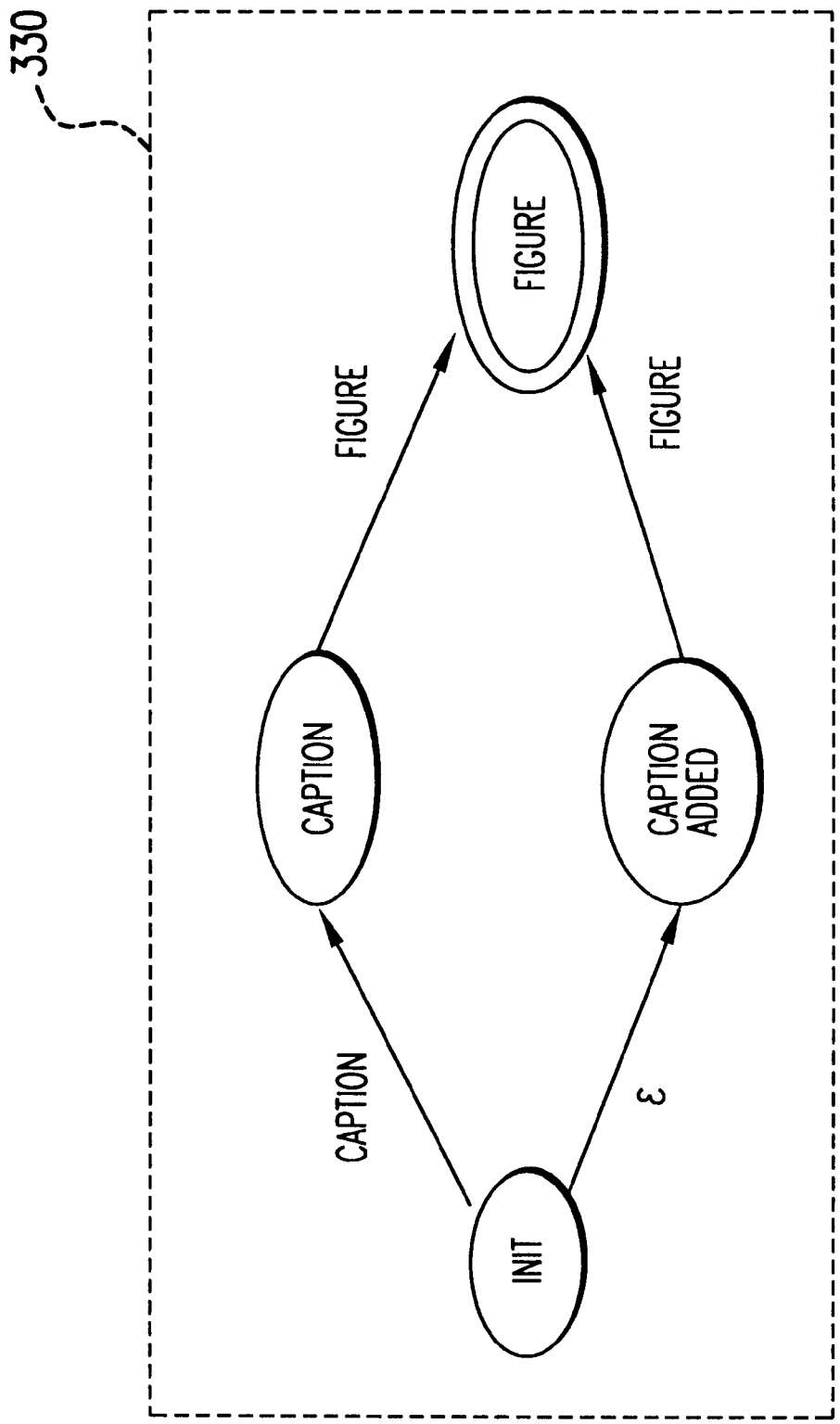
FIG. 26 shows a basic automaton for the subordinate structure of a node named Artwork of the output document class name of Technical report.

FIG. 26 shows a basic automaton for the subordinate structure of a node named Artwork of the output document class name of Technical report. This basic automaton 330 executes the complementation of "addible" for a node named Caption. This basic automaton 330 is produced by the automaton producing section 27a in the complementing section 27 shown in FIG. 2.

The basic automaton 330 is constituted by an initial state Init, a Caption state, a Caption added state and a Figure state.

Transition from the initial state Init to the Caption state is executed by reading the node named Caption and transition from the Caption state to the Figure state is executed by reading a node named Figure. Transition from the initial state Init to the Caption added state is performed according to e transition, that is, without reading any and transition from the Caption added state to the Figure state is executed by reading the node named Figure.

The Figure state is also an end state. This is because subordinate structure which the node named Artwork has consists of only the node named Caption and the node named Figure as shown in FIG. 7.

Figure 27:
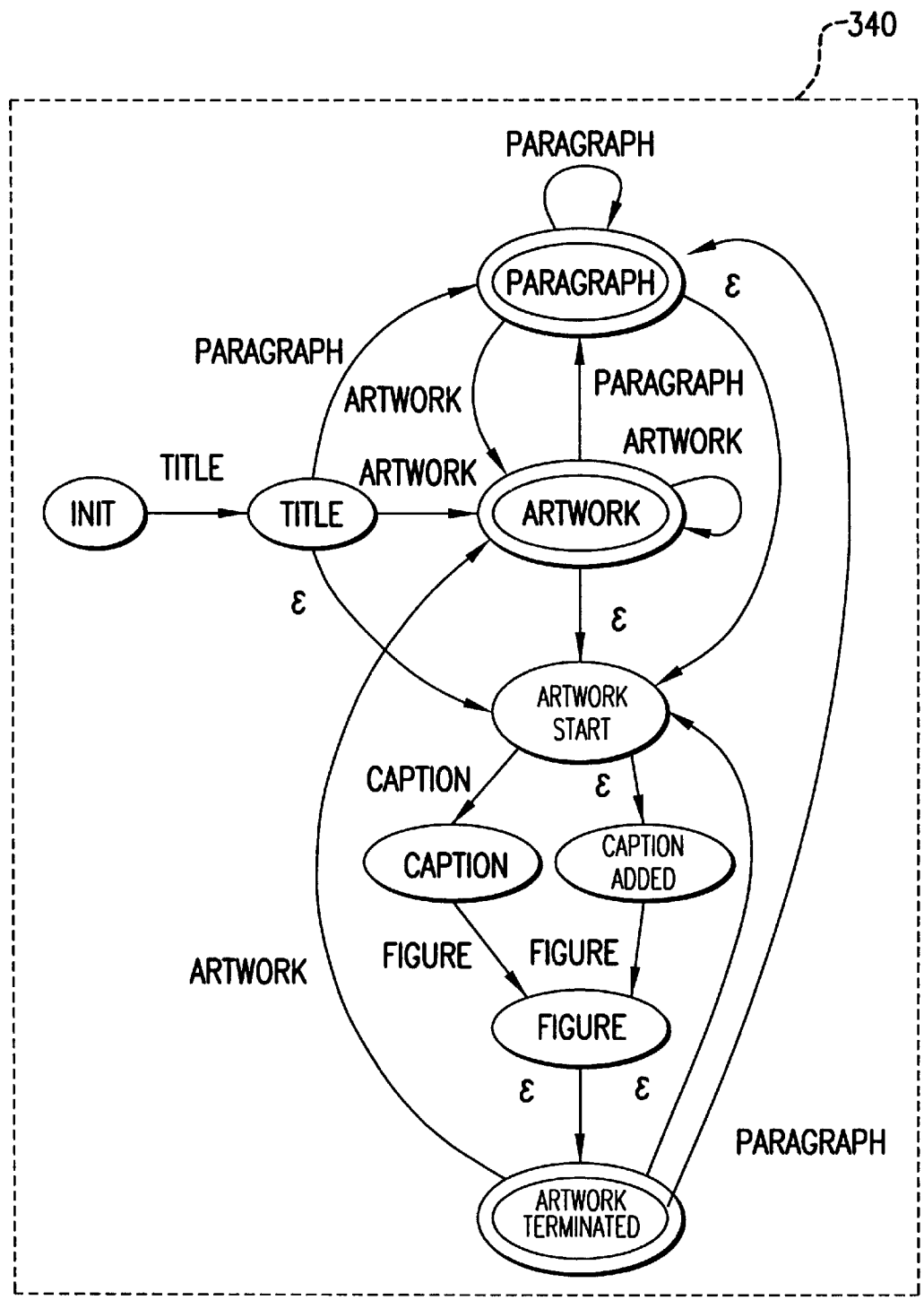
FIG. 27 shows a basic automaton for the subordinate structure of a node named Section of the output document class name of Technical report.

Further, FIG. 27 shows a basic automaton for the subordinate structure of a node named Section of the output document class name of Technical report. This basic automaton 340 executes complementation such as "insertion is allowed" of a node named Artwork and "addible" of a node named Caption. This basic automaton 340 is produced by the automaton producing section 27a in the complementing section 27 shown in FIG. 2.

The basic automaton 340 is constituted by an initial state Init, a Title state, an Artwork state, a Paragraph state, an Artwork start state, a Caption state, a Caption added state, a Figure state and an Artwork terminated state.

Transition from the initial state Init to the Title state is executed by reading a node named Title.

Transition from the Title state to the Artwork state is executed by reading the node named Artwork and transition to the Paragraph state is executed by reading a node named Paragraph. Transition from the Title state to the Artwork start state is performed according to $\epsilon$ transition, that is, without reading any.

Transition from the Artwork state to the Paragraph state is executed by reading the node named Paragraph and transition to the Artwork state is executed by reading the node named Artwork. Transition from the Artwork state to the Artwork start state is performed according to $\epsilon$ transition, that is, without reading any.

Transition from the Paragraph state to the Paragraph state is executed by reading the node named Paragraph and transition to the Artwork state is executed by reading the node named Artwork. Transition to the Artwork start state is performed according to $\epsilon$ transition, that is, without reading any.

Transition from the Artwork start state to the Caption state is executed by reading the node named Caption and transition to the Caption added state is performed according to $\epsilon$ transition, that is, without reading any.

Transition from the Caption state to the Figure state is executed by reading the node named Figure. Transition from the Caption added state to the Figure state is also executed by reading the node Figure. Transition from the Figure state to the Artwork terminated state is performed according to $\epsilon$ transition, that is, without reading any.

Transition from the Artwork terminated state to the Artwork state is executed by reading the node named Artwork and transition to the Paragraph state is executed by reading the node named Paragraph. Transition from the Artwork terminated state to the Artwork start state is performed according to $\epsilon$ transition, that is, without reading any.

The Paragraph state and the Artwork state are also an end state. This is because subordinate structure which the node named Section has is constituted by only the node named Title and one or more nodes named Paragraph which repeatedly appear or the node named Artwork as shown in FIG. 7. That is, the appearance of the node Paragraph or the node Artwork meets the constrainer of structure of the node Section.

The Artwork terminated state is also an end state. This is because the insertion of the node Artwork also meets the constrainer of structure of the node Section because the Artwork state is an end state.

Next, a procedure for processing for replacing $\epsilon$ transition included in the produced basic automaton will be described. e transitions in which transition is performed without reading any are included in the basic automatons produced according to the above-described procedures. If they are left as they are, competition between $\epsilon$ transition and another transition or between $\epsilon$ transitions is caused and efficient complementation is disabled. Therefore, the following processing for replacement is applied to $\epsilon$ transition so that it can be determined based upon the type name of a read node whether $\epsilon$ transition is to be performed or not, whether another transition is to be performed or not or whether any of plural $\epsilon$ transitions is to be performed or not so as to produce a complementing automaton.

Figure 28:
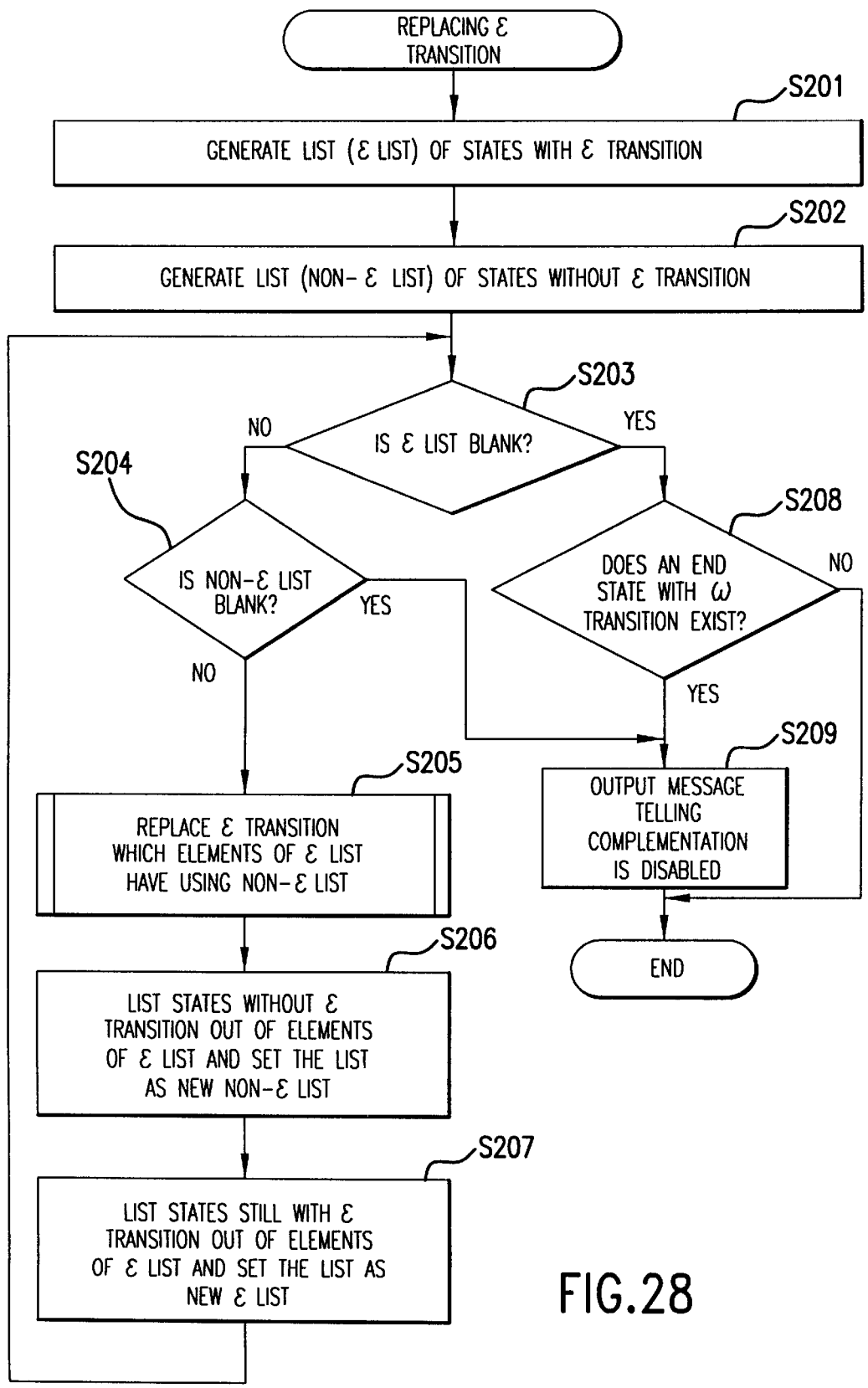
FIG. 28 is a flowchart showing a procedure for processing for replacing $\epsilon$ transition.

FIG. 28 is a flowchart showing a procedure for processing for replacing $\epsilon$ transition. This processing is equivalent to the step S55 in the flowchart shown in FIG. 15 and executed by the automaton producing section 27a in the complementing section 27 after the production of a basic automaton. The following description is based upon step numbers shown in FIG. 28.

[S201] A state having ε transition (having a transition list in which the label is 'ε' and ε flag is 'T') is extracted based upon the data structure of a produced basic automaton and ε list is generated.

[S202] A state which does not have ε transition is extracted based upon the data structure of a produced basic automaton and non-ε list is generated.

[S203] It is judged whether ε list is blank or not. If the list is not blank, processing proceeds to a step S204 and if it is blank, processing proceeds to a step S208.

[S204] It is judged whether non-ε list is blank or not. If the list is not blank, processing proceeds to a step S205 and if it is blank, processing proceeds to the step S209.

[S205] Processing for replacing ε transition which elements in ε list have is executed using non-ε list. A procedure for this processing will be described later.

[S206] A state in which ε transition is replaced (any except 'ε' is entered in the field of all labels of a transition condition) is extracted from elements in ε list and a new non-ε list is generated.

[S207] A state still having ε transition is extracted from elements in ε list and new ε list is generated. Processing is returned to the step S203 and e transition is replaced based upon new ε list and new non-ε list.

[S208] It is judged whether an end state having w transition exists or not in the produced complementing automaton. If an end state exists, processing proceeds to a step S209 and if it does not exist, processing is returned to the step S56 shown in FIG. 15 outside this flowchart because the replacement of ε transition is normally finished.

[S209] When an end state having w transition exists or when non-ε list is blank though ε list is not blank, the replacement of ε transition results in failure. A message telling complementation is disabled is output and processing is returned to the step S56 shown in FIG. 15.

Figure 29:
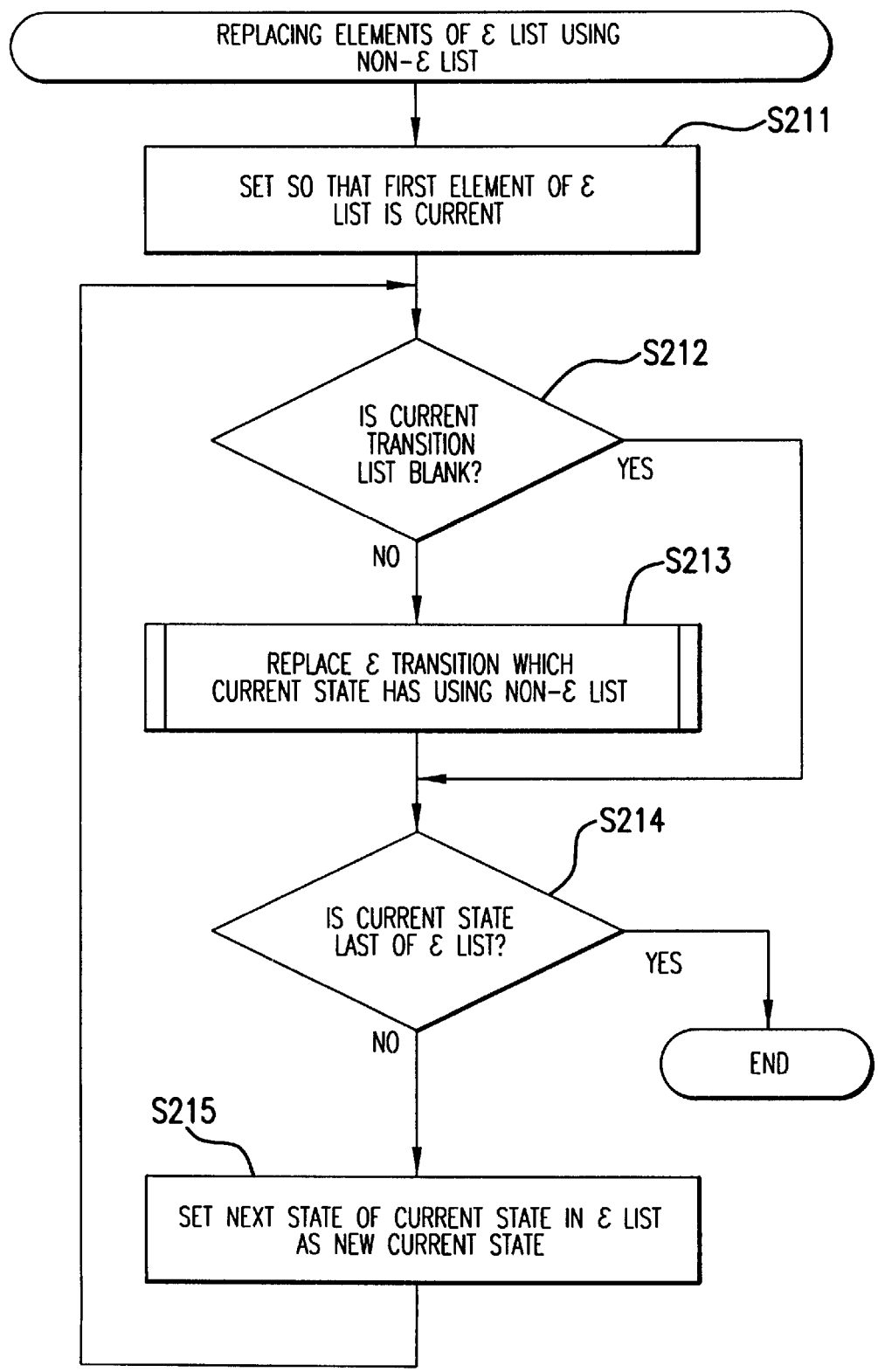
FIG. 29 is a flowchart showing a procedure for replacing $\epsilon$ transition which an element in $\epsilon$ list has using non-$\epsilon$ list.

Next, a procedure for processing for replacing ε transition which elements in ε list have using non-ε list will be described. FIG. 29 is a flowchart showing the procedure for processing for replacing ε transition which elements in ε list have using non-ε list. This processing is equivalent to the step S205 in the flowchart shown in FIG. 28 and executed by the automaton producing section 27a in the complementing section 27 after the production of a basic automaton. The following description is based upon step numbers shown in FIG. 29.

[S211] The first element in ε list is set so that it is current.

[S212] It is judged whether the transition list of the current state is blank or not. If the list is blank, processing proceeds to a step S214 and if it is not blank, processing proceeds to a step S213.

[S213] ε transition which the current state has is replaced using non-ε list. The procedure of this processing will be described later.

[S214] It is judged whether the current state is the last one in ε list or not. If the current state is the last one, this processing is terminated. If not, processing proceeds to a step S215.

[S215] A state next to the current state in ε list is set as the new current state and processing is returned to the step S212.

Figure 30:
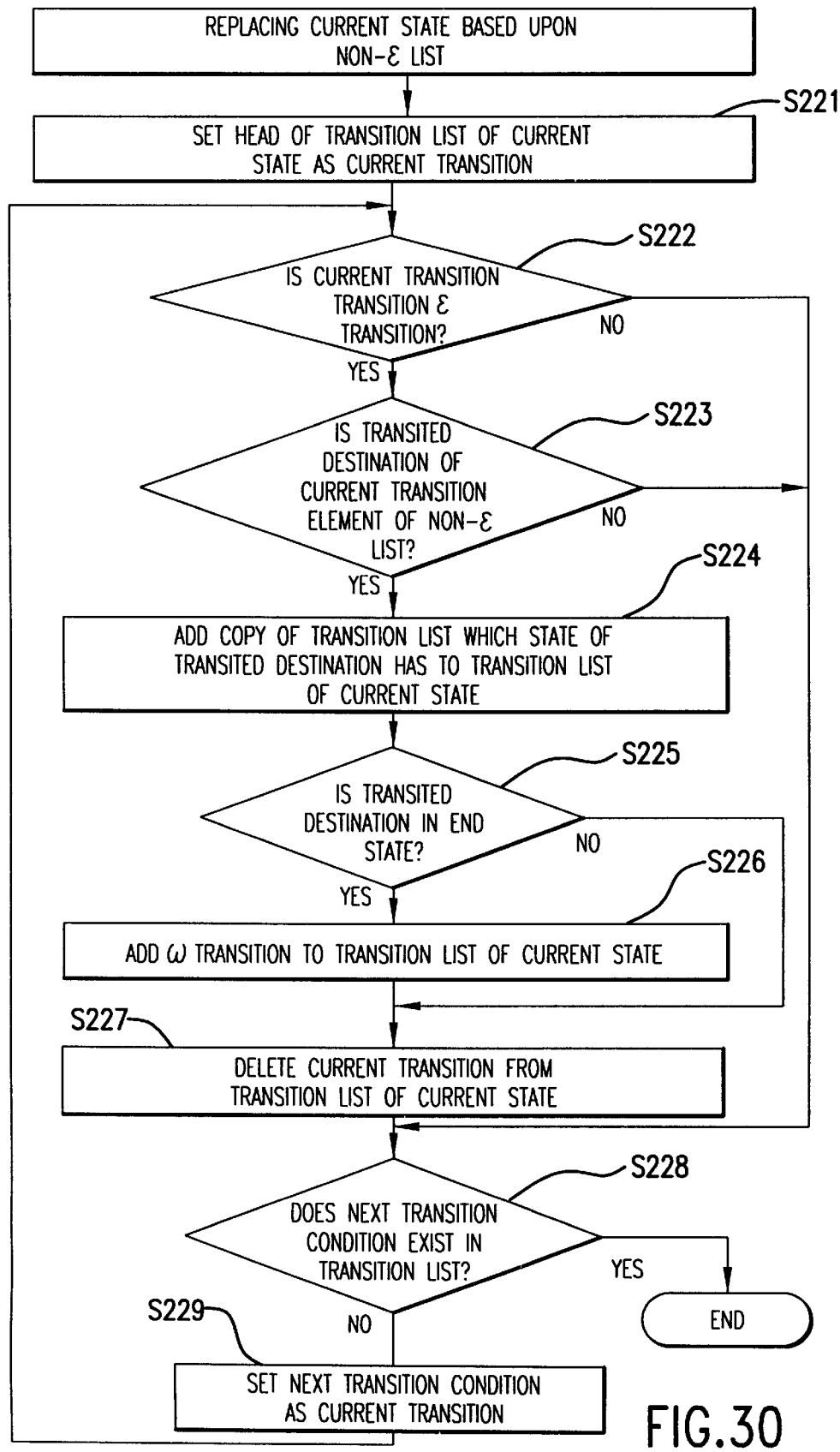
FIG. 30 is a flowchart showing a procedure for replacing $\epsilon$ transition which the current state has using non-$\epsilon$ list.

Next, a procedure for processing for replacing ε transition which the current state has using non-ε list will be described. FIG. 30 is a flowchart showing the procedure for processing for replacing ε transition which the current state has using non-ε list. This processing is equivalent to the step S213 in the flowchart shown in FIG. 29 and executed by the automaton producing section 27a in the complementing section 27 after the production of a basic automaton. The following description is based upon step numbers shown in FIG. 30.

[S221] A transition condition at the head of the transition list of the current state is set as the current transition.

[S222] It is judged whether the current transition is ε transition or not. If it is ε transition, processing proceeds to a step S223 and if it is not ε transition, processing proceeds to a step S228.

[S223] It is judged whether a state which is the destination of the current transition is an element in non-ε list or not. If the state is an element in non-ε list, processing proceeds to a step S224 and if it is not an element in non-ε list, processing proceeds to the step S228.

[S224] A transition list which a state which is the destination of the current transition has is copied and is added to the transition list of the current state. At that time, ε flag is set to T and a pointer showing the destination of transition is connected to the destination of the current transition.

[S225] It is judged whether a state which is the destination of the current transition is an end state (an end state flag is set to T) or not. If the state is an end state, processing proceeds to a step S226 and if the state is not an end state, processing proceeds to a step S227.

[S226] ω transition is added to the transition list of the current state. This ω transition is a transition condition with the label of 'ω', ε flag of which is set to T and under which a pointer showing the destination of transition is connected to the destination of the current transition.

[S227] The current transition is deleted from the transition list of the current state.

[S228] It is judged whether the next transition condition exists or not in the transition list. If the next transition does not exist, this processing is terminated. If the next transition exists, processing proceeds to a step S229.

[S229] A transition condition the existence of which is verified in the step S228 is set as the current transition and processing is returned to the step S222.

ε transition is replaced according to the above procedure. That is, ε transition is replaced with the transition condition of a reachable state from the ε transition and the label of the type name is obtained. ε flag of the newly replaced transition condition is set to T so that it can be distinguished that the transition condition is originally ε transition. If a reachable state from the ε transition is an end state, ω transition is also added in a transition list so that transition is performed even if no node to be read exists.

An example in which ε transition is replaced by a basic automaton will be given below.

Figure 31:
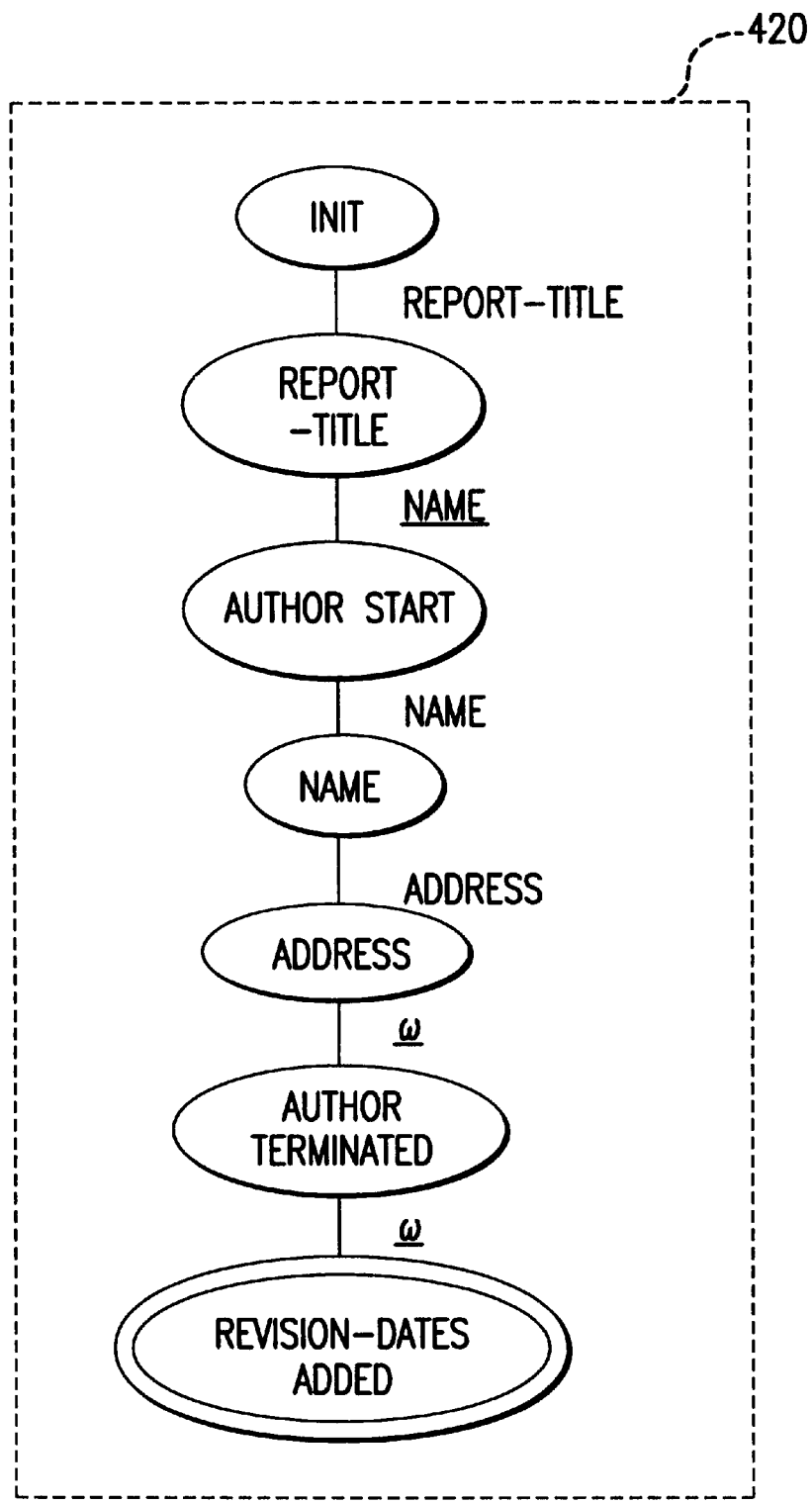
FIG. 31 shows a complementing automaton produced by applying processing for replacing $\epsilon$ transition to the basic automaton shown in FIG. 25.

FIG. 31 shows a complementing automaton 420 produced by replacing ε transition by the basic automaton 320 shown in FIG. 25.

The complementing automaton 420 is constituted by an initial state Init, a Report-title state, an Author start state, a Name state, an Address state, an Author terminated state and Revision-dates added state.

Transition from the Report-title state which is ε transition in the basic automaton to the Author start state is executed by reading a node named Name. Transition from the Address state to the Author terminated state and transition from the Author terminated state to the Revision-dates added state are performed according to ω transition. Transition to the Revision—dates added state is enabled by the existence of this ω transition even if no node to be read exists and a node named Revision dates can be added.

It can be distinguished whether ε transition is replaced or not by setting ε flag for a transition condition which is originally ε transition to T. Transition by a transition condition which is originally ε transition is shown by underlining a label in FIG. 31. Similarly in drawings showing the following complementing automatons, replacement from ε transition is shown by underlining a label.

Figure 32:
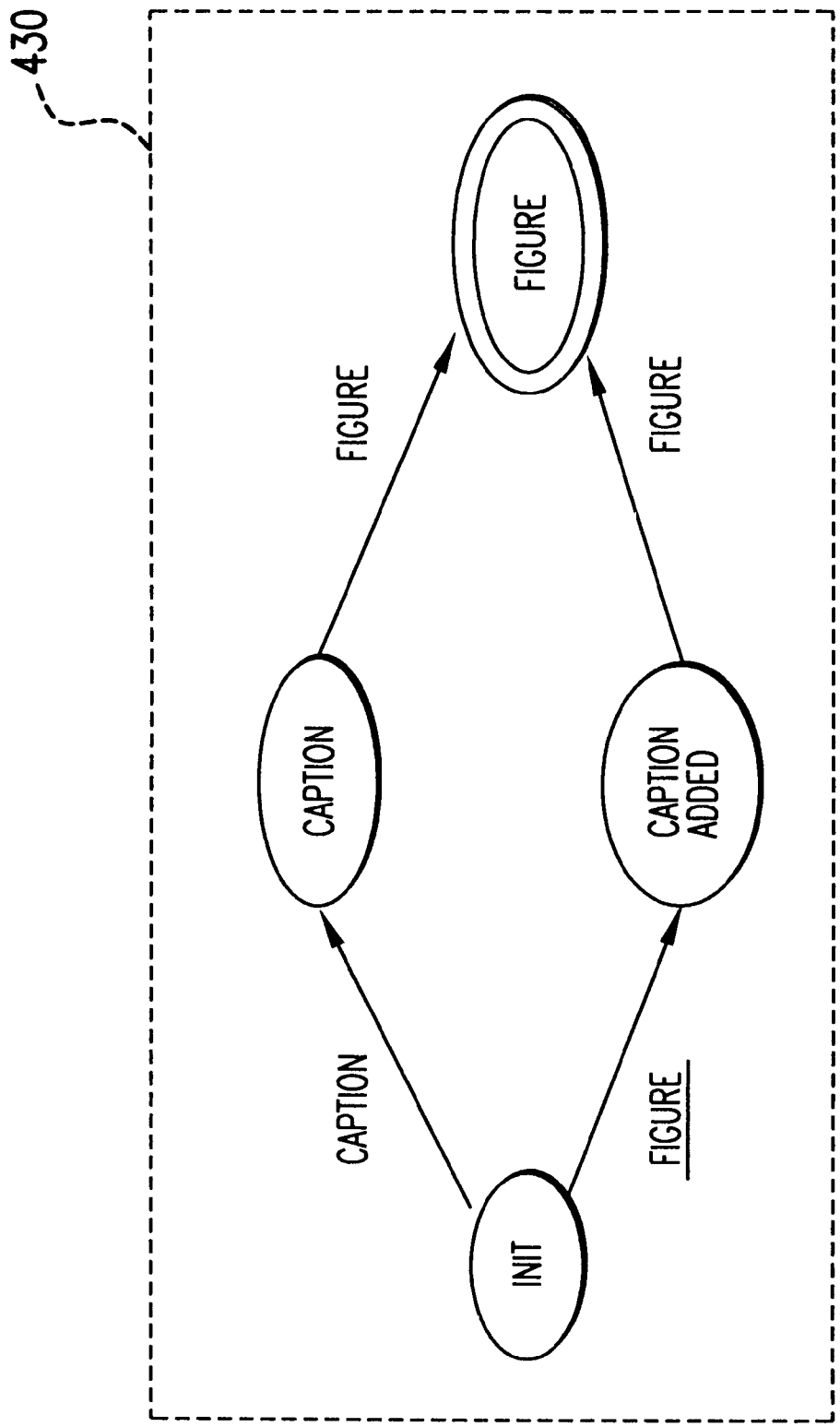
FIG. 32 shows a complementing automaton produced by applying processing for replacing $\epsilon$ transition to the basic automaton shown in FIG. 26.

FIG. 32 shows a complementing automaton 430 produced by replacing ε transition by the basic automaton 330 shown in FIG. 26.

The complementing automaton 430 is constituted by an initial state Init, a Caption state, a Caption added state and a Figure state.

Transition from the initial state Init which is ε transition in the basic automaton to the Caption added state is executed by reading a node named Figure.

Figure 33:
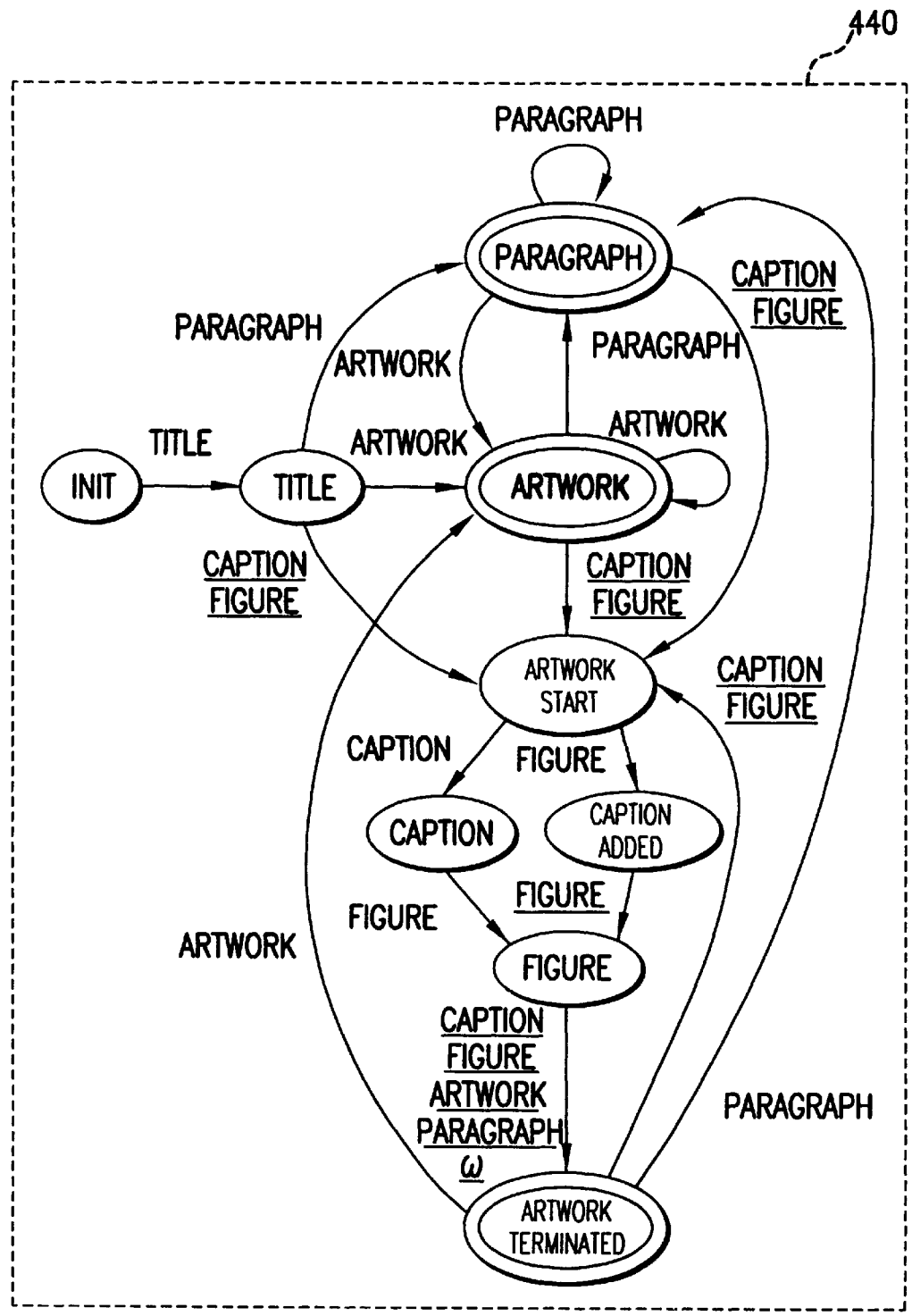
FIG. 33 shows a complementing automaton produced by applying processing for replacing $\epsilon$ transition to the basic automaton shown in FIG. 27.

FIG. 33 shows a complementing automaton 440 produced by replacing transition by the basic automaton 340 shown in FIG. 27.

The complementing automaton 440 is constituted by an initial state Init, a Title state, an Artwork state, a Paragraph state, an Artwork start state, a Caption state, a Caption added state, a Figure state and an Artwork terminated state.

Transition from the Title state which is ε transition in the basic automaton to the Artwork start state is executed by reading a node named Caption or by reading a node named Figure. Transition from the Artwork state to the Artwork start state is executed by reading the node Caption or by reading the node Figure.

Transition from the Paragraph state to the Artwork start state is executed by reading the node Caption or by reading the node Figure. Transition from the Artwork start state to the Caption added state is executed by reading the node Figure.

Transition from the Figure state to the Artwork terminated state is executed by reading the node Caption, by reading the node Figure, by reading a node named Artwork or by reading a node named Paragraph. Transition from the Figure state to the Artwork terminated state is performed according to ω transition, that is, also when no node to be read exists. Transition from the Figure state to the Artwork terminated state is enabled by the existence of this ω transition even if no node to be read exists in the Figure state and the end state of this complementing automaton can be reached.

Further, transition from the Artwork terminated state to the Artwork start state is executed by reading the node Caption or by reading the node Figure.

Figure 34:
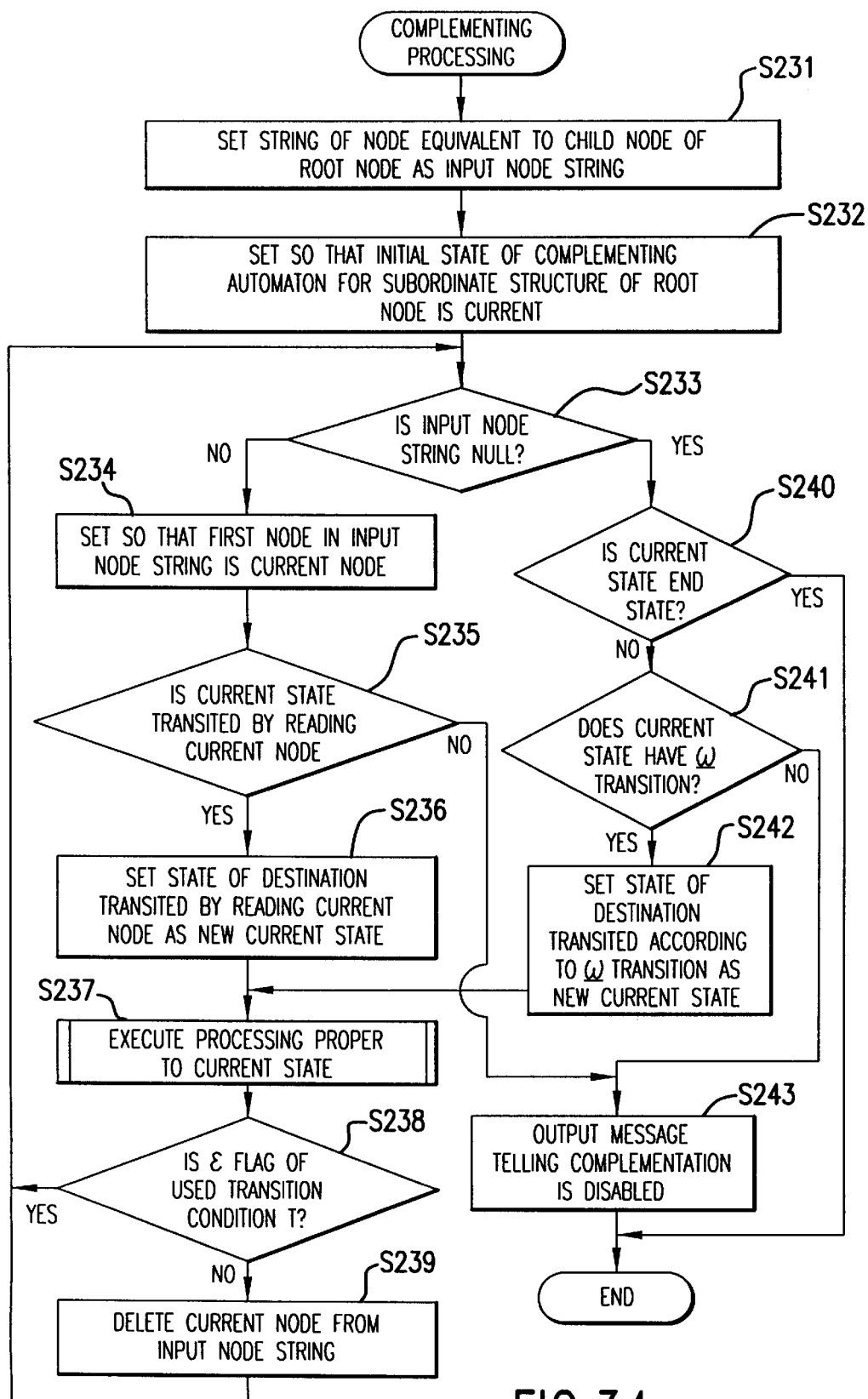
FIG. 34 is a flowchart showing the rough procedure of complementing processing.

Next, a procedure for processing for complementing in the document structure of a pre-complemented document utilizing the produced complementing automaton will be described. FIG. 34 is a flowchart showing the rough procedure of complementing processing. This processing is equivalent to the step S6 in the flowchart shown in FIG. 3 and executed by the automaton applying section 27b in the complementing section 27 shown in FIG. 2. The following description is based upon step numbers shown in FIG. 34.

[S231] It is supposed that a node string existing as the child of a root node in the document structure of a pre-complemented document is an input node string. It is supposed that a node string added as a child to the corresponding root node with the root node of the pre-complemented document in the produced document structure is an output node string.

[S232] An initial state in the state list of the complementing automaton for the subordinate structure of the root node out of the produced complementing automatons is set as the current state.

[S233] It is judged whether the input node string is blank or not. If it is not blank, processing proceeds to a step S234 and if it is blank, processing proceeds to a step S240.

[S234] A node at the head of the input node string is set as the current node.

[S235] It is judged whether the current state is transferred by reading the current node or not. If the current state is transferred, processing proceeds to a step S236 and if not, processing proceeds to a step 243. The transition list of the current state is required to be checked so as to judge whether transition is performed by reading the current node or not. In this case, it is already verified that the input node string is not blank and ω transition is never performed. Therefore, if transition condition in which the type name which the current node has is entered in the field of the label exists in the transition list of the current state, the current state is transferred based upon the transition condition.

[S236] A state of the destination to which transition is performed by reading the current node and the existence of which is verified in the step S235 is set the current state and processing proceeds to a step S237.

[S237] Processing proper to the current state is executed for the current state obtained by the above processing. The procedure of this processing will be described later.

[S238] It is judged based upon the procedure to the step S237 whether ε flag for a transition condition used for transferring to the new current state is 'T' or not. If ε flag is set to not 'T' but 'N', processing proceeds to a step 239 and if it is set to 'T', processing is returned to the step S233.

[S239] It means the type name of the current node is not required to be used as the label of a transition condition in later processing that ε flag for a transition condition is set to N. Therefore, the current node is deleted from the input node string.

[S240] It is judged whether the current state is an end state or not. If the current state is an end state, processing is returned to the step S7 shown in FIG. 3 outside this flowchart because the above means that this complementing processing is normally finished. If the current state is not an end state, processing proceeds to a step S241.

[S241] It is judged whether ω transition exists or not in the transition list of the current state. If ω transition exists, processing proceeds to a step S242. If it does not exist, processing proceeds to a step S243.

[S242] The state of the destination of transition when transition is performed according to ω transition the existence of which is verified in the step S241 is set as the new current state and processing is returned to the step S237.

[S243] As the transition of a state is disabled though processing does not proceed to an end state yet, a message telling complementation is disabled is output and processing is terminated.

Figure 35:
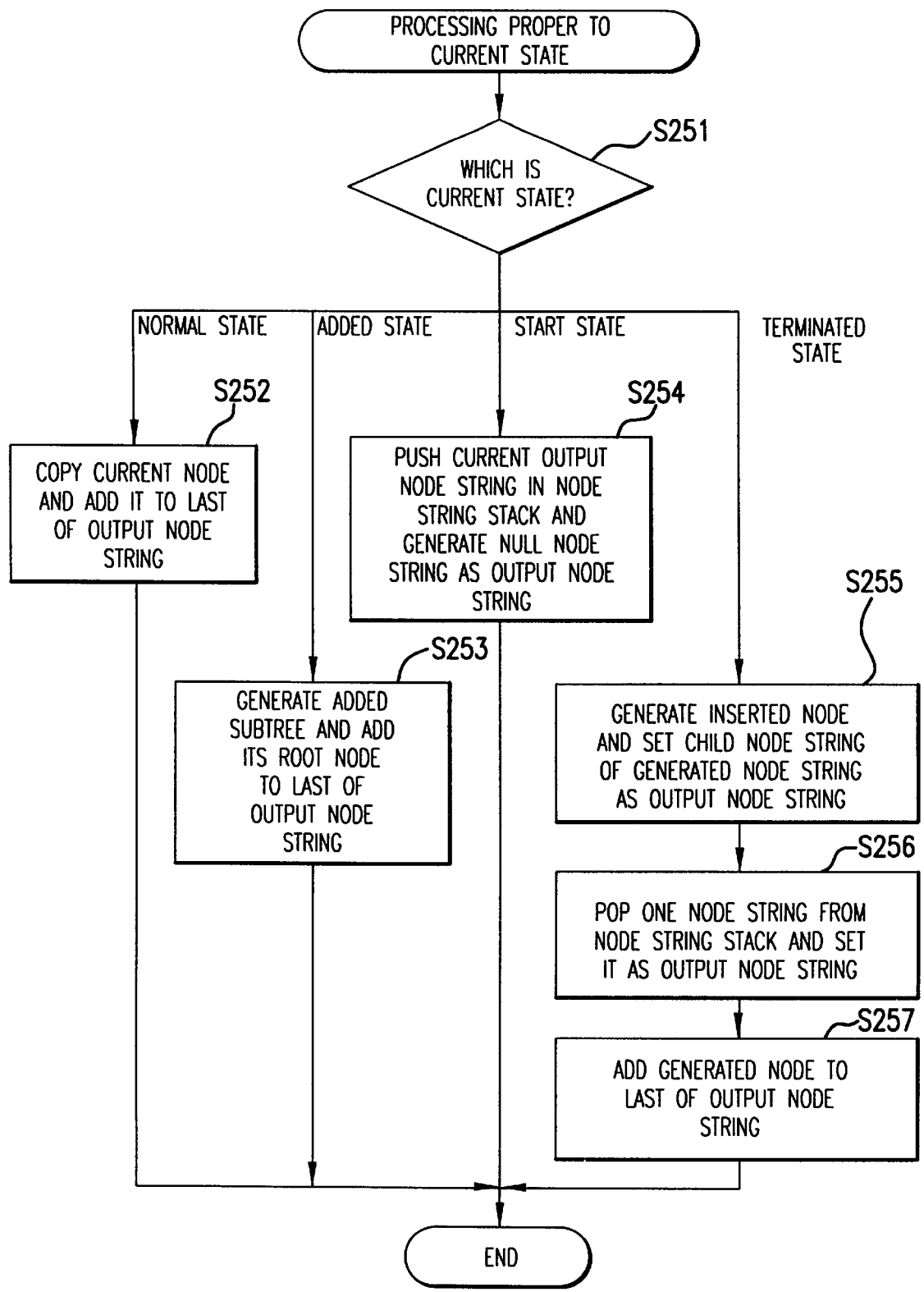
FIG. 35 is a flowchart showing the procedure of processing proper to the current state.

A procedure for processing proper to the current state will be described below. FIG. 35 is a flowchart showing the procedure for processing proper to the current state. This processing is equivalent to the step S237 in the flowchart shown in FIG. 34 and executed by the automaton applying section 27b in the complementing section 27 shown in FIG. 2. The following description is based upon step numbers shown in FIG. 35.

[S251] It is judged which the current state is. That is, it is judged by checking the state type of the current state which the current state is of a normal state, an added state, a start state and a terminated state. If the current state is a normal state, processing proceeds to a step S252, if it is an added state, processing proceeds to a step S253, if it is a start state, processing proceeds to a step S254 and if it is a terminated state, processing proceeds to a step S255.

[S252] The current node is copied and added to the last of the current output node string.

[S253] An added subtree is generated and the root node of the subtree is added to the last of the output node string. The subtree generated in this step is a subtree which meets the structural constraint of the output document class in which a node with a type name stored in a pair with a complementing action "addition" in the specification of complementation is a root node.

[S254] The current output node string is pushed (meaning that data is stored in a stack) onto a node string stack (an area in which a node string is temporarily stored and according to LIFO, that is, provided with a property that data stored last is first popped) and a blank node string which is to be an output node string is generated.

[S255] An inserted node is generated and the output node string becomes children of the inserted node. The node generated in this step is a node with a type name corresponding to a terminated state.

[S256] One node string which is to be an output node string is popped (meaning data is fetched from the stack) from the node string stack.

[S257] The node generated in the step S255 is added to the last of the output node string.

Figure 36:
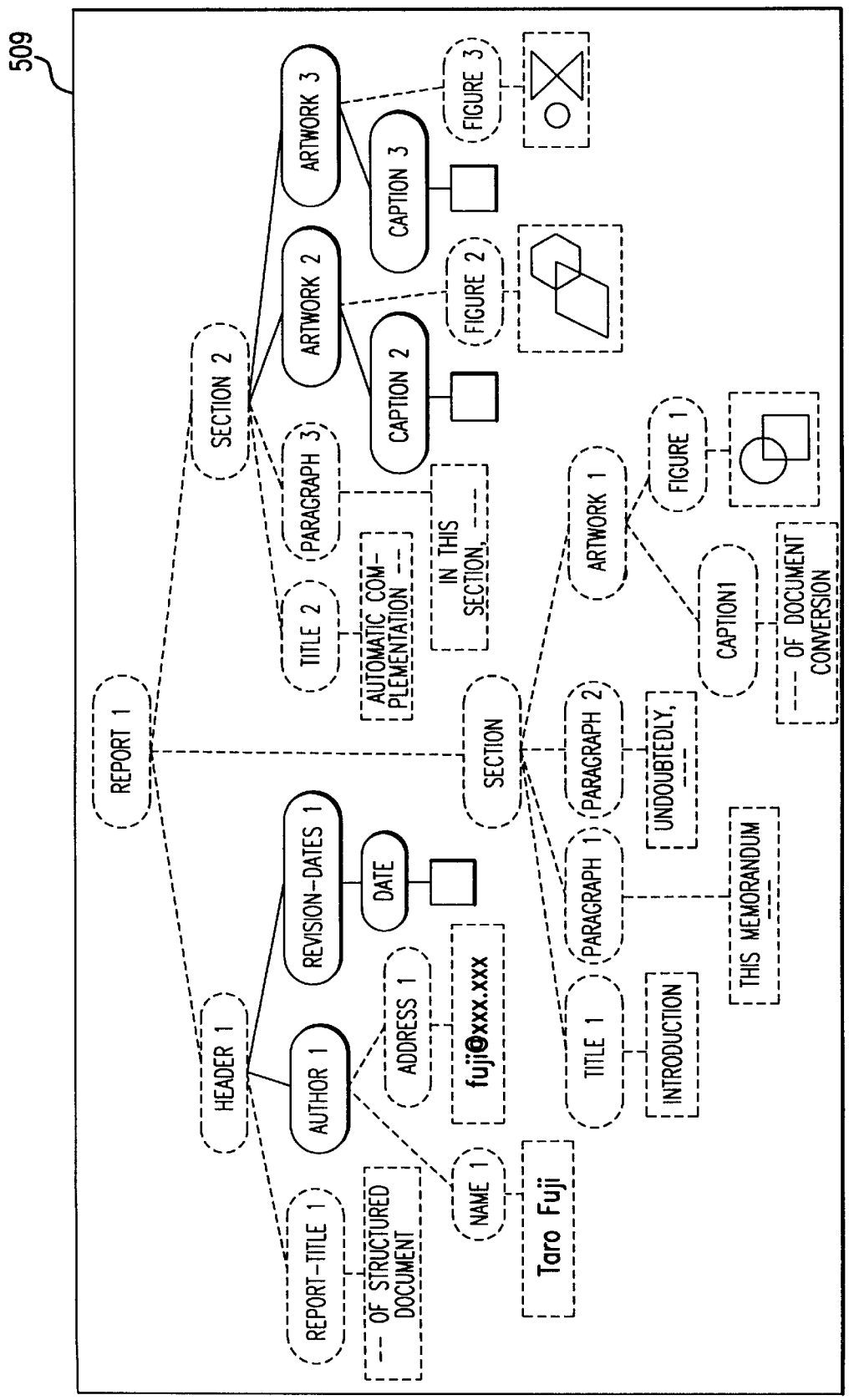
FIG. 36 shows document structure composed by applying the complementing automatons shown in FIGS. 31 to 33 to the pre-complemented document structure shown in FIG. 11.

The document structure of a pre-complemented document can be composed according to a desired document class by complementing according to the above procedure. FIG. 36 shows document structure composed by applying the complementing automaton 420 shown in FIG. 31, the complementing automaton 430 shown in FIG. 32 and the complementing automaton 440 shown in FIG. 33 to the pre-complemented document structure 210 shown in FIG. 11.

Document structure 509 has all the contents of nodes as the result 110 of analyzing the document structure of the document data titled Technical memorandum shown in FIG. 8 and is constituted completely according to a document class titled Technical report. A part shown by a dotted line in FIG. 36 is a part included in the pre-complemented document structure 210 and a part shown by a solid line is a part supplemented by complementing processing. As it is not the object of the present invention to generate data not included in an original document newly, a blank is provided if a complemented node has the contents.

Figure 37:
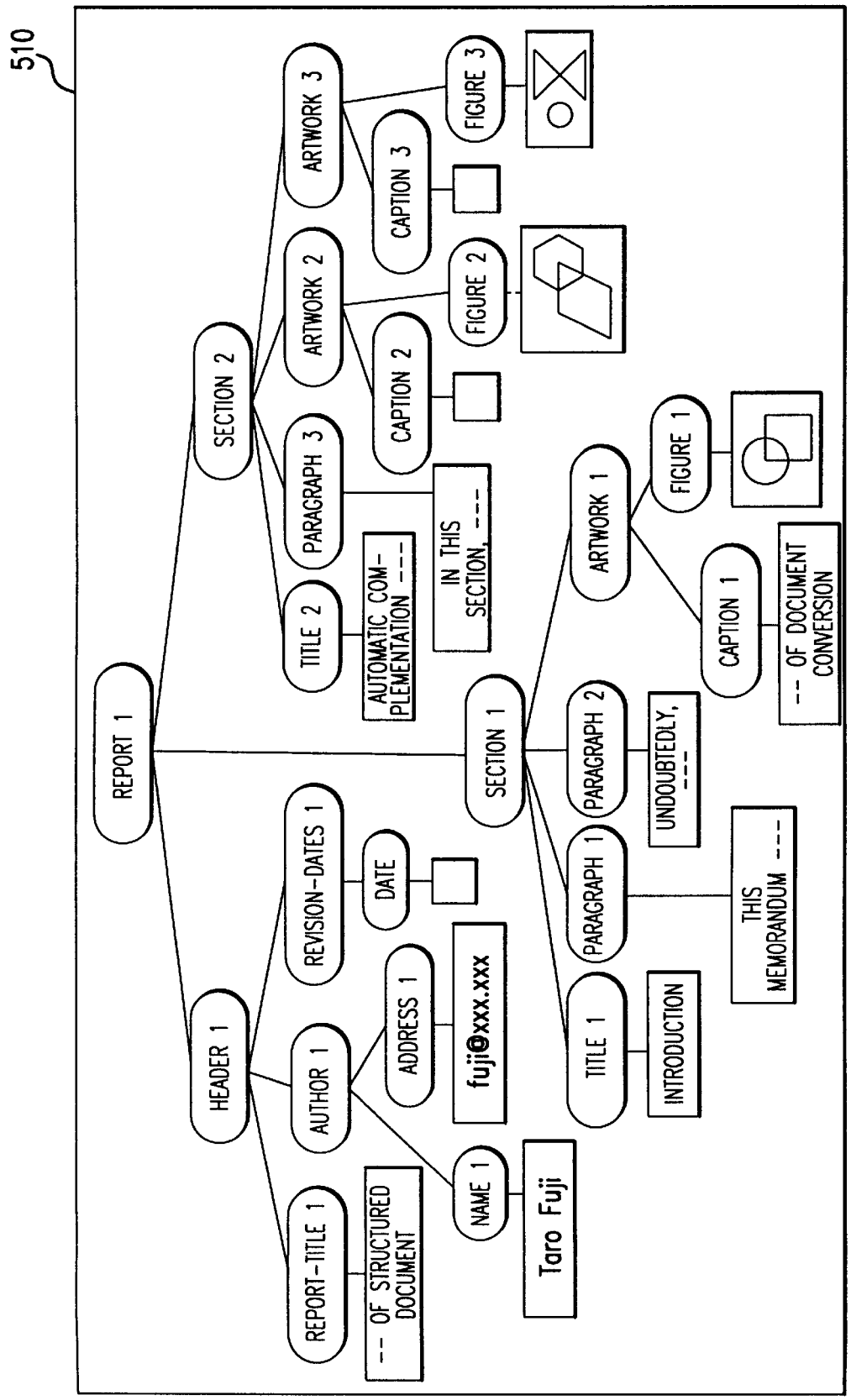
FIG. 37 shows adapted document structure generated by converting the result of analyzing the document structure of the document data of the document class titled Technical memorandum shown in FIG. 8 for complying with the document class titled Technical report.

Next, it will be described below what document structure a completed structure document has. FIG. 37 shows adapted document structure converted so that the result 110 of analyzing the document structure of the document data of the document class titled Technical memorandum shown in FIG. 8 is adapted to the document class titled Technical report.

An adapted structured document 510 completely meets the type definition 501 of nodes of the document class titled Technical report shown in FIG. 6 and a structural constraint 502 defining the connectional relationship among nodes shown in FIG. 7.

A method of complementation can be determined based upon the structure of the whole document by using the above document structure composing apparatus and a suitable structured document can be obtained. That is, as a complementing automaton for executing complementation grasps any connectional relationship among nodes in a pre-complemented document and complements after verifying individual relationship, the complementation in a part of document structure never has a bad effect upon the other part. The complementation of a large-scale document and a document with complicated structure which cannot be executed manually is also enabled. Further, as a user can specify complementation for this document structure composing apparatus, he/she can specify complementation again if the result of complementation is bad. As there are generally plural method of complementation, a user can select a method of complementation and obtain a good structured document.

Figure 38:
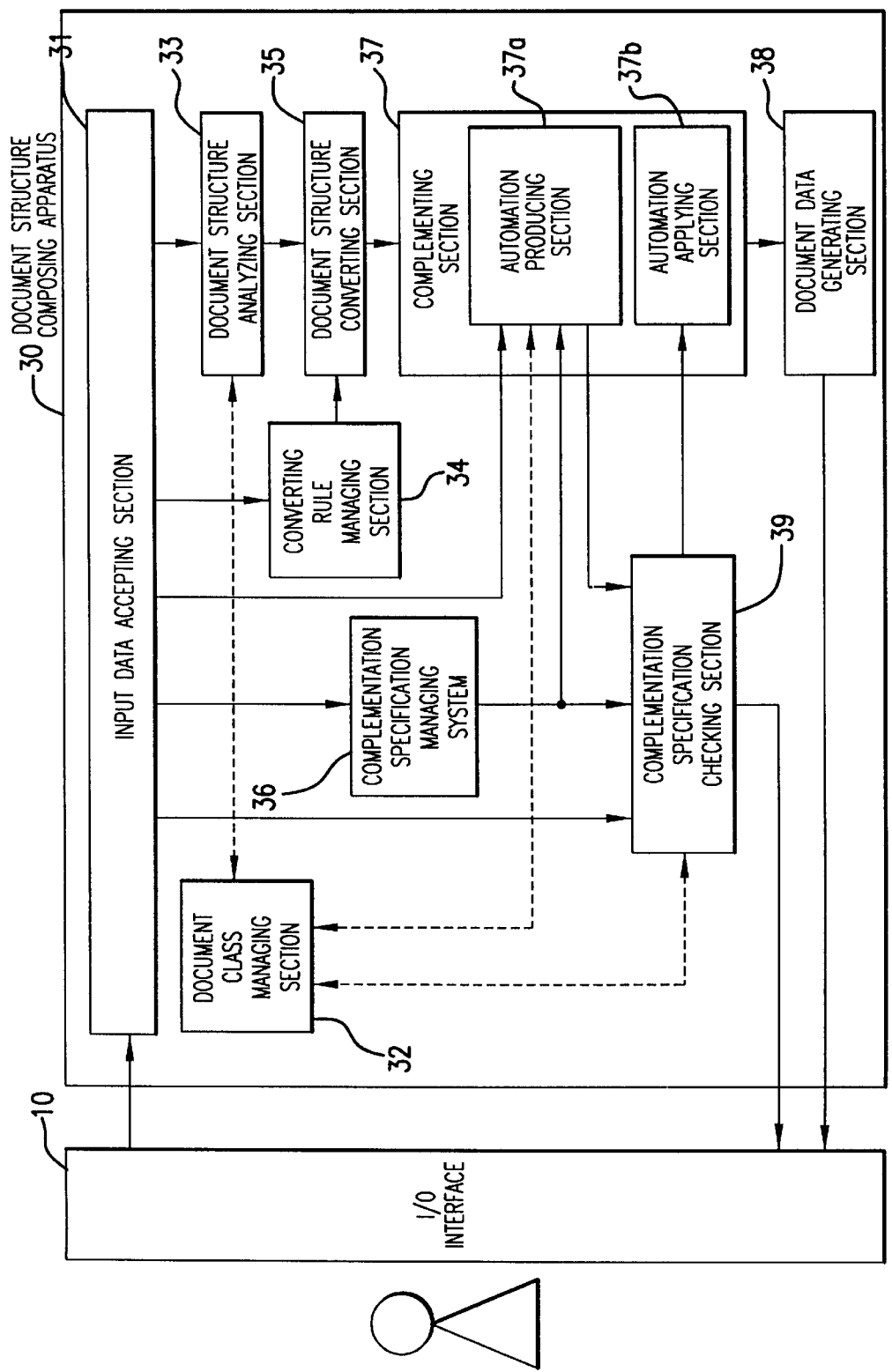
FIG. 38 is a block diagram showing the configuration in a second embodiment of the document structure composing apparatus.

Next, the detailed configuration of a second embodiment according to the present invention will be described. FIG. 38 is a block diagram showing the configuration of the second embodiment of a document structure composing apparatus. The configuration of the second embodiment is basically the same as that of the first embodiment shown in FIG. 2.

A document structure composing apparatus 30 according to the present invention receives data required for composing a result document from a user via an I/O interface 10, composes a result document based upon input data and outputs the result document to the user via the I/O interface 10.

The required data in this case includes original document data, an input document class name and an output document class name as data required by the document structure composing apparatus in the first embodiment. The specification of complementation is also enabled.

The document structure composing apparatus 30 is constituted by an input data accepting section 31 for accepting input data, a document class managing section 32 for managing the definition information of a document class, a document structure analyzing section 33 for analyzing input original document data, a converting rule managing section 34 for managing a converting rule between different document classes, a document structure converting section 35 for converting document structure, a complementation specification managing section 36 for managing the specification of complementation, a complementing section 37 for executing complementation, a document data generating section 38 for converting complemented document structure to structured document data and outputting it and a complementation specification checking section 39 for checking the specification of complementation.

When the input data accepting section 31 accepts the input of data via the I/O interface 10, it sends original document data to the document structure analyzing section 33, sends an input document class name to the document structure analyzing section 33, the converting rule managing section 34 and the complementation specification managing section 35 and sends an output document class name to the converting rule managing section 34, the complementation specification managing section 36, an automaton producing section 37a in the complementing section 37 and the complementation specification checking section 39.

The document class managing section 32 stores and manages any definition information of a document class which can be processed by this document structure composing apparatus 30 and supplies definition information in response to the request of each section. The flow of requesting document class definition information to the document class managing section 32 and supplying document class definition information from the document class managing section 32 in FIG. 38 is shown by a broken line.

The document structure analyzing section 33 recognizes an input document class name and requests the definition information of the corresponding document class from the document class managing section 32. When the document structure analyzing section receives the supplied definition information, it checks original document data with the definition information, checks the logical structure and sends correlation between the component of the original document data and the component type of the input document class to the document structure converting section 35.

The converting rule managing section 34 stores and manages all converting rules defining how the component type of a document class is to be converted to that of a document class which is an output document class when each of plural document classes which can be processed by this document structure composing apparatus 30 is converted as an input document class. When an input document class name and an output document class name are input, a converting rule corresponding to the two document class names is supplied to the document structure converting section 35.

The correlation between the component of original document data and the component type of an input document class is supplied from the document structure analyzing section 33 to the document structure converting section 35 and a rule for converting the input document class to an output document class is supplied from the converting rule managing section 34 to the document structure converting section 35. Afterward, the original document data is converted based upon the supplied converting rule and pre-complemented document data is composed. The pre-complemented document data is sent to the complementing section 37.

The complementation specification managing section 36 stores and manages the specification of complementation specifying what complementation is to be performed for the component of a document class which can be processed by this document structure composing apparatus 30 based upon an input document class name and an output document class name. When the input document class name and the output document class name are input, the specification of complementation corresponding to the two document class names is supplied to the complementing section 37. A user can specify complementation and update the specification of complementation if necessary. In this case, the user is required to input the specification of complementation in addition to original document data, an input document class name and an output document class name.

The complementation specification checking section 39 checks whether the specification of complementation managed by the complementation specification managing section 36 contradicts with the definition information of an output document class or not. That is, the above section requests the definition information of an output document class from the document class managing section 32 based upon an output document class name input from the input data accepting section 31 and matches this information and the specification of complementation. The complementation specification checking section reads a complementing automaton from the automaton producing section 37a in the complementing section 37 described later and judges whether this complementing automaton contradicts with the definition information of the output document class or not. The result of judging whether the specification of complementation and a complementing automaton are normal or not by the complementation specification checking section is informed to the complementing section 37. If the specification of complementation or a complementing automaton contradicts with the definition information of an output document class, it is informed a user via the I/O interface 10 that complementation cannot be normally executed.

The complementing section 37 is constituted by the automaton producing section 37a and the automaton applying section 37b and performs complementation in a pre-complemented document utilizing a state transition machine called an automaton. The automaton producing section 37a requests the definition information of an output document class from the document class managing section 32 based upon an output document class name input from the input data accepting section 31 and produces a complementing automaton based upon the above information and the specification of complementation supplied from the complementation specification managing section 36. The automaton applying section 37b complements a pre-complemented document utilizing the complementing automaton produced by the automaton producing section 37a when the automaton applying section receives information that the specification of complementation and the complementing automaton are normal from the complementation specification checking section 39 and composes document structure according to the output document class. If the automaton applying section receives information that the specification of complementation or a complementing automaton is not normal, the composition of a structured document is stopped without executing complementation.

The document data generating section 38 converts a structured document composed by the complementing section 37 to document data and outputs the converted document data to a user via the I/O interface 10.

Figure 39:
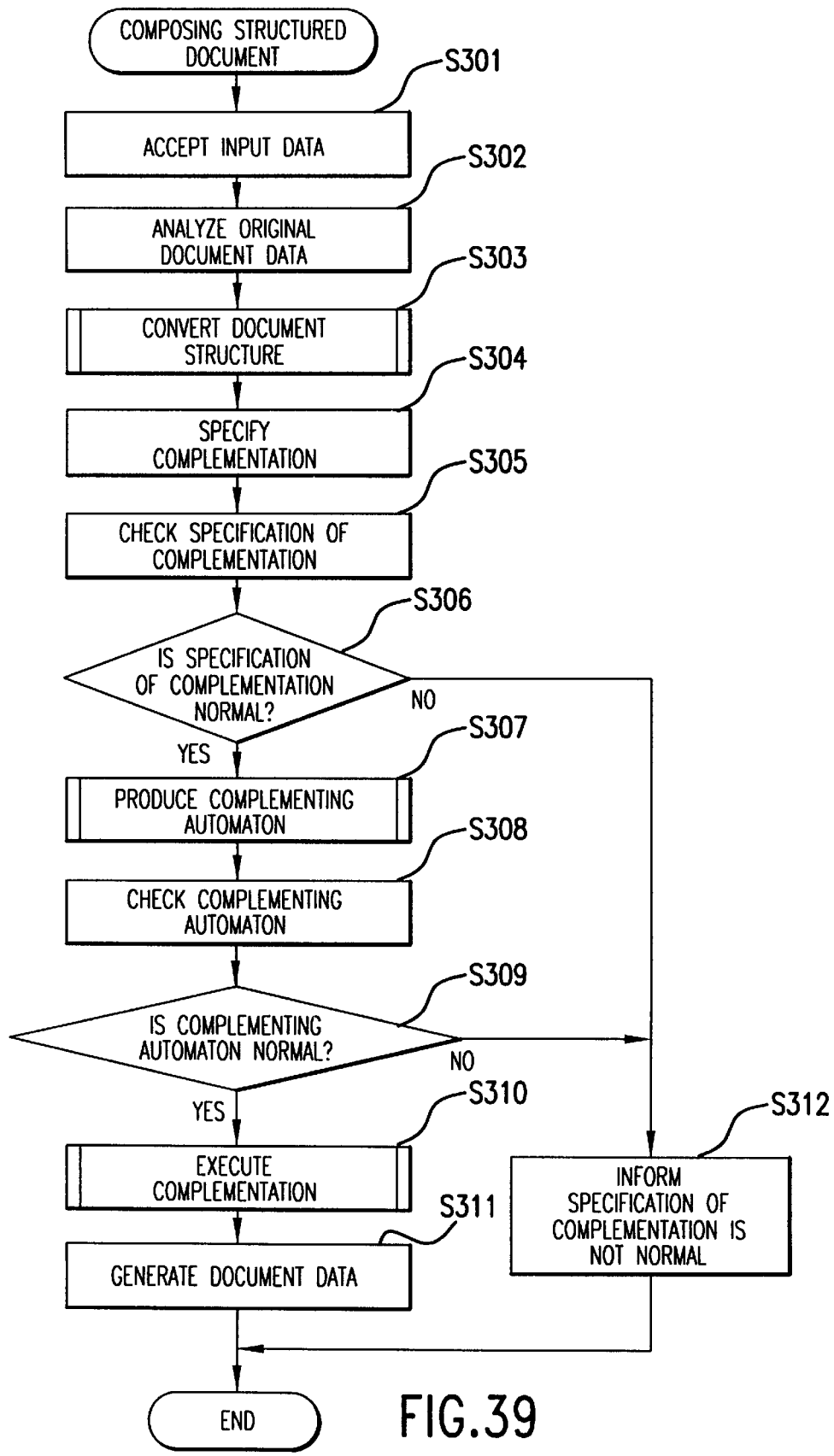
FIG. 39 is a flowchart showing a procedure for composing a structured document using the document structure composing apparatus in the second embodiment.

Next, a procedure for composing a structured document using this document structure composing apparatus 30 will be described. FIG. 39 is a flowchart showing a procedure for composing a structured document. The following description is based upon step numbers shown in FIG. 39.

[S301] The input data accepting section 31 accepts input data via the I/O interface 10. Input data includes original document data, an input document class name and an output document class name. If a user desires, the input data accepting section also accepts the specification of complementation.

[S302] The document structure analyzing section 33 analyzes the original document data based upon the definition information of an input document class and extracts document structure. Definition information required for analyzing a document can be obtained by requesting it from the document class managing section 32 based upon an input document class name input from the input data accepting section 31.

[S303] The converting rule managing section 34 determines a converting rule based upon the input document class name and an output document class name and supplies it to the document structure converting section 35. The document structure converting section 35 converts the document structure of an original document based upon the supplied converting rule and composes a pre-complemented document. The above converting processing is the same as that in the first embodiment.

[S304] The complementation specification managing section 36 determines the specification of complementation and supplies it to the complementation specification checking section 39 and the complementing section 37. For the specification of complementation, if the specification by a user is included in input data, the specification of complementation is used and if the specification by a user is not included, the specification of complementation selected based upon the input document class name and the output document class name is used.

[S305] The complementation specification checking section 39 which receives the supplied specification of complementation requests the definition information of the output document class to the document class managing section 32 based upon the input output document class name and checks whether the specification of complementation is normal or not based upon the obtained definition information. That is, it is judged whether all the types of nodes for which complementation is specified are included or not in the definition information of the output document class.

[S306] The result of the check in the step S305 is informed to the automaton producing section 37a in the complementing section 37 from the complementation specification checking section 39. If the specification of complementation is judged normal, processing proceeds to a step S307. If the specification of complementation is judged not to be normal, processing proceeds to a step 312.

[S307] The automaton producing section 37a in the complementing section 37 produces a complementing automaton based upon the definition information of the output document class and the supplied specification of complementation. Processing for producing this complementing automaton is the same as that in the first embodiment.

[S308] The complementation specification checking section 39 reads the complementing automaton produced by the automaton producing section 37a in the step S307 and checks whether the read complementing automaton is normal or not. That is, it is judged whether the specification in which complemented node and subtree and their positions cannot be uniquely determined is made or not.

[S309] The result of the check in the step S308 is informed to the automaton applying section 37b in the complementing section 37 from the complementation specification checking section 39. If the complementing automaton is judged normal, processing proceeds to a step S310. If the complementing automaton is judged not to be normal, processing proceeds to a step S312.

[S310] The automaton applying section 37b in the complementing section 37 actually operates the complementing automaton, performs complementation in a pre-complemented document and composes a structured document. The composed structured document is sent to the document data generating section 38. Processing for composing a structured document in this step is the same as that in the first embodiment.

[S311] The document data generating section 38 generates document data based upon the sent structured document and outputs the generated document data to a user via the I/O interface.

[S312] If the specification of complementation or the complementing automaton is not normal, a structured document cannot be correctly generated. It is informed to a user via the I/O interface 10 that the specification of complementation is not correct and this processing is terminated.

What occurs if the complementation specification managing section 36 determines the wrong specification of complementation will be described below.

Figure 40:
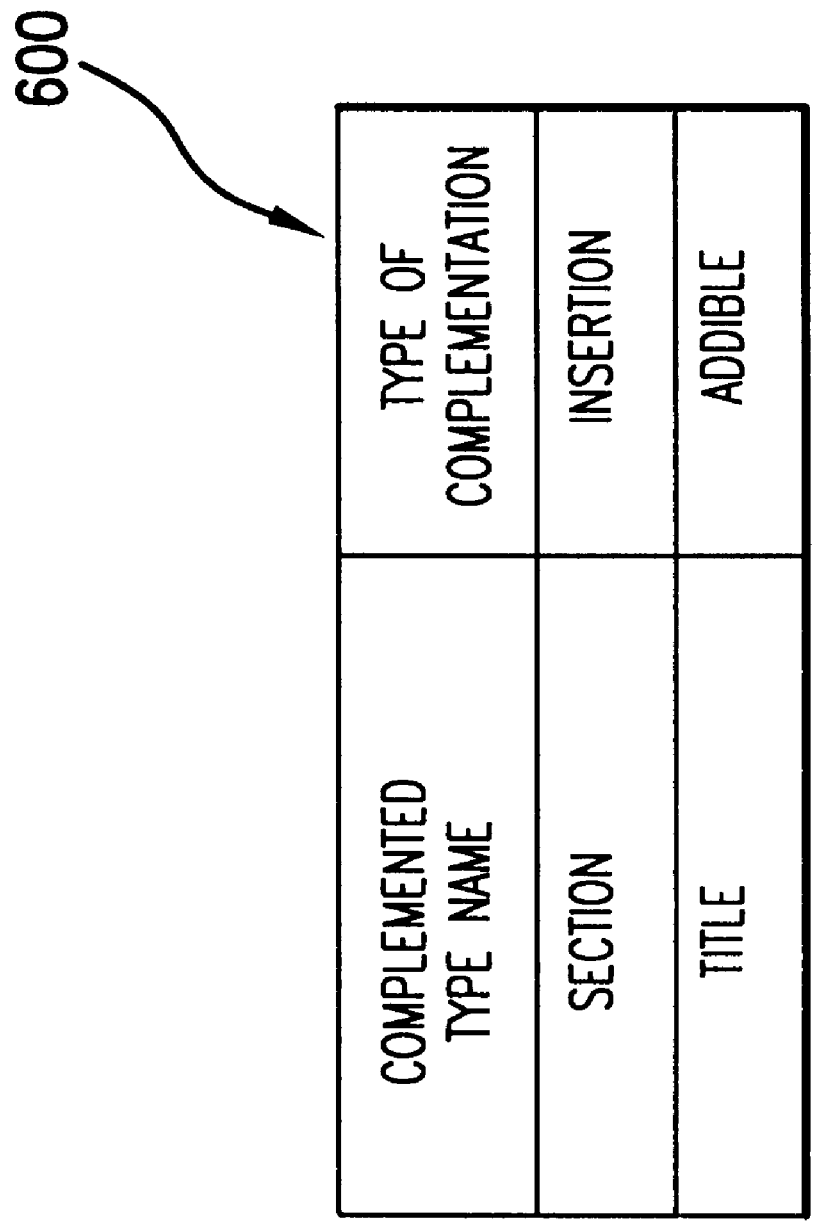
FIG. 40 shows the wrong specification of complementation for the input document class name of Technical memorandum and the output document class name of Technical report.

FIG. 40 shows the wrong specification of complementation for an input document class name titled Technical memorandum and an output document class name titled Technical report. This specification of complementation 600 is stored in the complementation specification managing section 36 in sets of a pair of the input document class name titled Technical memorandum and the output document class name titled Technical report and when both document class names are input, the specification of complementation is supplied to the automaton producing section 37a in the complementing section 37.

According to this specification of complementation 600, when a complementing automaton for composing a structured document is produced after the document data of the document class titled Technical memorandum is converted to that of the document class titled Technical report, the following complementing processing is required to be executed. That is, a complementing action "insertion" is required to be executed for a complemented node named Section and a complementing action "addible" is required to be executed for a complemented node named Title.

Figure 41:
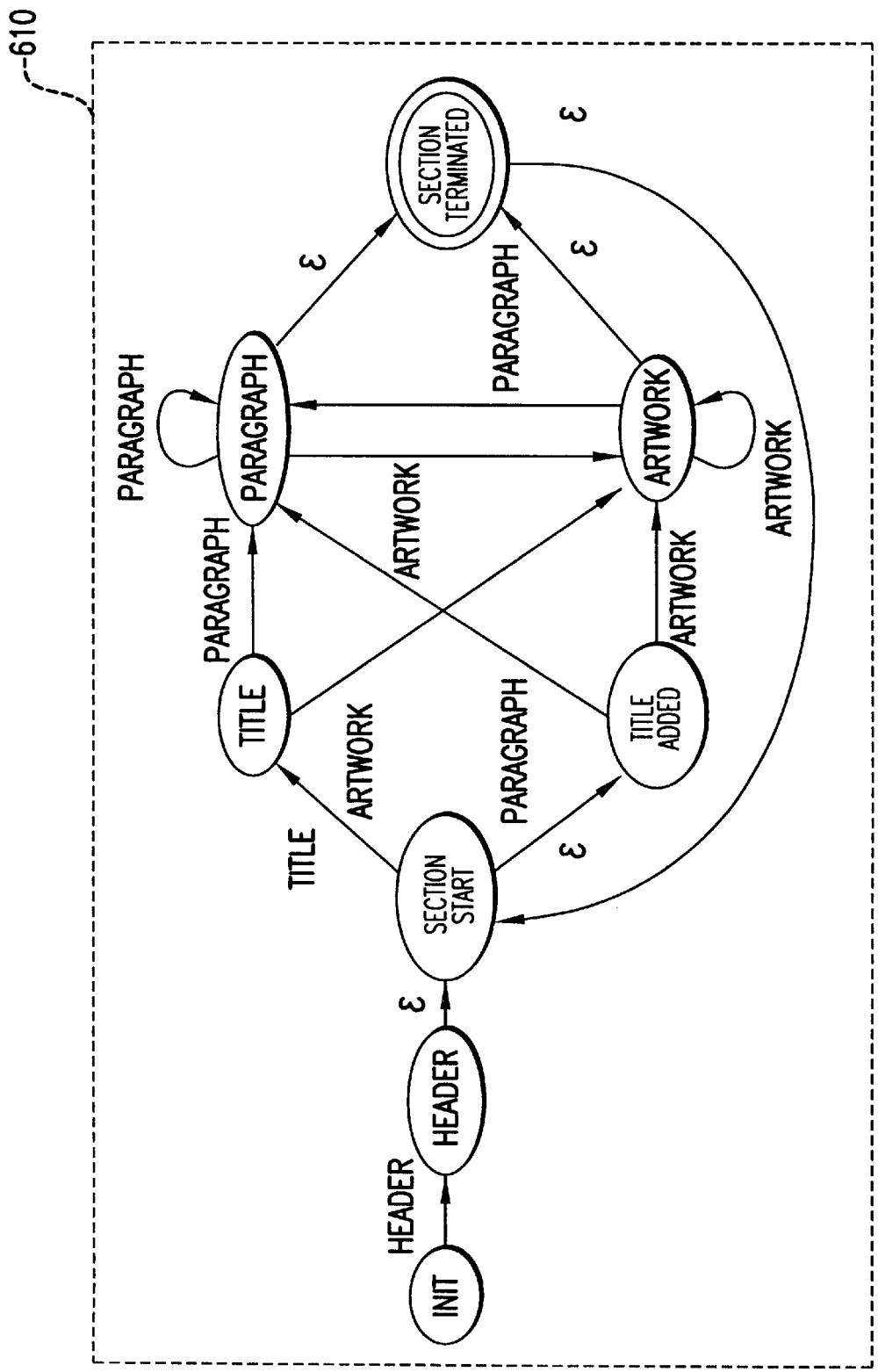
FIG. 41 shows a basic automaton produced based upon the specification of complementation shown in FIG. 40 for the document class titled Technical report.

A complementing automaton will be produced below based upon the specification of complementation 600 shown in FIG. 40. FIG. 41 shows a basic automaton produced based upon the specification of complementation 600 shown in FIG. 40 for the subordinate structure of a node named Report which is the root node of the document class titled Technical report. This basic automaton 610 inserts the node named Section and can add the node named Title. This basic automaton 610 is produced by the automaton producing section 37a in the complementing section 37 shown in FIG. 38. The basic automaton 610 is constituted by an initial state Init, a Header state, a Section start state, a Title state, a Title added state, a Paragraph state, an Artwork state and a Section terminated state.

Transition from the initial state Init to the Header state is executed by reading a node named Header and transition from the Header state to the Section start state is performed according to $\epsilon$ transition, that is, without reading any. Transition from the Section start state to the Title state is executed by reading the node Title and transition to the Title added state is performed according to $\epsilon$ transition, that is, without reading any.

Transition from the Title state to the Paragraph state is executed by reading a node named Paragraph and transition to the Artwork state is executed by reading a node named Artwork. Transition from the Title added state to the Paragraph state is executed by reading the node Paragraph and transition to the Artwork state is executed by reading the node Artwork.

Transition from the Paragraph state to the Paragraph state is executed by reading the node Paragraph, transition to the Artwork state is executed by reading the node Artwork and transition to the Section terminated state is performed according to $\epsilon$ transition, that is, without reading any.

Transition from the Artwork state to the Paragraph state is executed by reading the node Paragraph, transition to the Artwork state is executed by reading the node Artwork and transition to the Section terminated state is performed according to $\epsilon$ transition, that is, without reading any.

Further, transition from the Section terminated state to the Section start state is performed according to $\epsilon$ transition, that is, without reading any.

The Section terminated state is also an end state. This is because subordinate structure which the node Report has consists of only the node Header and one or more nodes Section which repeatedly appear as shown in FIG. 7. That is, the appearance of the node Section meets the structural constraint of the node Report.

Figure 42:
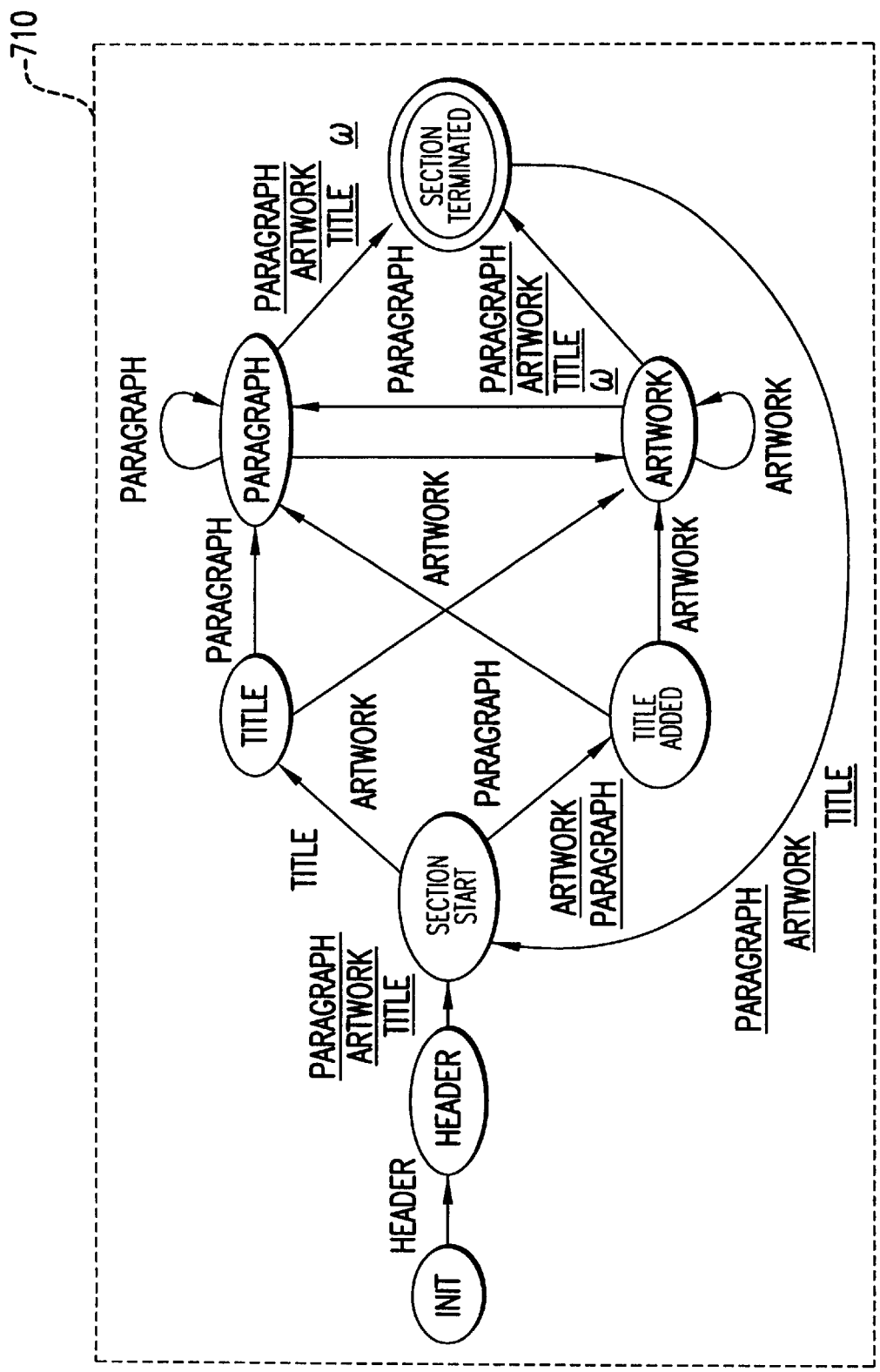
FIG. 42 shows a complementing automaton produced by applying processing for replacing $\epsilon$ transition to the basic automaton shown in FIG. 41.

Next, a complementing automaton is produced by applying processing for replacing c transition to a basic automaton. FIG. 42 shows a complementing automaton produced by applying processing for replacing ε transition to the basic automaton shown in FIG. 41. This complementing automaton 710 inserts a node named Section and can add a node named Title. This complementing automaton 710 is produced by the automaton producing section 37a in the complementing section 37 shown in FIG. 38.

The complementing automaton 710 is constituted by an initial state Init, a Header state, a Section start state, a Title state, a Title added state, a Paragraph state, an Artwork state and a Section terminated state.

Transition from the Header state to the Section start state which is performed according to ε transition in the basic automaton is executed by reading any of a node named Paragraph, a node named Artwork and a node named Title. Transition from the Section start state to the Title added state is executed by reading either the node Paragraph or the node Artwork.

Transition from the Paragraph state to the Section terminated state is executed by reading any of the node Paragraph, the node Artwork and the node Title. This transition is also performed according to ω transition, that is, if no node to be read exists. Transition to the Section terminated state is enabled by the existence of this ω transition even if no node to be read exists in the Paragraph state and this complementing automaton can reach an end state.

Transition from the Artwork state to the Section terminated state is executed by reading any of the node Paragraph, the node Artwork and the node Title. This transition is also performed according to ω transition, that is, if no node to be read exists. Transition to the Section terminated state is enabled by the existence of this ω transition even if no node to be read exists in the Artwork state and this complementing automaton can reach an end state.

Further, transition from the Section terminated state to the Section start state is executed by reading any of the node Paragraph, the node Artwork and the node Title.

However, in this complementing automaton 710, the Artwork state and the Paragraph state have transition to different states by the same label. That is, when the node Paragraph is read in the Artwork state, transition to the Paragraph state and the Section terminated state occurs. When the node Artwork is read in the Artwork state, transition to the Artwork state and the Section terminated state occurs. For the Paragraph state, the similar phenomenon occurs.

Therefore, the complementing automaton 710 is not adapted to practical use, a user is informed of the effect by the complementation specification checking section 39 and the composition of a structured document is stopped.

As described above, in the second embodiment the complementation specification checking section is provided and it is checked whether the specification of complementation and a complementing automaton are adaptive to the definition information of an output document class or not. Hereby, it can be judged whether the specification of complementation and a complementing automaton can perform normal complementing processing or not before starting complementing processing which requires much time and wrong complementation can be prevented from being executed.

As described above, according to the present invention, after converting the structure of an original document to structure nearly according to the structural constraint of a desired document class, short components can be automatically complemented based upon the definition information of the original document and that of the desired document class. As a method of complementation can be determined based upon the desire of a user, a structured document according to the desire of the user can be composed.

What is claimed is:

1. A document structure composing apparatus for composing document structure which meets the structural constraint of a document class defining a component with an element type and relationship between components, comprising:

complementation specification storage means for storing the element type of a component which is required to complement a pre-complemented document structure composed according to a procedure, which does not meet the structural constraint of a first document class, to adapt it to the first document class, and for storing a specification of complementation correlating to the element type; and complementation means for analyzing said pre-complemented document structure based upon the structural constraint of said first document class and said specification of complementation and composing document structure by supplementing a component which is short in said pre-complemented document structure.

2. A document structure composing apparatus according to claim 1, further comprising:

correlating rule storage means for storing a correlating rule defining correspondence between an element type defined in a second document class and an element type defined in said first document class; and document structure converting means for analyzing the document structure of an original document adapted to said second document class, converting the obtained result of analysis based upon said correlating rule and composing said pre-complemented document structure constituted by components of an element type defined in said first document class.

3. A document structure composing apparatus according to claim 1, wherein:

said complementation means is constituted by:

state transition machine producing means for producing a state transition machine having a general state corresponding to the component of said first document class and a complemented state in which required complementation is executed based upon the structural constraint of said first document class and said specification of complementation; and state transition machine applying means for applying said state transition machine to said pre-complemented document and composing document structure by adding a component short in said pre-complemented document structure when the current state of said state transition machine is a complemented state.

4. A document structure composing apparatus according to claim 1, wherein:

said specification of complementation is any of adding a component required for the structure of said document class, recognizing that a component is added to the structure of said document class, inserting a component required for the structure of said document class and recognizing that a component is inserted in the structure of said document class.

5. A document structure composing apparatus according to claim 3, wherein:

complementation check means for checking whether said specification of complementation is adaptive to said document class or not and whether said state transition machine can determine a method of complementation uniquely or not is further comprised.

6. A document structure composing apparatus for composing document structure which meets the structural constraints of a first document class, the structural constraints defining a set of element types for components of the first document class and also defining a set of relationships between components of the first document class, the apparatus comprising:

complementation specification storage means for storing a complementing set of element types from the set of element types for the first document class that are required to complement a pre-complemented document structure for a pre-complemented document that is composed from a first document whose structure meets the structural constraints of a second document class, the structural constraints of the first document class being different from the structural constraints of the second document class and also for storing a specification of complementation to correlate said complementing set of element types to a set of element types for components of the second document class; and complementing means for analyzing said pre-complemented document based upon said structural constraints of said first document class and said specification of complementation and for composing a second document whose structure meets said structural constraints of said first document class by supplementing said pre-complemented document with a component of said complementing set of element types.

* * * * *